(12) United States Patent
Ueda

(10) Patent No.: US 10,795,246 B2
(45) Date of Patent: *Oct. 6, 2020

(54) IMAGING APPARATUS AND ACCESSORY

(71) Applicant: CANON KABUSHIKI KAISHA, Tokyo (JP)

(72) Inventor: Haruhisa Ueda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/685,503

(22) Filed: Nov. 15, 2019

(65) Prior Publication Data
US 2020/0081328 A1 Mar. 12, 2020

Related U.S. Application Data

(63) Continuation of application No. 15/992,777, filed on May 30, 2018, now Pat. No. 10,527,913.

(30) Foreign Application Priority Data

May 31, 2017 (JP) .................. 2017-108279

(51) Int. Cl.
G03B 17/00 (2006.01)
G03B 17/56 (2006.01)
(Continued)

(52) U.S. Cl.
CPC .......... *G03B 17/565* (2013.01); *G03B 17/04* (2013.01); *G03B 17/14* (2013.01); *G03B 17/18* (2013.01); *G03B 17/566* (2013.01); *H01R 13/2471* (2013.01); *H04N 5/2254* (2013.01); *G03B 2206/00* (2013.01)

(58) Field of Classification Search
USPC .......................................... 396/532
See application file for complete search history.

(56) References Cited

U.S. PATENT DOCUMENTS 3,758,198 A 9/1973 Kanie
4,307,954 A 12/1981 Ludwig
(Continued)

FOREIGN PATENT DOCUMENTS

CN 1580850 A 2/2005
CN 100495191 C 6/2009
(Continued)

*Primary Examiner* — Rodney E Fuller
(74) *Attorney, Agent, or Firm* — Canon U.S.A., Inc. I.P. Division

(57) ABSTRACT

Included are multiple mount claws, and multiple contact pins following the circumferential direction of a second mount. The second mount can rotate to a first state where multiple claws of a first mount are inserted between the multiple mount claws, and a second state where the multiple mount claws engage the claws in a center axis direction. In the first state, a first mount claw is included in an angle range where a first contact pin of the multiple contact pins and a center axis of the mount are connected in the radial direction of the mount, and a first contact face of the multiple contact faces and the center axis are connected in the radial direction of the mount. The first contact pin and the first contact face come into contact first when rotating from the first state to the second state.

22 Claims, 27 Drawing Sheets

(51) Int. Cl.
*G03B 17/14* (2006.01)
*G03B 17/04* (2006.01)
*G03B 17/18* (2006.01)
*H01R 13/24* (2006.01)
*H04N 5/225* (2006.01)

(56) References Cited

U.S. PATENT DOCUMENTS

| | | | |
|---|---|---|---|
| 5,404,190 A * | 4/1995 | Kohno | G03B 17/14 396/529 |
| 8,757,904 B2 | 6/2014 | Hasuda | |
| 8,837,062 B2 | 9/2014 | Uehara | |
| 9,164,360 B2 | 10/2015 | Hasuda | |
| 9,645,476 B2 | 5/2017 | Hasuda | |
| 10,527,913 B2 * | 1/2020 | Ueda | G03B 17/14 |
| 10,613,419 B2 | 4/2020 | Yamana | |
| 2004/0046890 A1 | 3/2004 | Kikuchi | |
| 2006/0165401 A1 | 7/2006 | Doi | |
| 2012/0063016 A1 | 3/2012 | Imafuji | |
| 2012/0229923 A1 | 9/2012 | Koyama | |
| 2013/0266303 A1 | 10/2013 | Nishio | |
| 2013/0266304 A1 * | 10/2013 | Nishio | G03B 17/14 396/532 |
| 2014/0184041 A1 | 7/2014 | Ikezawa | |
| 2015/0049244 A1 | 2/2015 | Tokunaga | |
| 2015/0168816 A1 | 6/2015 | Fujiwara | |
| 2016/0370689 A1 | 12/2016 | Hasuda | |
| 2018/0203213 A1 * | 7/2018 | Ueki | G02B 7/02 |
| 2018/0348597 A1 * | 12/2018 | Tamura | G03B 17/566 |
| 2018/0348610 A1 * | 12/2018 | Tamura | H04N 5/2254 |
| 2018/0348611 A1 * | 12/2018 | Yamazaki | G03B 17/566 |
| 2019/0212634 A1 * | 7/2019 | Kondo | G02B 7/14 |
| 2019/0222730 A1 * | 7/2019 | Kondo | H04N 5/2254 |

FOREIGN PATENT DOCUMENTS

| | | |
|---|---|---|
| CN | 101533146 A | 9/2009 |
| CN | 102244744 A | 11/2011 |
| CN | 102621660 A | 8/2012 |
| CN | 102970465 A | 3/2013 |
| CN | 103018875 A | 4/2013 |
| CN | 103069335 A | 4/2013 |
| CN | 103296530 A | 9/2013 |
| CN | 103444258 A | 12/2013 |
| CN | 103608725 A | 2/2014 |
| CN | 104252026 A | 12/2014 |
| CN | 104335116 A | 2/2015 |
| CN | 105516554 A | 4/2016 |
| CN | 105629638 A | 6/2016 |
| CN | 205787540 U | 12/2016 |
| CN | 106462029 A | 2/2017 |
| CN | 106647108 A | 5/2017 |
| CN | 106707454 A | 5/2017 |
| EP | 1672420 A1 | 6/2006 |
| GB | 2187856 A | 9/1987 |
| JP | S62-195633 A | 8/1987 |
| JP | H02-103522 A | 4/1990 |
| JP | H09269535 A | 10/1997 |
| JP | 2864384 B2 | 3/1999 |
| JP | 2005140846 A | 6/2005 |
| JP | 2012-078783 A | 4/2012 |
| JP | 2012-155290 A | 8/2012 |
| JP | 2013235074 A | 11/2013 |
| JP | 2016-126069 A | 7/2016 |
| RU | 2602404 C2 | 11/2016 |
| SU | 1778745 A1 | 11/1992 |
| TW | 201239502 A | 10/2012 |
| TW | 201312192 A | 3/2013 |
| TW | M464678 U | 11/2013 |
| TW | I518439 B | 1/2016 |

* cited by examiner

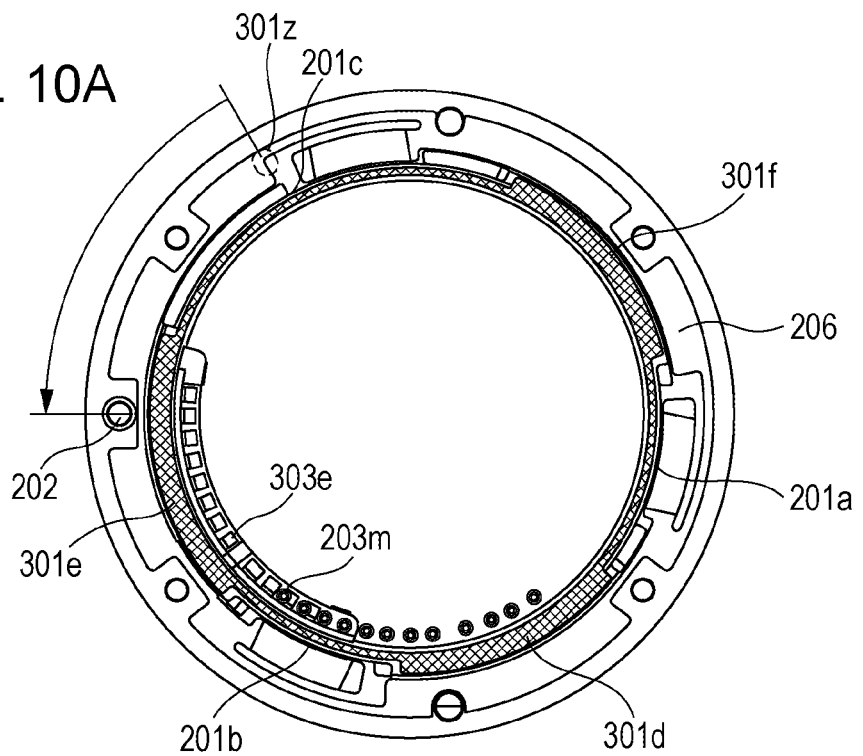
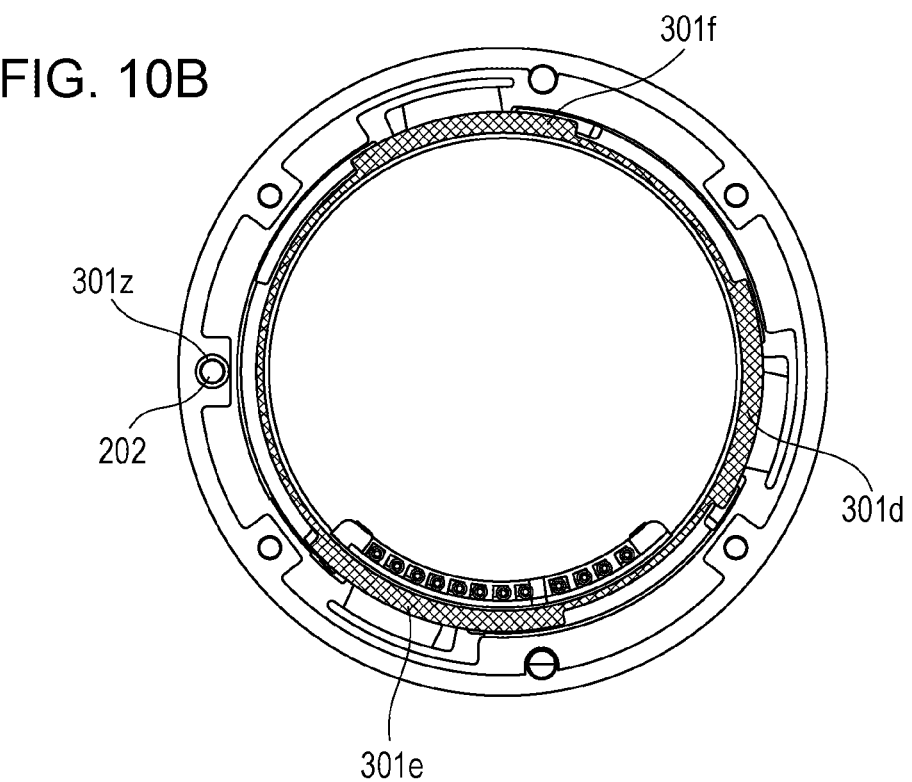

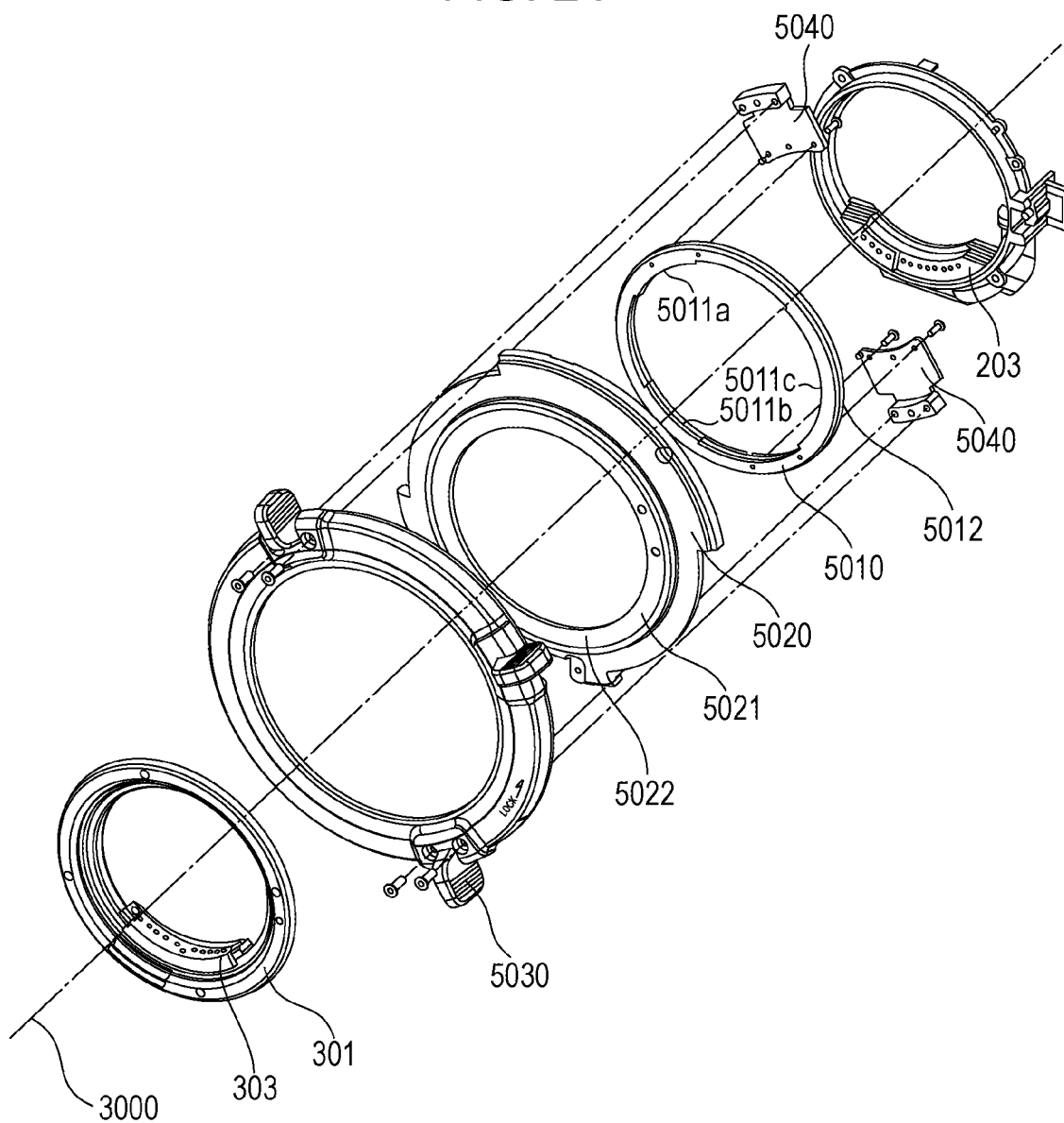

IMAGING APPARATUS AND ACCESSORY

CROSS-REFERENCE TO RELATED APPLICATIONS

The present application is a continuation of U.S. patent application Ser. No. 15/992,777, filed on May 30, 2018, which claims priority from Japanese Patent Application No. 2017-108279 filed May 31, 2017, which are hereby incorporated by reference herein in their entireties.

BACKGROUND OF THE INVENTION

Field of the Invention

The present invention relates to an imaging apparatus and an accessory.

Description of the Related Art

Conventionally, accessories such as interchangeable lenses and so forth (camera accessories) are known to be able, when mounted to an imaging apparatus such as a digital camera (hereinafter, referred to as a "camera") or the like, to receive a supply of power from the camera and to enable communication of commands, data, and so forth between the accessory and the camera. It is known that multiple contacts (terminals) capable of electric connection, by coming into contact, are provided on both the camera and a mounting portion of the accessory, in order to enable the supply of power and the communication. There is also known a mounting system for mounting (coupling) the accessory to the camera employing so-called bayonet coupling, where mounts of both the camera and accessory are rotated relative to each other, and bayonet/mount claws provided on each apparatus engage with the claws provided on the other apparatus.

Japanese Patent Laid-Open No. 2014-13331 proposes a technology where, with regard to an accessory and camera detachably attached by the bayonet coupling method, a predetermined contact point is disposed within an angle range where a bayonet claw is provided.

SUMMARY OF THE INVENTION

An imaging apparatus includes a second mount arranged to couple with a first mount provided to an accessory. The second mount includes a plurality of mount claws that arranged to couple with a plurality of claws of the first mount by a bayonet coupling method, a plurality of contact pins that are disposed on the second mount following the circumferential direction of the second mount, and that are arranged for electrical connection, and a holding member configured to hold the plurality of contact pins. The second mount is arranged to be relatively rotated as to the first mount, between a first state where the accessory claws are each inserted between each of the plurality of mount claws, and a second state where the plurality of mount claws are each engaged with each of the claws of the accessory in a center axis direction of the second mount. Each of the plurality of contact pins correspond to respective contact faces disposed following the circumferential direction of the first mount at the accessory, and the corresponding plurality of contact pins and the plurality of contact faces are electrically connected in the second state. Each of the mount claws extend radially over an angle range in the circumferential direction of the second mount, and a first mount claw of the plurality of mount claws is included in an angle range between a line where a first contact pin of the plurality of contact pins and the center axis are connected in the radial direction of the second mount, and a line where a first contact face of the plurality of contact faces and the center axis are connected in the radial direction of the second mount, in the circumferential direction in the first state. The first contact pin is a contact pin that comes into contact first with the plurality of contact faces, during relative rotation between the second mount and the first mount from the first state toward the second state. The first contact face is arranged to come into contact first with the plurality of contact pins, during relative rotation of the second mount and the first mount from the first state toward the second state.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIGS. 10A and 10B are diagrams exemplarily describing a contact state between terminals on the camera body and first lens unit according to an embodiment of the present invention.

FIG. 24 is a disassembled perspective view of a mount mechanism according to a modification of the present invention.

DESCRIPTION OF THE EMBODIMENTS

Figure 1A:
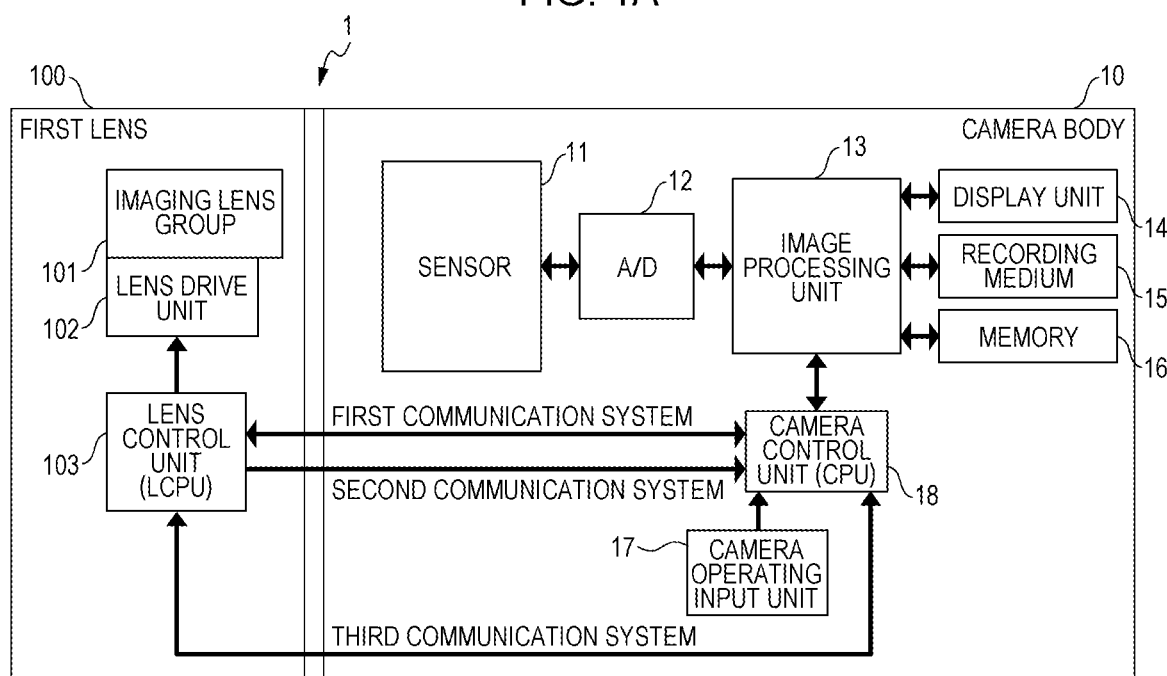
FIGS. 1A and 1B are block diagrams of a camera accessory and imaging apparatus according to an embodiment of the present invention.
Figure 1B:
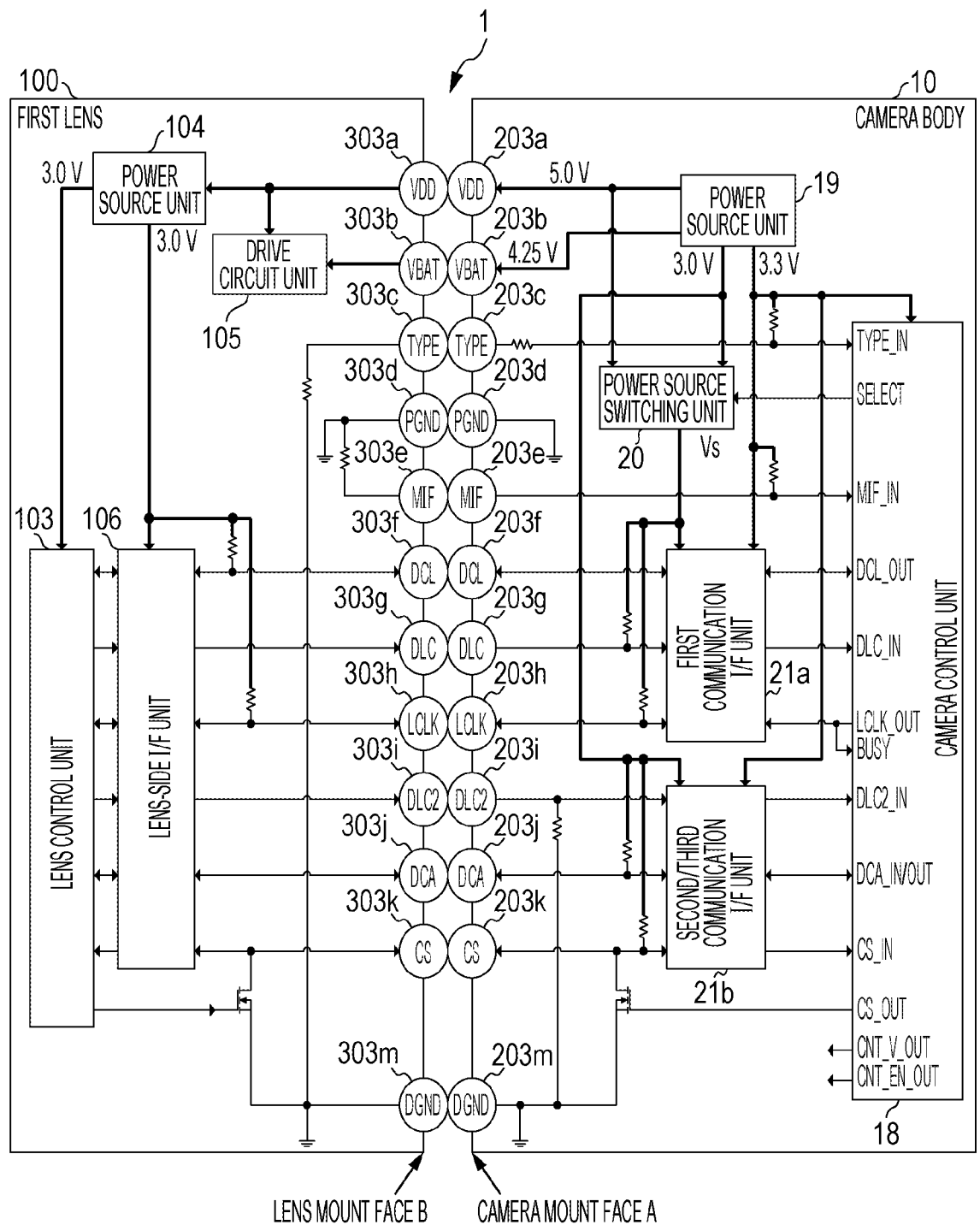

FIGS. 1A and 1B are block diagrams of a camera accessory and imaging apparatus according to an embodiment of the present invention. FIG. 1A is a diagram exemplarily describing a camera system including a first lens unit (hereinafter referred to as first lens) 100, serving as an accessory according to the embodiment of the present invention, and a camera body 10 serving as a first imaging apparatus to which the first lens 100 can be directly detachably attached. Also, FIG. 1B is a diagram describing the configuration of a mount portion 1 formed by the mounts in both the first lens 100 and the camera body 10. That is in FIGS. 1A and 1B, the mounts provided on the first lens 100 and the mounts provided on the camera body 10 are collectively referred to as the mount portion 1. The mounts provided to the first lens 100 and camera body 10 will be described later.

As illustrated in FIG. 1A, the camera body 10 has a charge-accumulation type solid-state imaging device (hereinafter referred to simply as sensor) 11, such as a complementary metal-oxide semiconductor (CMOS) sensor or the like, that performs photoelectric conversion of an optical image of a subject guided by a photography lens group 101 provided on the inner side of the first lens 100, and outputs electric signals. The camera body 10 also has an A/D conversion unit 12 that converts analog electric signals output from the imaging sensor 11, and an image processing unit 13 that generates image signals by performing various types of image processing on the digital signals. The image signals (still image and moving image) generated at the image processing unit 13 can be displayed on a display unit 14, and recorded in a recording medium 15.

The camera body 10 also has memory 16. This memory 16 serves as a buffer for performing processing on image signals, and also stores operation programs (computer programs) that a later-described camera control unit 18 uses.

The camera body 10 also has a camera operating input unit 17 including a power source switch for turning the power source on/off, a photography switch (release switch) for starting recording of image signals, and selection/settings switches for performing various types of menu settings, and so forth. The camera body 10 also has the camera control unit 18 including a microprocessor central processing unit (CPU) serving as a computer) that centrally controls the operations of the camera body 10 and first lens 100. The camera control unit 18 performs various types of settings based on signals input from the camera operating input unit 17, for example, and controls communication with a lens control unit 103 provided to the first lens 100 via the mount portion 1.

On the other hand, the first lens 100 has the photography lens group 101 that is an optical member having multiple lens groups such as a zoom lens, shift lens, focus lens, and so forth, and light amount adjustment members such as a diaphragm and so forth. The first lens 100 has actuators for moving or operating optical members such as the multiple lens groups and diaphragm and so forth, and also has a lens drive unit 102 that drives the actuators. The first lens 100 also has the lens control unit 103 including a microprocessor (logical CPU (LCPU)) for lenses, that centrally controls operations of the first lens 100. The lens control unit 103 controls the lens drive unit 102 by communicating with the camera control unit 18 via the mount portion 1, for example.

Basic Configuration of Mount Portion 1

Next, the configuration of the mount portion 1 including a camera mount face A provided on the camera body 10 side, and an accessory mount face B provided on the first lens 100 side, will be described with reference to FIG. 1B. Note that the camera mount and accessory mount include a locking mechanism, a mount holding mechanism, and multiple electric terminals. The mounts will be described in detail later.

The mount portion 1 has multiple terminals that are capable of electrically connecting the camera body 10 and the first lens 100 to each other, as illustrated in FIG. 1B. The multiple terminals are, at the camera mount face A, exposed to the outside of the camera body 10 as multiple camera-side contact pins provided to a contact holding member 203. The multiple terminals also are, at the accessory mount face B, exposed to the outside of the camera accessory (e.g., first lens 100) as multiple accessory-side contact faces provided to a contact face holding member 303. The contact pins and the contact faces of the camera body 10 side and the camera accessory (e.g., first lens 100) side are electrically connected among mutually corresponding contacts, in a state where the camera accessory is mounted to the camera body 10.

A camera power source unit 19 generates communication control power source (VDD) as power source to be supplied to a mounted camera accessory via a VDD terminal, and power source to be supplied to a first communication I/F unit 21a via a power source switching unit 20. The camera power source unit 19 also generates driving power source (VBAT) as power source to be supplied to the mounted camera accessory via a VBAT terminal.

The camera power source unit 19 generates a 3.3 V power source as a power source to be supplied to the camera control unit 18, first communication I/F unit 21a, and a second/third communication I/F unit 21b. The camera power source unit 19 also generates 3.0 V power source as a power source to be supplied to the first communication I/F unit 21a and second/third communication I/F unit 21b via the power source switching unit 20.

The power source switching unit 20 is connected to the camera power source unit 19. The power source switching unit 20 supplies only one or the other of the VDD and 3.0 V power source, generated at the camera power source unit 19, to the first communication I/F unit 21a as power source Vs for communication interface. Switching of power source voltage is executed following instructions from the camera control unit 18.

Next, a lens power source 104 generates a 3.0 V power source, as a power source voltage for supply to the lens control unit 103 and a lens-side I/F unit 106, based on VDD supplied from the camera body 10 side. In a state where the first lens 100 is mounted to the camera body 10, driving power source (VBAT) is supplied to a drive circuit unit 105 at the first lens 100 side, via a VBAT terminal from the above-described camera power source unit 19.

Although the power source voltage for the lens control unit 103 and lens-side I/F unit 106 is the same (3.0 V) in the present embodiment, a configuration may be made where the voltage level that the lens control unit 103 exhibits is 3.3 V. In this case, there is the need to supply power source of a voltage level of 3.0 V and 3.3 V to the lens-side I/F unit 106, so the lens power source 104 generates power sources of 3.0 V and 3.3 V.

Hereafter, the functions of the terminals common to both the camera mount face A and accessory mount face B will be described. VDD terminals 203a and 303a are terminals that supply communication control power source (VDD) as communication power primarily used for communication control, to the camera accessory (e.g., the first lens 100) from the camera body 10. Note that while the voltage of power source supplied to the first lens 100 is 5.0 V, the voltage of supplied power source will change depending on the type of accessory mounted to the camera body 10.

VBAT terminals 203b and 303b are terminals that supply driving voltage source (VBAT) that is driving power used for operating the mechanical driving units of the actuators used for driving the diaphragm and focus lens, from the camera side to the camera accessory side. In other words, the VBAT terminals 203b and 303b are terminals used to supply power source other than the above-described communication power. Note that the voltage of the power source serving as driving power supplied to the first lens 100 is 4.25 V. The VDD terminals 203a and 303a and VBAT terminals 203b and 303b described above are power source terminals for supplying power source from the camera body 10 to the camera accessory, for example.

DGND terminals 203m and 303m are grounding terminals GND terminals) corresponding to the communication control power source VDD. Note that grounding in the present embodiment means to set the voltage level of the grounding terminals to generally the same level as the negative pole side of the power source such as a battery or the like.

PGND terminals 203d and 303d are grounding terminals for connecting the camera body 10, and a mechanical drive system including motors (actuators) and the like provided to a camera accessory (e.g., the first lens 100), to ground level. That is to say, the PGND terminals 203d and 303d are grounding terminals (GND terminals) corresponding to the driving power source VBAT. The DGND terminals 203m and 303m and PGND terminals 203d and 303d described above are grounding terminals for grounding various types of power source systems in the camera body 10 and accessory to the ground level.

MIF terminals 203e and 303e are terminals for detecting that the camera accessory (e.g., the first lens 100) has been mounted to the camera body 10. In the present embodiment, the MIF terminals 203e and 303e detect that the first lens 100 has been mounted to the camera body 10.

The camera control unit 18 detects that the camera accessory has been mounted to or detached from the camera body 10, by detecting the voltage level that the MIF terminals 203e and 303e indicated. Based on this detection, the camera control unit 18 starts supply of power source to power source terminals after having detected mounting of the camera accessory, for example, and effects control to start communication between the camera body 10 and camera accessory.

TYPE terminals 203c and 303c are terminals for distinguishing the type of camera accessory (e.g., the first lens 100) mounted to the camera body 10. The camera control unit 18 detects the value of voltage of signals indicated by the TYPE terminals 203c and 303c, and distinguishes the type of camera accessory mounted to the camera body 10 based on this value. Note that the first lens 100 is pull-down connected to the DGND terminal at a predetermined resistance value. This resistance value differs depending on the type of the camera accessory.

Next, description will be made regarding various types of communication terminals between the camera body 10 and the camera accessory. Note that the multiple communication terminals provided to the mount portion 1 are divided into multiple communication systems (groups), and each communication system is capable of performing communication independently. In the present embodiment, LCLK terminals 203h and 303h, DCL terminals 203f and 303f, and DLC terminals 203g and 303g, are a first communication system that performs first communication. DLC2 terminals 203i and 303i are a second communication system that performs second communication, which is independent from the first communication. Further, CS terminals 203k and 303k, and DCA terminals 203j and 303j are a third communication system that performs third communication, which is independent from the first and second communication. In the present embodiment, the camera control unit 18 and lens control unit 103 can perform communication independently with the first through third, via the above-described multiple communication terminals.

LCLK terminals 203*h* and 303*h* are terminals of the first communication system, and are terminals for communication clock signals output from the camera body 10 to the camera accessory (e.g., the first lens 100), and terminals for the camera body 10 to monitor the busy state of the accessory. DCL terminals 203*f* and 303*f* are terminals of the first communication system, and are communication data terminals for performing bidirectional communication between the camera body 10 and the camera accessory (e.g., the first lens 100). DLC terminals 203*g* and 303*g* are terminals of the first communication system, and are terminals for communication data output from the camera accessory (e.g., the first lens 100) to the camera body 10.

The above-described LCLK terminals, DCL terminals, and DLC terminals, corresponding to the first communication system, can switch the signal output format between so-called CMOS output type and open type. In the present embodiment, the CMOS output type has switch output of voltage at both H (High) and L (Low). In comparison with this, the open type has switch output at only the L side. Although open type in the present embodiment means the so-called open drain type, this may be the open collector type.

DLC2 terminals 203*i* and 303*i* are terminals of the second communication system, and are terminals for communication data output from the camera accessory (e.g., the first lens 100) to the camera body 10. DCA terminals 203*j* and 303*j* are terminals of the third communication system, and are terminals for communication data for performing bidirectional communication between the camera body 10 and the camera accessory (e.g., the first lens 100). CS terminals 203*k* and 303*k* are terminals of the third communication system, and are signals terminals for communication requests between the camera body 10 and camera accessory (e.g., the first lens 100). Note that in the present embodiment, in a case where the first lens 100 is mounted to the camera body 10, the communication voltage at the corresponding terminals in the first through third communication systems is 3.0 V.

Configuration of Camera Mount and Accessory Mount

The configuration of the camera mount 201 and the lens mount (accessory mount) 301 according to the present embodiment will be described with reference to FIGS. 2A through 3B. Note that in the following description, the mount provided to the imaging apparatus side will be referred to as camera mount, and the mount provided to the lens unit side will be referred to as lens mount. Further, of mounts on a later-described conversion adapter, the side that is mounted to the imaging apparatus will be referred to as lens mount, and the side mounted to the lens unit will be referred to as camera mount. Note that in the following description, a second conversion adapter 70 has a camera mount 1201 that is the same as the camera mount 201 of the camera body 10. And note that in the following description, a first conversion adapter 40 has a lens mount 1301 that is the same as the lens mount 301 of the first lens 100.

Figure 2A:
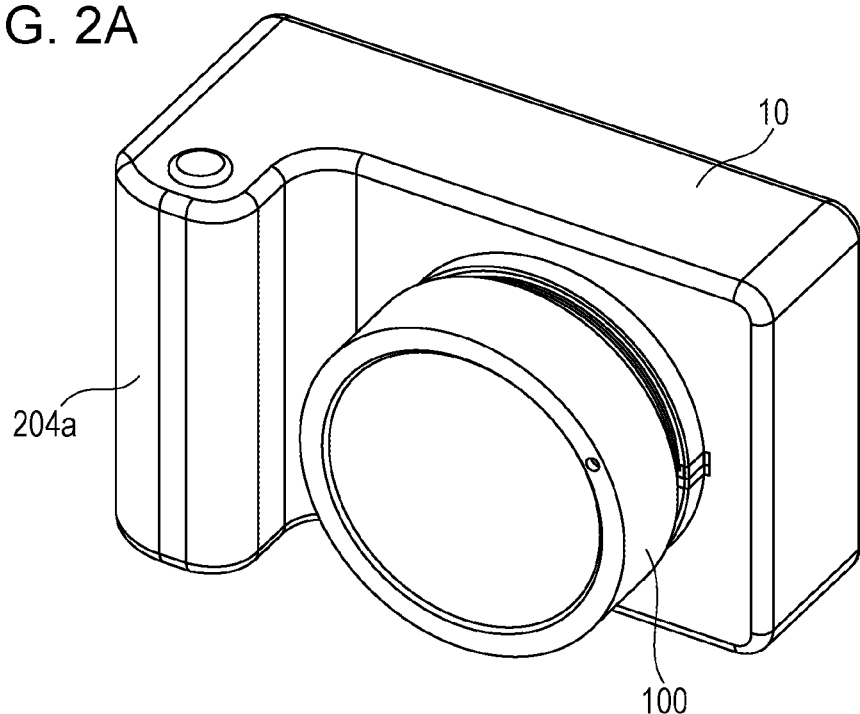
FIGS. 2A and 2B are external perspective views of a camera body and a first lens unit according to an embodiment of the present invention.
Figure 2B:
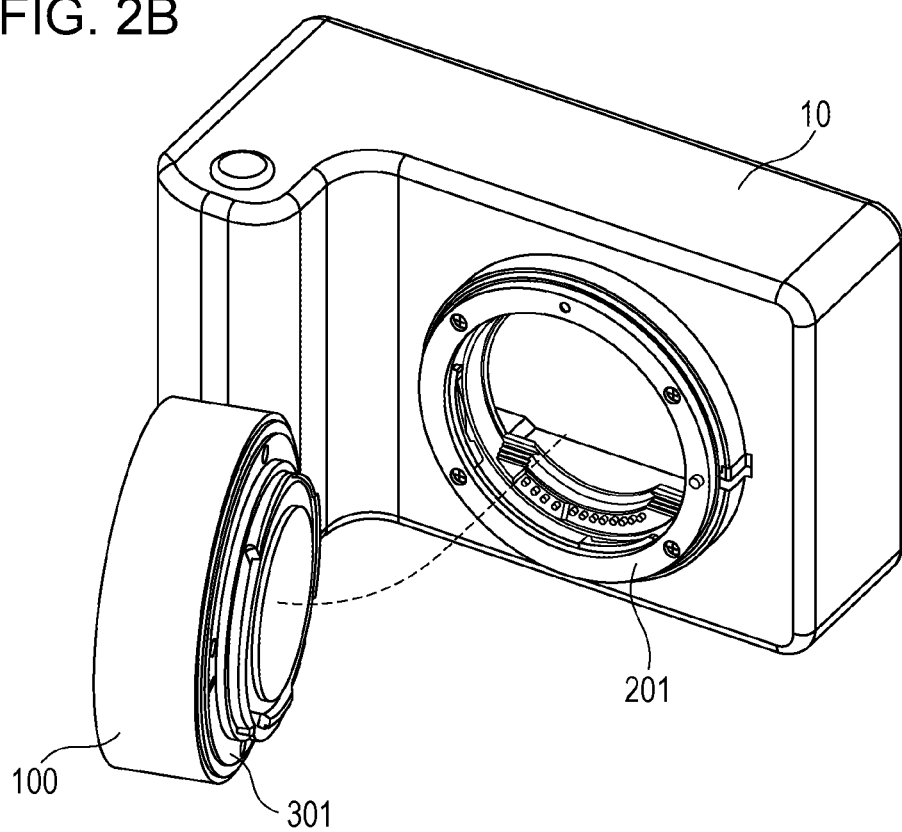

FIGS. 2A and 2B are external perspective views of the camera body 10 and first lens 100 according to the embodiment of the present invention. FIG. 2A illustrates a state in which the first lens 100 is mounted to the camera body 10, and FIG. 2B illustrates a state in which the first lens 100 has been removed from the camera body 10.

As illustrated in FIGS. 2A and 2B, the camera body 10 and first lens 100 have a ring-shaped camera mount 201 and ring-shaped lens mount 301, which each have contact faces which are parallel in a direction orthogonal to the optical axis and as such are arranged to cooperate with each other in use. Although the camera mount 201 and the lens mount 301 are ring shaped, this is not restrictive in the present embodiment. For example, a configuration may be employed in the configuration where this is realized by each of the camera mount 201 and lens mount 301 having arc-shaped contact faces. In other words, a configuration may be employed where this is realized by the camera mount 201 and the lens mount 301 having a part of the contact face notched out. Note that the above-described optical axis is parallel to a center axis passing through the center of an aperture of the camera mount and lens mount. In the present embodiment, the center axis of the camera mount 201 and the center axis of the lens mount 301 are same as each optical axis of the camera mount 201 or lens mount 301. In the present embodiment, a configuration may be employed where this is realized by differing the center axis of the mount from the optical axis. By rotating the camera body 10 and first lens 100 relative to each other, in a state where the reference faces of each of the camera mount 201 and lens mount 301 are in contact with each other, from an unlocked position to a locked position, the first lens 100 is mounted to the camera body 10. This will be described in detail later.

Figure 3A:
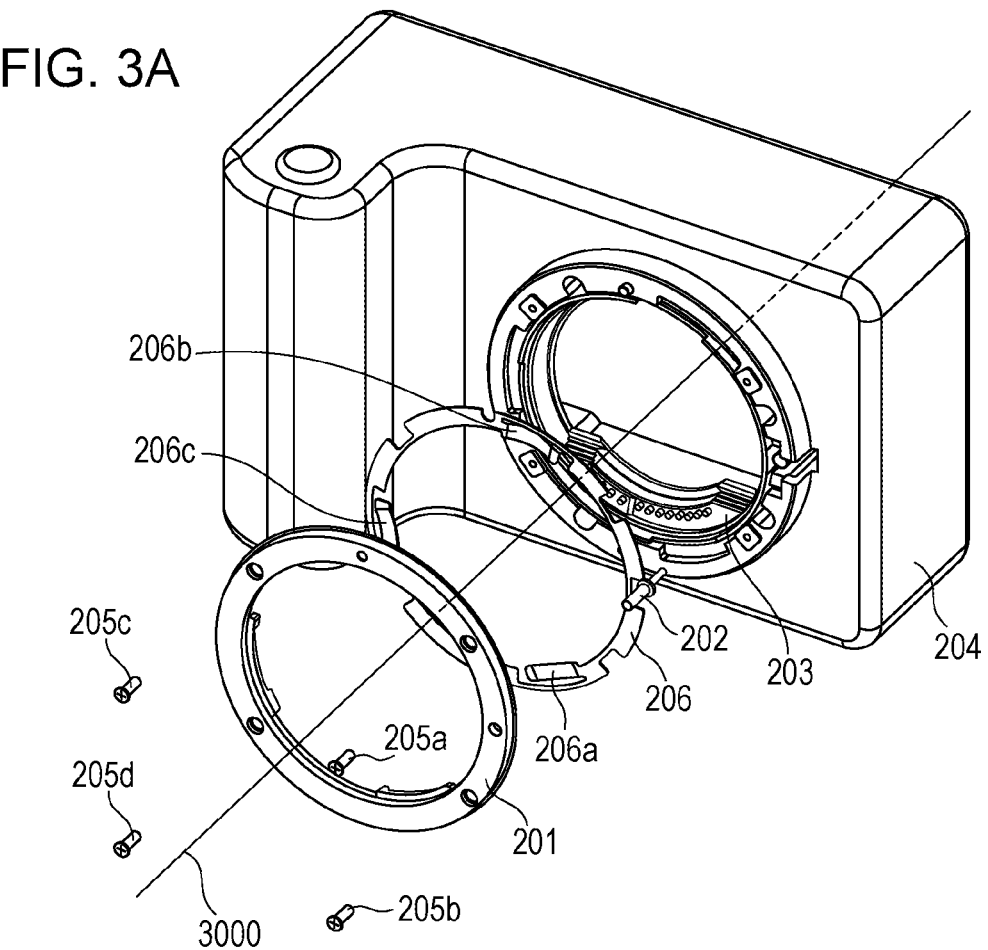
FIGS. 3A and 3B are disassembled perspective views of the camera body and the first lens unit according to an embodiment of the present invention.
Figure 3B:
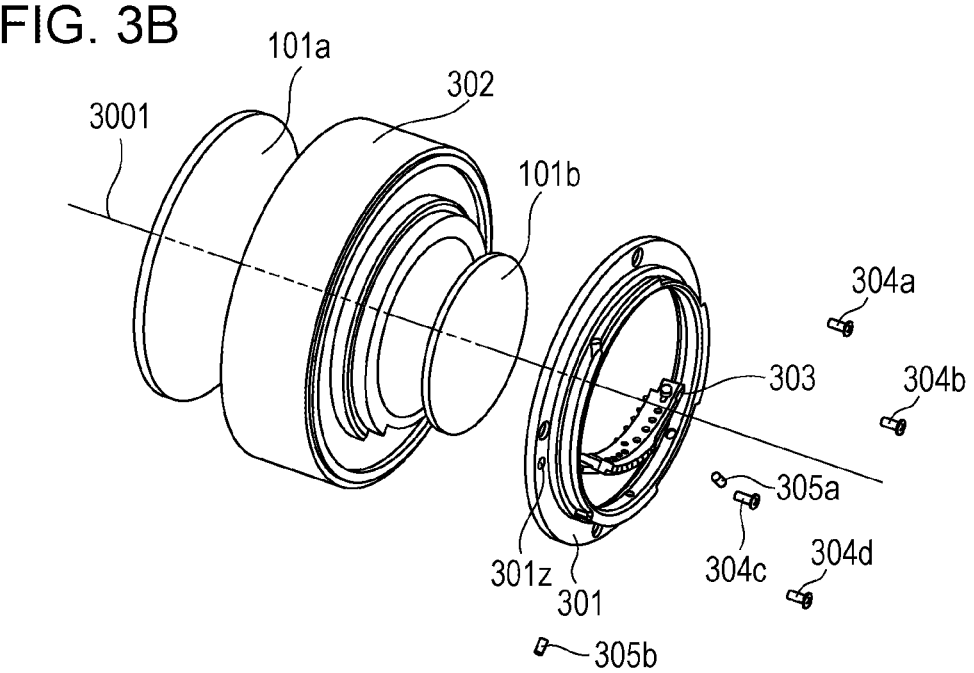

FIGS. 3A and 3B are disassembled perspective views of the camera body 10 and first lens 100 according to the embodiment of the present invention. FIG. 3A illustrates a disassembled perspective view of the camera body 10, and FIG. 3B illustrates a disassembled perspective view of the first lens 100.

As illustrated in FIG. 3A, a first optical axis (first center axis) 3000 indicates a light flux passing through the center of the camera mount 201 of the camera body 10 as illustrated in FIG. 3A. Also, as illustrated in FIG. 3B, an optical axis 3001 is an axis for describing a light flux representing an optical image of a subject that is guided by the first lens 100. When the first lens 100 is mounted to the camera body 10, the first optical axis 3000 and optical axis 3001 described above match, and optical fluxes corresponding to these optical axes enter the imaging sensor 11 and are imaged, thereby imaging a subject image.

A lock pin 202 is first restricting member (lock member) for restricting (locking) the mounted state of the camera body 10 and camera accessory. Note that the lock pin 202 is capable of advancing and retreating in a direction parallel to the first optical axis 3000. Specifically, when the first lens 100 is mounted to the camera body 10, the lock pin 202 enters a lock groove 301*z* that is a second restricting member provided to the lens mount 301, and locks the state of the first lens 100 being mounted to the camera body 10. The locking of the first lens 100 mounted to the camera body 10 can be disengaged by the user operating a lock disengaging member (omitted from illustration) connected to the lock pin 202, thereby retracting the lock pin 202 from the lock groove 301*z*. Note that even in a case of further rotating the first lens 100 and camera body 10 relative to each other in the mounting direction with the lock disengaging member operated, rotation beyond a lock abutting face 301*y* is restricted (see FIG. 7A).

The contact holding member 203 is a holding unit for holding later-described (see FIGS. 8A and 8B) multiple contact pins (electrical contact unit) 203*a* through 203*k* and 203*m*, provided on the camera body 10 side. Note that in the present embodiment, the contact pins and contact faces corresponding to the above-described terminals are denoted by the same part numerals as the terminals for the sake of description.

A camera body member 204 is a camera housing that holds the members of the camera body 10. Specifically, the above-described camera mount 201 and contact holding member 203 are fastened to the camera body member 204 by camera mount fastening screws 205a through 205d and contact holding member fastening screws that are omitted from illustration. Camera mount fastening screws 205a through 205d are positioned where none of multiple leaf springs 206a, 206b, and 206c are positioned in the camera mount 201. Furthermore, camera mount fastening screws 205a through 205d are exposed at the contact faces of the camera mount 201 which is contact with the contact face of the lens mount 301. Although the camera body member 204 holds an unshown imaging unit to which the aforementioned imaging sensor 11 is mounted, and a shutter unit that is omitted from illustration, description will be omitted.

The lens mount biasing member 206 is a biasing unit at the imaging apparatus side to pull lens claws 301d and 301e, which are multiple bayonet claws provided to the later-described lens mount 301, toward the camera mount 201 side. Specifically, the lens mount biasing member 206 has multiple leaf springs 206a, 206b, and 206c, and the bayonet claws provided to the first lens 100 are biased in the optical axis direction by the leaf springs. Note that the lens mount biasing member 206 is held between the camera mount 201 and camera body member 204 in a space formed therebetween.

Next, a front lens 101a and rear lens 101b are optical members making up the photography lens group 101, as illustrated in FIG. 3B. While the photography lens group 101 has multiple lenses, only the front lens 101a disposed at the subject-side end and the rear lens 101b disposed at the camera body 10 side end are illustrated in the present embodiment to simplify description.

A lens barrel 302 is a holding member that holds the photography lens group 101. Note that the lens mount 301 is fastened to the lens barrel 302 by lens mount fastening screws 304a through 304d. A contact face holding member 303 is a holding unit for holding multiple contact faces (electrical contact unit) 303a through 303k and 303m provided to a later-described (see FIGS. 9A and 9B) first lens 100 side. The contact face holding member 303 is fastened to the lens mount 301 by lens contact holding portion fastening screws 305a and 305b. The lens mount fastening screws 304a through 304d are exposed at the contact faces of the lens mount 301 which is in contact with the contact face of the camera mount 201.

Configuration of Bayonet Claws at Camera Body 10 Side

Figure 4A:
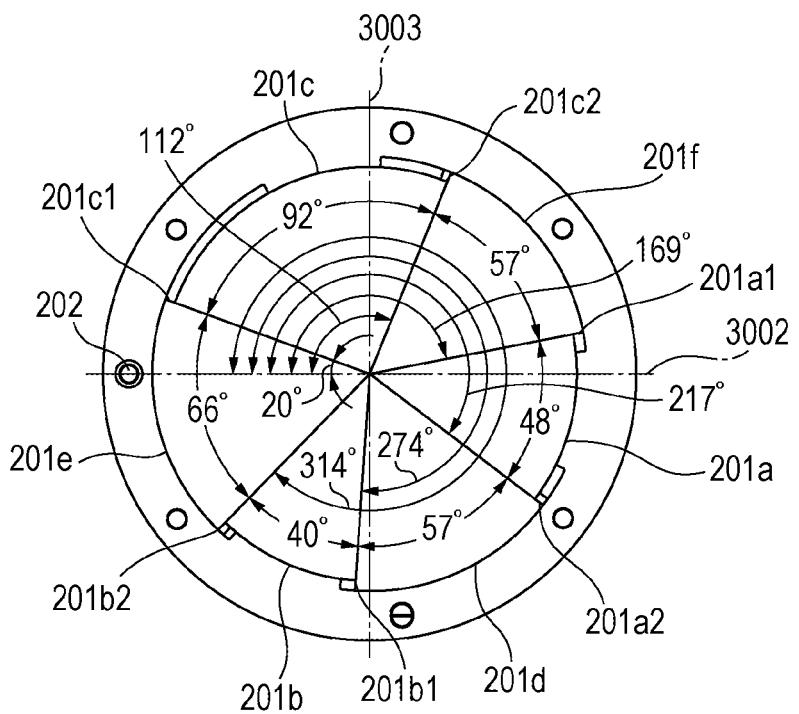
FIGS. 4A through 4C are diagrams exemplarily describing a case of viewing a camera mount according to an embodiment of the present invention from the photographer side of the camera body (rear face side of the camera body).
Figure 4B:
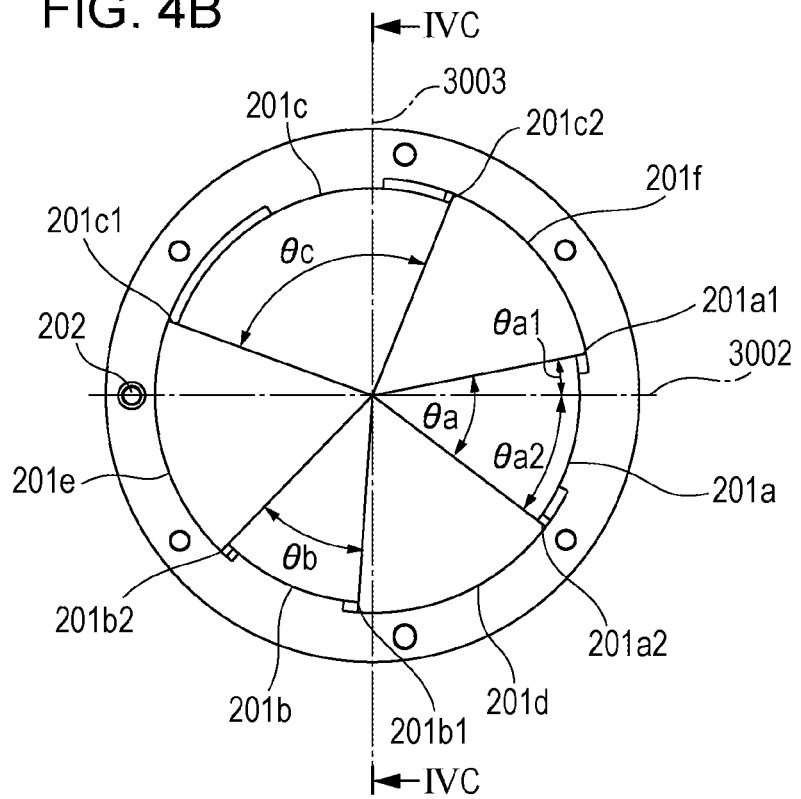
Figure 4C:
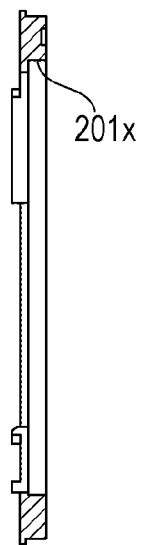

Next, the multiple bayonet claws provided to the camera mount 201 at the camera body 10 side will be described with reference to FIGS. 4A through 6B. FIGS. 4A through 4C are diagrams exemplarily describing a case of viewing the camera mount 201 according to the embodiment of the present invention from the photographer side (rear face side of the camera body 10) of the camera body 10. FIG. 4A is a diagram illustrating angle ranges that camera mount claws (hereinafter referred to simply as camera claws) and camera mount recesses (hereinafter referred to simply as camera recesses) having the lock pin 202 as a reference occupy in the circumferential direction of the camera mount 201. The camera recesses of the camera mount 201 are notch portions between adjacent camera claws. Camera recesses of the camera mount 201 are formed further toward the outside in the radial direction from the center axis of the camera mount 201 than the camera claws of the camera mount 201. Also, lens recesses of the lens mount 301 are formed further toward the inside in the radial direction from the center axis of the lens mount 301 than the lens claws of the lens mount 301. FIG. 4B is a diagram illustrating angle ranges that multiple camera claws 201a through 201c occupy in the circumferential direction of the camera mount 201. FIG. 4C is a cross-sectional diagram taken along cross-section IVC-IVC in FIG. 4B.

Note that in the following description, protrusions protruding from recesses in the inner radial direction at the camera mount side will be referred to as camera claws, and protrusions protruding from recesses in the outer diameter direction at the later-described lens mount (accessory mount) side will be referred to as lens mount claws. In the following description, the side of the camera mount 201 as viewed from the side of the photographer (rear face of the camera body 10) of the camera body 10 will be referred to as rear face side, and the opposite side will be referred to as front face side (or camera accessory side). It should be noted that in the following description, description will be made with a case of viewing the camera mount 201 from the rear face side as a reference, but in a case of viewing the camera mount 201 from the front face side, angles and directions stipulating angles (clockwise, etc.) will be reversed.

A first camera claw 201a, second camera claw 201b, and third camera claw 201c, are provided in order, to the camera mount 201 in the circumferential direction (inner radial direction), as illustrated in FIGS. 4A and 4B. When viewing the camera mount 201 from the rear face side as illustrated in FIGS. 4A and 4B, the camera claw that is provided at a position farthest from the lock pin 202 is the first camera claw 201a. The second camera claw 201b and third camera claw 201c are then consecutively provided in order from the first camera claw 201a in a clockwise direction.

Also, recesses which are a first camera recess 201d, second camera recess 201e, and third camera recess 201f are provided in order, to the camera mount 201 in the circumferential direction (inner radial direction). When viewing the camera mount 201 from the rear face side as illustrated in FIGS. 4A and 4B, the recess that is provided at a position nearest to the lock pin 202 is the second camera recess 201e. The third camera recess 201f and first camera recess 201d are then consecutively provided in order from the second camera recess 201e in a clockwise direction.

As illustrated in FIG. 4C, a fitting member 201x that restricts movement of the camera accessory in a direction parallel to the optical axis when the camera accessory is mounted, is provided to the camera mount 201 side in the circumferential direction. In the present embodiment, the diameter of the fitting member 201x in a direction orthogonal to the optical axis at the camera mount 201 is the mount diameter.

To mount the first lens 100 to the camera body 10, first, the camera claws of the camera body 10 are inserted into the lens mount recesses of the first lens 100, and the lens mount claws at the first lens 100 side are inserted into the camera recesses at the camera body 10 side. This state is a mounting start state (first state). Note that in the following description, accessory mount recesses will be referred to simply as accessory recesses, and accessory mount claws will be reference to simply as accessory claws. For example, in the case of the lens mount 301, this is lens recesses and lens claws.

The camera mount 201 and lens mount 301 are then rotated relative to each other from the mounting start state, whereby the camera claws and lens claws engage in the radial direction orthogonal to the optical axis, and transition to a state where the lens claws are biased by the above-described lens mount biasing member 206. In this state, relative positional relation between the camera body 10 and the first lens 100 transitions to a locked state where the lock pin 202 has fit into the lock groove 301z as described above. This state is a mounting complete state (second state). Note that in the mounting complete state, contact of corresponding terminals at the camera mount 201 and lens mount 301 is complete.

As described above, the camera claws and accessory claws are so-called bayonet claws, and as described above, have shapes so that the first lens 100 can be mounted (can be coupled) to the camera body 10 by the so-called bayonet coupling method by engaging of the camera claws and accessory claws.

Note that the end portions of the camera claws 201a, 201b, and 201c, in the circumferential direction, will be referred to as first end portion 201a1, second end portion 201a2, third end portion 201b1, fourth end portion 201b2, fifth end portion 201c1, and sixth end portion 201c2, for the same of description. The end portions are denoted with part numerals in order from the first camera claw 201a in the clockwise direction, when viewing the camera mount 201 from the rear face side, as described above.

As illustrated in FIG. 4A, the angles that the camera claws and camera recesses occupy in the circumferential direction of the camera mount 201 (angle ranges) are stipulated as follows in the present embodiment. For the first camera claw 201a, the angle θa=48°, for the second camera claw 201b, the angle θb=40°, and for the third camera claw 201c, the angle θc=92°. Also, for the first camera recess 201d, the angle is 57°, for the second camera recess 201e, the angle is 66°, and for the third camera recess 201f, the angle is 57°.

Also, when viewing the camera claws from the rear face side of the camera body 10, the angles in the clockwise direction where the camera claws are disposed in the circumferential direction of the camera mount 201 with the position of the lock pin 202 (referred to as reference position) as a reference are stipulated as follows. The first camera claw 201a is disposed between 169° to 217° with the reference position as a start point. The second camera claw 201b is disposed between 274° to 314° with the reference position as a start point. The third camera claw 201c is disposed between 20° to 112° with the reference position as a start point.

Now, when viewing the camera mount 201 from the optical axis direction in the present embodiment, of the multiple bayonet claws, the third camera claw 201c overlaps a first camera mount center line 3003 that extends in the vertical direction from the center axis parallel with the optical axis of the camera mount 201 in the radial direction of the camera mount 201. Note that the first camera mount center line 3003 is a line that, in a normal position of the camera body 10 where the lock pin 202 is situated at the left side when viewing the camera mount 201 from the front face side, extends in the gravitational direction and the opposite direction from the gravitational direction, from the center (optical axis) of the camera mount 201. That is to say, the first camera mount center line 3003 is a vertical line that passes through the optical axis in a normal position of the camera. In other words, the first camera mount center line 3003 is a vertical line that passes though the center of the camera mount 201 and orthogonal to the center axis of the camera mount 201 when the camera body 10 is placed on a horizontal plane.

As opposed to this, a line that, in a vertical position of the camera body 10 where the lock pin 202 is situated at the top side when viewing the camera mount 201 from the front face side, extends in the gravitational direction and the opposite direction from the gravitational direction, from the center (optical axis) of the camera mount 201, is a second camera mount center line 3002. That is to say, the second camera mount center line 3002 is a horizontal line that passes through the optical axis when the camera body 10 is in the normal position. The second camera mount center line 3002 overlaps the lock pin 202 and first camera claw 201a in the radial direction of the lens mount 201. Note that the first camera mount center line 3003 and the second camera mount center line 3002 are generally orthogonal.

Figure 5A:
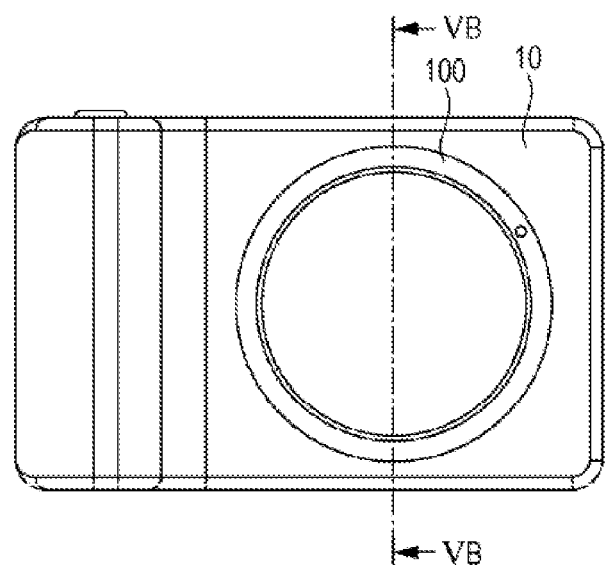
FIGS. 5A and 5B are diagrams exemplarily describing engagement of the camera body and first lens unit by camera claws at a normal position of the camera body according to an embodiment of the present invention.
Figure 5B:
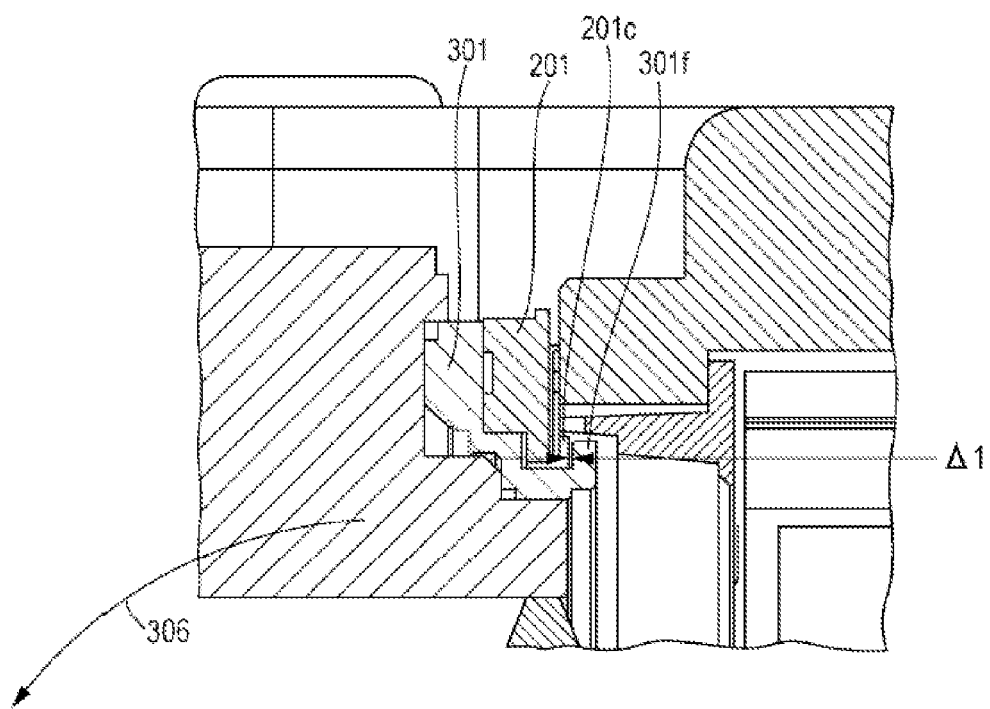

FIGS. 5A and 5B are diagrams exemplarily describing engagement of the camera body 10 and first lens 100 by camera claws at a normal position of the camera body 10 according to the embodiment of the present invention. FIG. 5A is a diagram viewing a state where the first lens 100 is mounted to the camera body 10 from the front face side. FIG. 5B is a partial cross-sectional view of the camera body 10 and first lens 100 taken along cross-section VB-VB in FIG. 5A. Note that in FIGS. 5A and 5B, the camera body 10 is positioned in the above-described normal position, and, in this state, a camera grip 204a provided to the camera body member 204 is situated to the left side when viewing the camera body 10 from the front face side.

Figure 6A:
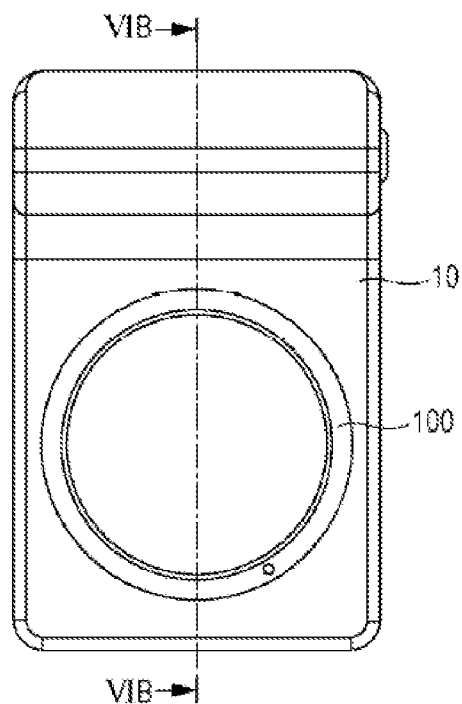
FIGS. 6A and 6B are diagrams exemplarily describing engagement of the camera body and first lens unit by camera claws at a vertical position of the camera body according to an embodiment of the present invention.
Figure 6B:
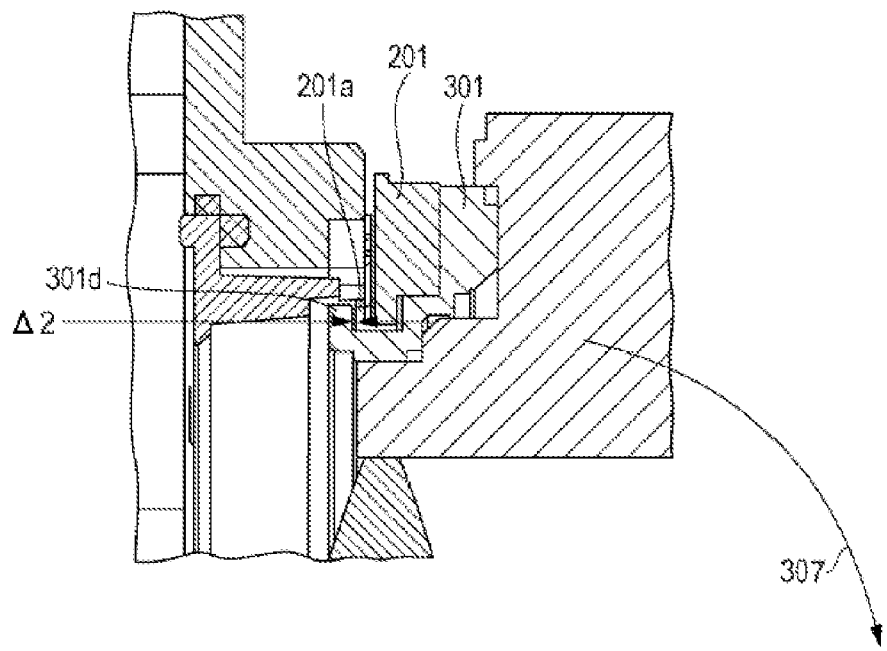

FIGS. 6A and 6B are diagrams exemplarily describing engagement of the camera body 10 and first lens 100 by bayonet claws at a vertical position of the camera body 10 according to the embodiment of the present invention. FIG. 6A is a diagram viewing a state where the first lens 100 is mounted to the camera body 10 from the front face side. FIG. 6B is a partial cross-sectional view of the camera body 10 and first lens 100 taken along cross-section VIB-VIB in FIG. 6A. Note that in FIGS. 6A and 6B, the camera body 10 is positioned in the above-described vertical position, and the camera grip 204a in this state is situated to the top side when viewing the camera body 10 from the front face side.

Generally, in a case of mounting an interchangeable lens to a camera, a gap occurs between the camera and interchangeable lens in a direction orthogonal to the optical axis, due to dimensional tolerance of the two, and looseness of the lens as to the camera increases due to this gap. Particularly, in a case of coupling a camera and interchangeable lens by bayonet coupling, the looseness of the lens is greater the farther away from positions where the bayonet claws engage each other in the circumferential direction of the lens. Also, the looseness in the gravitational direction (bowing) of the interchangeable lens as to the camera is greater due to the weight of the interchangeable lens itself. Accordingly, if a subject is imaged in a case where the looseness of the interchangeable lens as to the camera is great, an unnatural image may be obtained that is unintended by the user, due to the deviation of optical axis of the camera and optical axis of the lens.

Accordingly, in the present embodiment, the third camera claw 201c that has the widest angle of the camera-side bayonet claws overlaps the first camera mount center line 3003 in the radial direction of the camera mount, as illustrated in FIG. 5B. According to this configuration, when the first lens 100 is mounted to the camera body 10, the first camera mount center line 3003 overlaps the position where the third camera claw 201c and a later-described third lens claw 301f are engaged. In this case, looseness (bowing) of the camera accessory such as the first lens 100 or the like mounted to the camera body 10 in the gravitational direction, can be suppressed in the normal position of which the frequency of usage is highest for operating the imaging apparatus, for example. Due to the above-described configuration, the gap Δ1 illustrated in FIG. 5B can be kept from becoming large, so looseness of the first lens 100 as to the camera body 10 in the direction indicated by the arrow 306 in FIG. 5B can be suppressed.

Also, in the present embodiment, the first camera claw 201a overlaps the second camera mount center line 3002, as illustrated in FIG. 6B in the radial direction of the camera mount 201. According to this configuration, when the first lens 100 is mounted to the camera body 10, the second camera mount center line 3002 overlaps the position where the first camera claw 201a and a later-described first lens claw 301d are engaged. In this case, looseness (bowing) of the camera accessory such as the first lens 100 or the like mounted to the camera body 10 in the gravitational direction, can be suppressed in the vertical position of the imaging apparatus as well, for example. Due to the above-described configuration, the gap Δ2 illustrated in FIG. 6B can be kept from becoming large, so looseness of the first lens 100 as to the camera body 10 in the direction indicated by the arrow 307 in FIG. 6B can be suppressed.

Also, the angle of the third camera claw 201c in the circumferential direction of the camera mount 201, situated at the top side in a case where the camera body 10 is at the normal position, is greater than the sum of angles of the first claw 201a and second claw 201b situated at the lower side, as illustrated in FIG. 4B. More precisely, the total sum of angles in the circumferential direction of the camera claws provided to the camera mount 201 is greater at the upper side of the second camera mount center line as a reference as compared to the lower side. Specifically, the sum of angle θc and the angle θa1 of the first camera claw 201a on the upper side of the second camera mount center line 3002 is larger than the sum of angle θb and the angle θa2 of the first camera claw 201a on the lower side of the second camera mount center line 3002. That is to say, the layout of the camera claws and recesses is decided so as to satisfy the two following expressions.

$$\theta c \geq \theta a + \theta b \quad (1)$$

$$\theta a1 + \theta c > \theta a2 + \theta b \quad (2)$$

According to this configuration, in the normal position of the camera body 10 regarding which the frequency of usage is highest, the strength of camera claws at the upper side of the second camera mount center line 3002 (opposite side from the gravitational direction) that indicates the horizontal direction of the camera mount 201 can be made to be greater than the camera claws at the lower side (gravitational direction). Accordingly, in the normal position of the camera body 10 regarding which the frequency of usage is highest in a state where the first lens 100 is mounted, the camera body 10 according to the present embodiment can reduce looseness (bowing) of the first lens 100 as to the camera body 10 in the gravitational direction. Also, according to the camera body 10 of the present embodiment, in the normal position of the camera body 10 regarding which the frequency of usage is highest in a state where the first lens 100 is mounted, deformation of camera claws and lens claws due to the weight of the first lens 100 itself can be suppressed.

Configuration of Bayonet Claws at First Lens 100 Side

Figure 7A:
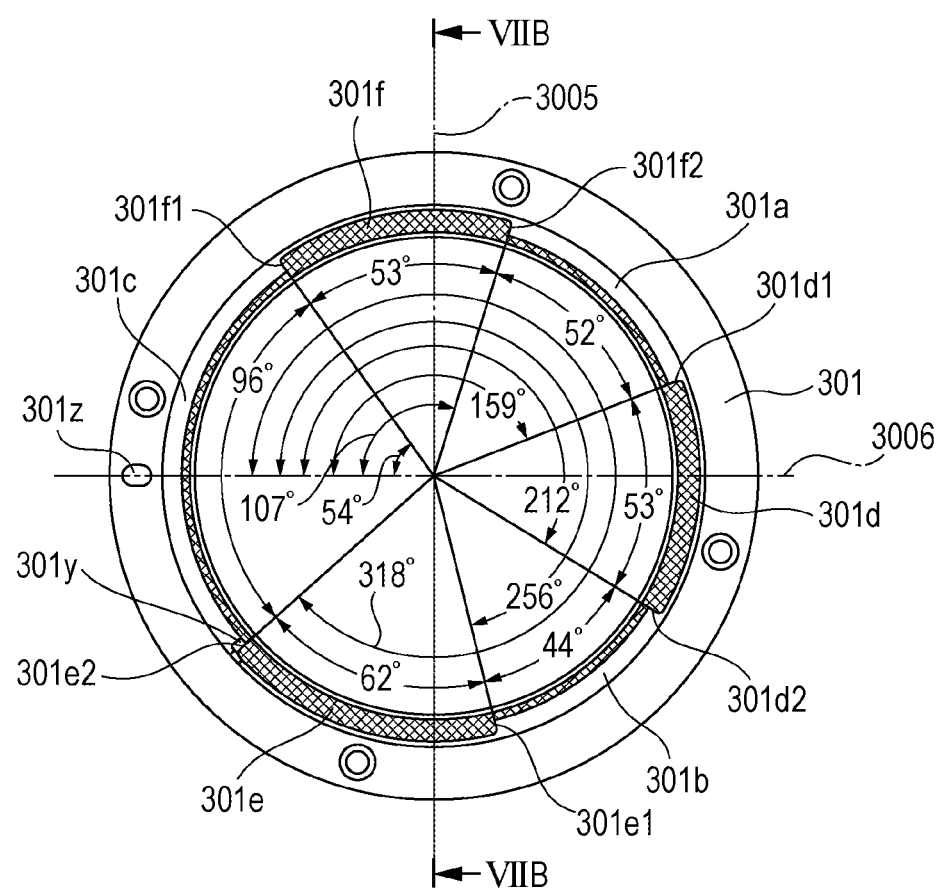
FIGS. 7A and 7B are diagrams exemplarily describing a case of viewing a lens mount according to an embodiment of the present invention from the rear face side in a state where the first lens unit is mounted to the camera body (side where the camera body is mounted).
Figure 7B:
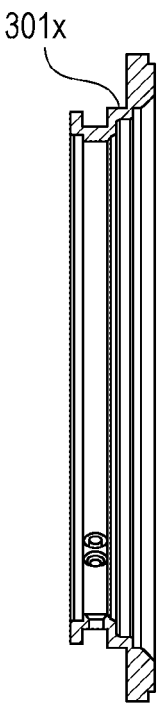

Next, multiple lens claws (accessory claws) provided to the lens mount 301 at the first lens 100 side will be described with reference to FIGS. 7A and 7B. FIGS. 7A and 7B are diagrams exemplarily describing a case of viewing the lens mount 301 according to the embodiment of the present invention from the rear face side in a state where the first lens 100 is mounted to the camera body 10 (side where the camera body 10 is attached). FIG. 7A exemplarily describes angles of the claws and recesses in the circumferential direction at the lens mount 301 side, and FIG. 7B is a cross-sectional view taken along cross-section VIIB-VIIB in FIG. 7A. Note that in the following description, the camera body 10 is positioned in the normal position in the state illustrated in FIGS. 7A and 7B.

A first lens claw 301d, second lens claw 301e, and third lens claw 301f, are provided in order, to the lens mount 301 in the circumferential direction (inner radial direction), as illustrated in FIG. 7A. When viewing the lens mount 301 from the rear face side as illustrated in FIG. 7A, the lens claw that is provided at a position farthest from the lock groove 301z is the first lens claw 301d. The second lens claw 301e and third lens claw 301f are then consecutively provided in order from the first lens claw 301d in a clockwise direction.

Also, recesses which are a first lens recess 301a, second lens recess 301b, and third lens recess 301c are provided in order, to the lens mount 301 in the circumferential direction (inner radial direction). When viewing the lens mount 301 from the rear face side as illustrated in FIG. 7A, the recess that is provided at a position nearest to the lock groove 301z is the third lens recess 301c. The first lens recess 301a and second lens recess 301b are then consecutively provided in order from the third lens recess 301c in a clockwise direction.

As illustrated in FIG. 7B, a fitting member 301x that restricts movement in a direction parallel to the optical axis of the imaging apparatus when mounted on the imaging apparatus, is provided to the lens mount 301 side in the circumferential direction. In the present embodiment, the diameter of the fitting member 301x in a direction orthogonal to the optical axis at the lens mount 301 side is the mount diameter.

Note that the end portions of the lens claws 301d, 301e, and 301f, in the circumferential direction, will be referred to as first end portion 301d1, second end portion 301d2, third end portion 301e1, fourth end portion 301e2, fifth end portion 301f1, and sixth end portion 301f2. The end portions are denoted with part numerals in order from the first lens claw 301d in the clockwise direction, when viewing the lens mount 301 from the rear face side, as described above.

As illustrated in FIG. 7A, the angles that the lens claws and lens recesses occupy in the circumferential direction of the lens mount 301 (angle ranges) are stipulated as follows in the present embodiment. For the first lens claw 301d, the angle θd=53°, for the second lens claw 301e, the angle θe=62°, and for the third lens claw 301f, the angle θf=53°. Also, for the first lens recess 301a, the angle is 52°, for the second lens recess 301b, the angle is 44°, and for the third lens recess 301c, the angle is 96°.

Also, when viewing the lens claws from the rear face side, the angles where the lens claws are disposed in the circumferential direction of the lens mount 301 with the position of the lock groove 301z (referred to as reference position) as a reference in the clockwise direction are stipulated as follows. The first lens claw 301d is disposed between 159° to 212° with the reference position as a start point. The second lens claw 301e is disposed between 256° to 318° with the reference position as a start point. The third lens claw 301f is disposed between 54° to 107° with the reference position as a start point.

Now, when viewing the lens mount 301 from the optical axis direction in the present embodiment, of the multiple bayonet claws, the second lens claw 301e overlaps a first lens mount center line 3005 that extends in the vertical direction of the lens mount 301, in the radial direction of the lens mount 301. Also, when viewing the lens mount 301 from the rear face side and front face side in the present embodiment, of the multiple bayonet claws, the third lens claw 301f overlaps the first lens mount center line 3005 in the radial direction of the lens mount 301.

Note that the first lens mount center line 3005 is a line that, in a normal position of the camera body 10 to which the first lens 100 has been mounted, extends in the gravitational direction and the opposite direction from the gravitational direction, from the center (optical axis) of the camera mount 301. In other words, the first lens mount center line 3005 is a vertical line that passes through a center of the lens mount 301 and is orthogonal to the center axis of the lens mount 301 when the camera body 10 to which the first lens 100 is attached is placed on a horizontal plane. As opposed to this, a line that, in a vertical position of the camera body 10 to which the first lens 100 has been mounted, extends in the gravitational direction and the opposite direction from the gravitational direction, from the center (optical axis) of the camera mount 301, is a second lens mount center line 3006. This second lens mount center line 3006 overlaps the lock groove 301z and first lens claw 301d in the radial direction of the lens mount 301. Note that the first lens mount center line 3005 and second lens mount center line 3006 are mutually orthogonal.

In the present embodiment, when the first lens 100 is mounted to the camera body 10, the second lens claw 301e and third lens claw 301f overlap the first lens mount center line 3005 in the radial direction of the lens mount 301, as illustrated in FIG. 7A. According to this configuration, when the first lens 100 is mounted to the camera body 10, the first lens mount center line 3005 overlaps two positions of engaging positions between lens claws and camera claws. In this case for example, in the normal position of the imaging apparatus 10 regarding which the frequency of usage is highest, looseness (bowing) of the first lens 100 mounted to the camera body 10 in the gravitational direction can be reduced.

Also, in the present embodiment, when the first lens 100 is mounted to the camera body 10, the first lens claw 301d overlaps the second lens mount center line 3006 in the radial direction of the lens mount 301, as illustrated in FIG. 7A. According to this configuration, when the first lens 100 is mounted to the camera body 10 the second lens mount center line 3006 overlaps the position where the first lens claw 301d and the first camera claw 201a engage. In this case for example, in the vertical position of the imaging apparatus as well, looseness (bowing) of the first lens 100 mounted to the camera body 10 in the gravitational direction can be reduced.

Also, in a state where the first lens 100 is mounted to the camera body 10, the second camera mount center line 3002 and second lens mount center line 3006 overlap a lock region where the lock pin 202 and lock groove 301z are fit, as described above. According to this configuration, in the vertical position of the camera body 10, the engaging position of the first camera claw 201a and first lens claw 301d and the above-described lock region overlap the mount center lines extending in the gravitational direction and the opposite direction thereof. According to this configuration, in the vertical position of the imaging apparatus, for example, looseness (bowing) of the first lens 100 mounted to the camera body 10 in the gravitational direction can be suppressed even more effectively.

Configuration of Contact Pins in Camera Body 10

Figure 8A:
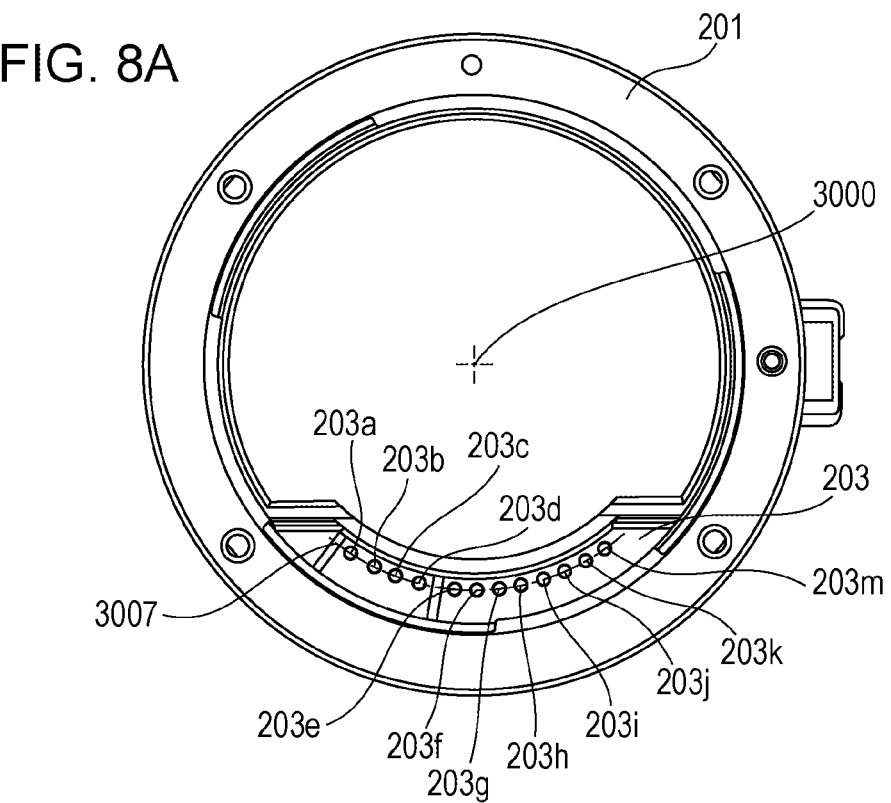
FIGS. 8A and 8B are external perspective views viewing the camera mount according to an embodiment of the present invention from the front face side (subject side).
Figure 8B:
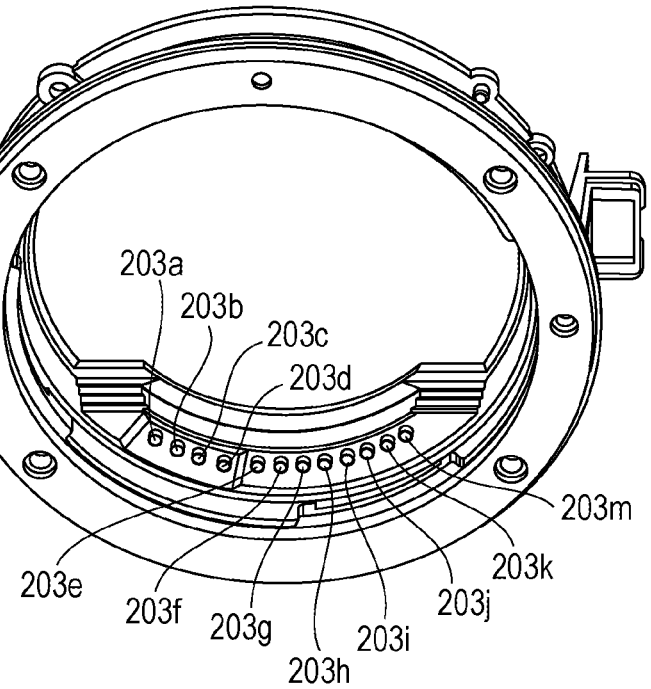

The configuration of the contact pins provided to the camera body 10 side will be described with reference to FIGS. 8A and 8B below. FIGS. 8A and 8B are external perspective views viewing a camera mount 201 according to the embodiment of the present invention from the front face side (subject side). FIG. 8A is an external view of the camera mount 201 from the optical axis direction, and FIG. 8B is an external perspective view of the camera mount 201 from above.

The contact holding member 203, and contact pins 203a through 203k and 203m that are held by the contact holding member 203 are disposed following the circumferential direction of the camera mount 201 on the inner side of the camera mount 201, as illustrated in FIG. 8A. An array line on which the contact points are disposed is illustrated in FIG. 8A as an array line 3007.

The contact pins 203a through 203k and 203m are movable pins that can advance and retreat (protrude and retract) in a direction parallel to the optical axis 3000, and are biased from behind toward the first lens 100 side by leaf springs (omitted from illustration). As described above, the contact pins 203a through 203k and 203m have the functions of the above-described respective terminals, and the part numerals by which the contact pins are denoted are the same as those of the terminals, to facilitate description.

As illustrated in FIG. 8B, out of the contact pins 203a through 203k and 203m, the contact pins 203a, 203b, 203c, and 203d are higher in the direction parallel to the optical axis 3000 (toward the front face) as compared to the other contact pins. Although the above-described configuration is realized by differing the amount of protrusion from the contact holding member 203 in the optical axis direction in the present embodiment, a configuration may be employed where this is realized by differing the amount of protrusion of the contact pins from the contact holding member 203.

Generally, in a case of employing the bayonet coupling method and attaching/detaching an interchangeable lens to/from a camera, the contact pins at the camera side and the contact face on the lens side slide over each other. For example, at the camera side, contact pins other than the contact pin situated at the edge in the rotational direction to complete mounting of the interchangeable lens slide over one or another contact face provided to the lens side. Accordingly, the more times the camera accessory is attached/detached to/from the camera, the more the contact pins and contact faces are worn.

The greater the number of terminals is, the more pronounced this problem is, and the number of times of sliding between contact pins and contact faces increases. Voltage drop increases due to the contact impedance of the terminals rising due to wearing of the contact pins and contact faces, and the interchangeable lens may malfunction, for example, due to the voltage dropping below the allowable voltage range for operation of the electric circuits.

Accordingly, in the present embodiment, the contact height of the camera-side contact pins and the interchangeable-lens-side contact faces are differed in a direction parallel to the optical axis 3000, between an upper tier and a lower tier. Specifically, the contact holding member 203 has a step (height level difference) in a direction parallel to the optical axis 3000, with the contact pins 203a through 203d being provided to the upper tier, and the contact pins 203e through 203k and 203m being provided to the lower tier. The contact face holding member 303 also is stepped in a direction parallel to the optical axis 3001, with the contact pins 303a through 303d provided to the lower tier, and the contact pins 303e through 303k and 303m provided to the upper tier.

The upper tier of the contact holding member 203 at the camera mount 201 side is a tier protruding toward the front face side (subject side) of the first lens 100 when the first lens 100 is mounted to the camera body 10. The lower tier of the contact holding member 203 is a tier recessed toward the rear face side (imaging sensor 11 side) of the camera body 10. The upper tier of the contact face holding member 303 at the lens mount 301 side is a tier protruding toward the rear face side (imaging sensor 11 side) of the first lens 100 when the first lens 100 is mounted to the camera body 10. The lower tier of the contact face holding member 303 is a tier recessed to the front face side (subject side) of the camera body 10.

In a case where the lens mount 301 is mounted to the camera mount 201, the contact pins provided to the upper tier side of the contact holding member 203 and the contact faces provided to the lower tier side of the contact face holding member 303 are electrically in contact among corresponding terminals. Also, in a case where the lens mount 301 is mounted to the camera mount 201, the contact pins provided to the lower tier side of the contact holding member 203 and the contact faces provided to the upper tier side of the contact face holding member 303 are electrically in contact among corresponding terminals. Accordingly, the steps at the camera mount 201 side and lens mount 301 side have a mutually engageable shape, so when mounting the lens mount 301 to the camera mount face A, the contact pins at the camera side and contact faces at the lens side that are provided to different steps do not come into contact.

According to this configuration, when relatively rotating the first lens 100 as to the camera body 10 from the mounting start state to the mounting completed state, the contact pins 203e through 203k and 203m do not come into contact with the contact faces 303a through 303d. Also, when relatively rotating the first lens 100 as to the camera body 10 from the mounting completed state to the mounting start state, the contact pins 203e through 203k and 203m do not come into contact with the contact faces 303a through 303d. That is to say, the number of times of sliding between contact pins and contact faces can be reduced at both the camera mount 201 side and lens mount 301 side.

Note that the contact pins at the camera body 10 side and the contact faces at the first lens 100 side are all in a non-contact state in the mounting start state of the first lens 100 as to the camera body 10, so short-circuiting among terminals before completion of mounting of the first lens 100 can be prevented.

Configuration of Contact Faces in First Lens 100

Figure 9A:
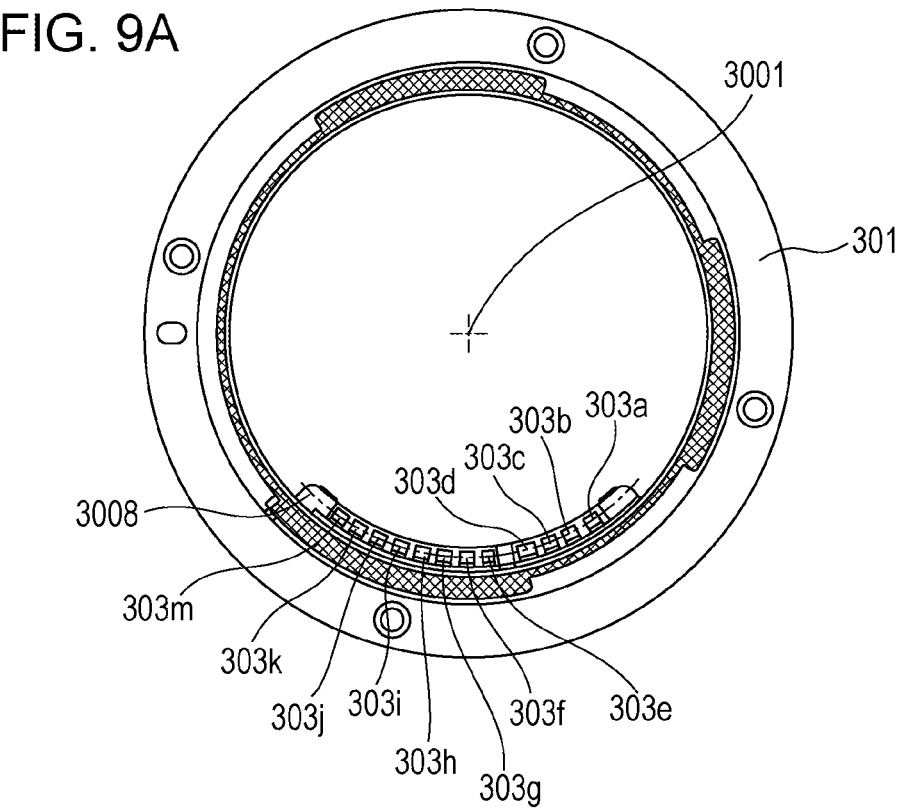
FIGS. 9A and 9B are external perspective views of the lens mount according to an embodiment of the present invention, as viewed from the side to which the camera mount is mounted (rear face side).
Figure 9B:
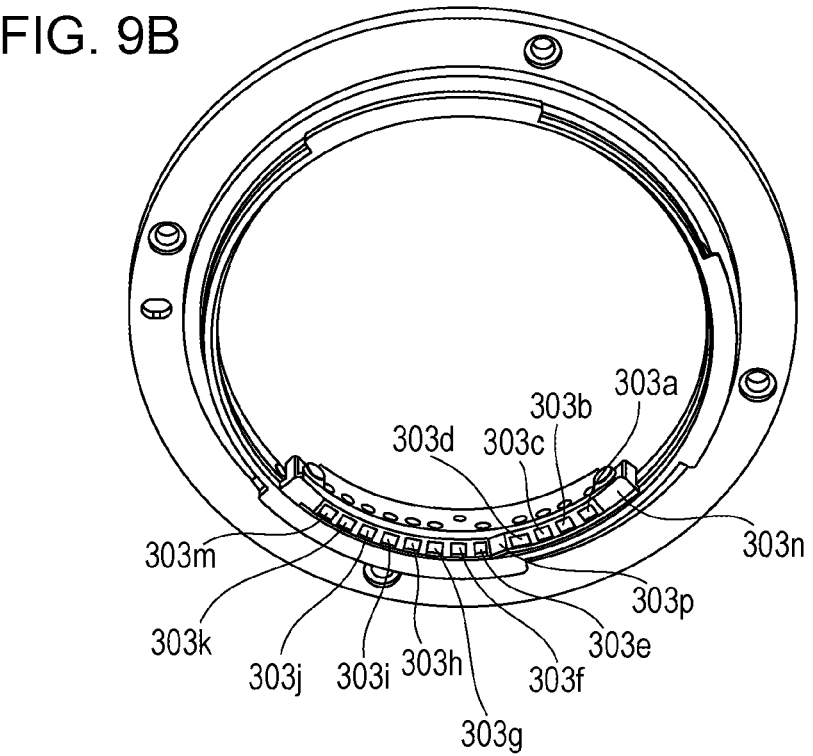

The following is a description regarding the configuration of the contact faces provided to the first lens 100 side, with reference to FIGS. 9A and 9B. FIGS. 9A and 9B are external perspective views of the lens mount 301 according to the embodiment of the present invention, as viewed from the side to which the camera mount 201 is mounted (rear face side). FIG. 9A is an external view of the lens mount 301 from the optical axis direction, and FIG. 9B is an external perspective view of the lens mount 301 from above.

The contact face holding member 303, and contact faces 303a through 303k and 303m that are held by the contact face holding member 303 are disposed on the inner side of the lens mount 301, following the circumferential direction of the lens mount 301, as illustrated in FIG. 9A. An array line on which the contact points are disposed is illustrated in FIG. 9A as an array line 3008. As described above, the contact faces 303a through 303k and 303m have the functions of the above-described respective terminals, and the part numerals by which the contact faces are denoted are the same as those of the terminals, to facilitate description.

As illustrated in FIG. 9B, out of the contact faces 303a through 303k and 303m, the contact faces 303a, 303b, 303c, and 303d are lower in the direction parallel to the optical axis 3001 as compared to the other contact faces. The above-described configuration is realized by differing the amount of protrusion of the contact face holding member 303 in the optical axis direction in the present embodiment.

According to the configuration described above, when relatively rotating the first lens 100 as to the camera body 10 from the mounting start state to the mounting completed state, the contact faces 303a through 303d do not come into contact with the contact pins 203e through 203k and 203m. Also, when relatively rotating the first lens 100 as to the camera body 10 from the mounting completed state to the mounting start state, the contact faces 303a through 303d do not come into contact with the contact pins 203e through 203k and 203m. That is to say, the number of times of sliding between contact pins and contact faces can be reduced at both the camera mount 201 side and lens mount 301 side.

Also, the contact face holding member 303 has a first guiding inclined face 303n and a second guiding inclined face 303p for drawing corresponding contact pins toward the rear face direction (imaging sensor 11 side) when mounting the first lens 100 to the camera body 10, as illustrated in FIG. 9B. According to this configuration, the contact pressure of the contact pins provided to the camera body 10 side as to the contact face holding member 303 gradually changes, whereby deformation and wear of the contact pins provided to the camera body 10 can be reduced.

Operations of Attaching First Lens 100 to Camera Body 10

Next, the operations at the time of mounting the first lens 100 to the camera body 10 will be described with reference to FIGS. 10A and 10B. FIGS. 10A and 10B are diagrams exemplarily describing a contact state between terminals on the camera body 10 and first lens 100 according to the embodiment of the present invention. FIG. 10A is a diagram for describing the contact state of the terminals in the mounting start state where mounting of the first lens 100 to the camera body 10 has been started. FIG. 10B is a diagram for describing the contact state of the terminals in the mounting completed state where mounting of the first lens 100 to the camera body 10 has been completed. Note that in the state illustrated in FIG. 10A, the contact pins 203a and 203b at the camera mount 201 side in the optical axis direction overlap the contact faces 303m and 303k at the lens mount face B side. However, the height of the contact holding member 203 and the contact face holding member 303 in the direction parallel with the optical axis is made to differ for each region, as described above, none of the contact pins and contact faces come into contact in the state illustrated in FIG. 10A.

The state illustrated in FIG. 10B is a state where the first lens 100 has been rotated by generally 60° as to the camera body 10 from the state illustrated in FIG. 10A toward the direction indicated by the arrow (see FIG. 10A). That is to say, in the present embodiment, the relative rotational angle of the camera body 10 and first lens 100 from the mounting start state to the mounting completed state is generally 60°. Note that in the state illustrated in FIG. 10B, the lock pin 202 is in the state of fitting the lock groove 301z (locked).

Rotating the first lens 100 by generally 60° as to the camera body 10 guides the first lens claw 301d into the rear face side (imaging sensor 11 side) of the first camera claw 201a and the two are engaged with each other in the optical axis direction. Also, in this state, the second lens claw 301e is guided into the rear face side (imaging sensor 11 side) of the second camera claw 201b, and these are engaged with each other in the optical axis direction. Also, in the is state, the third lens claw 301f is guided into the rear face side (imaging sensor 11 side) of the third camera claw 201c, and these are engaged with each other in the optical axis direction. Further, the positions of the lens claws provided to the first lens 100 are positioned by being biased toward the rear face side by the lens mount biasing member 206 provided to the camera mount 201 side, thereby coupling the camera body 10 and the first lens 100.

Also, the contact pins at the camera body 10 side are pressed toward the rear face side (imaging sensor 11 side) by the first guiding inclined face 303n and second guiding inclined face 303p. The contact pins of the camera body 10 come into contact with corresponding places on the contact faces 303a through 303k and 303m at the lens mount 301 side in a state of being pressed, and come into contact with the respectively corresponding contact faces in the mounting completed state. Note that at this time, the contact pin 203m provided to the camera mount 201 side and the contact face 303e provided to the lens mount 301 start coming into contact first.

Basic Configuration of Conversion Adapter

Figure 11A:
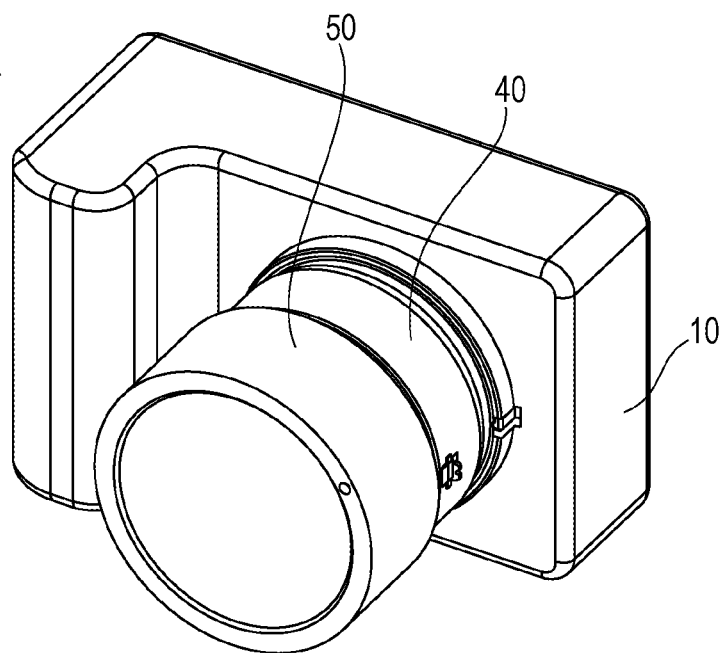
FIGS. 11A and 11B are diagrams describing a first conversion adapter that is mountable to the camera body, and a second lens unit.
Figure 11B:
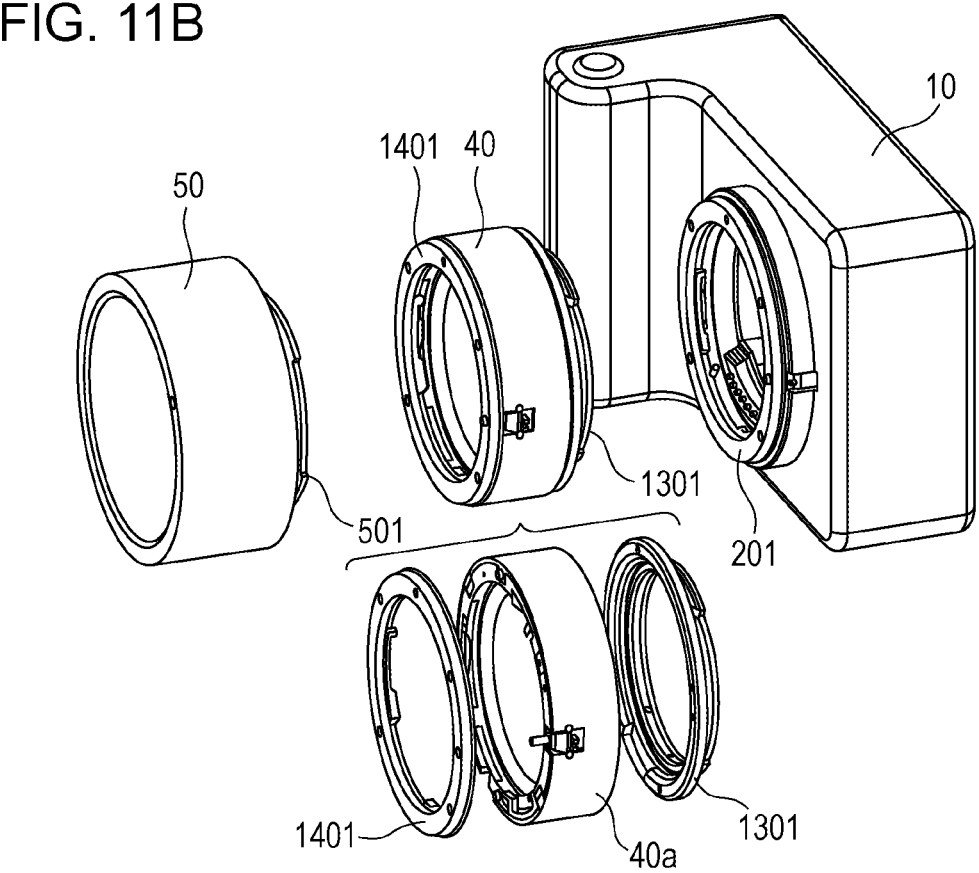

Next, the basic configuration of a conversion adapter (adapter device) that is a camera accessory mountable to the camera mount 201 of the above-described camera body 10 will be described with reference to FIGS. 11A through 12B. FIGS. 11A and 11B are diagrams describing the first conversion adapter 40 that is mountable to the camera body 10, and a second lens unit 50. FIG. 11A illustrates an external perspective view of the second lens unit 50 having been mounted to the camera body 10 via the first conversion adapter 40. FIG. 11B illustrates an external perspective view of a state where the camera body 10, first conversion adapter 40, and second lens unit 50 have each been detached. Note that the second lens unit (hereinafter referred to as second lens) 50 has a lens mount 501 that is short in flange focal distance, but has the same mount diameter as the camera mount 201, as to the camera body 10. That is to say, the second lens 50 has the same mount diameter as the above-described first lens 100, but unlike the first lens 100, is a camera accessory that is not compatible with direct mounting to the camera body 10.

Figure 12A:
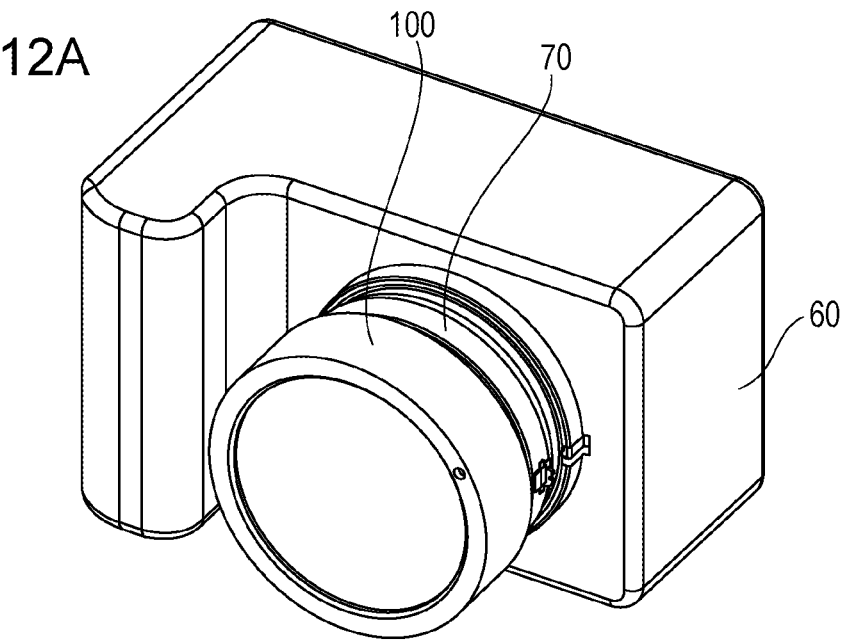
FIGS. 12A and 12B are diagrams describing a second conversion adapter that is mountable to a camera body, and the first lens unit.
Figure 12B:
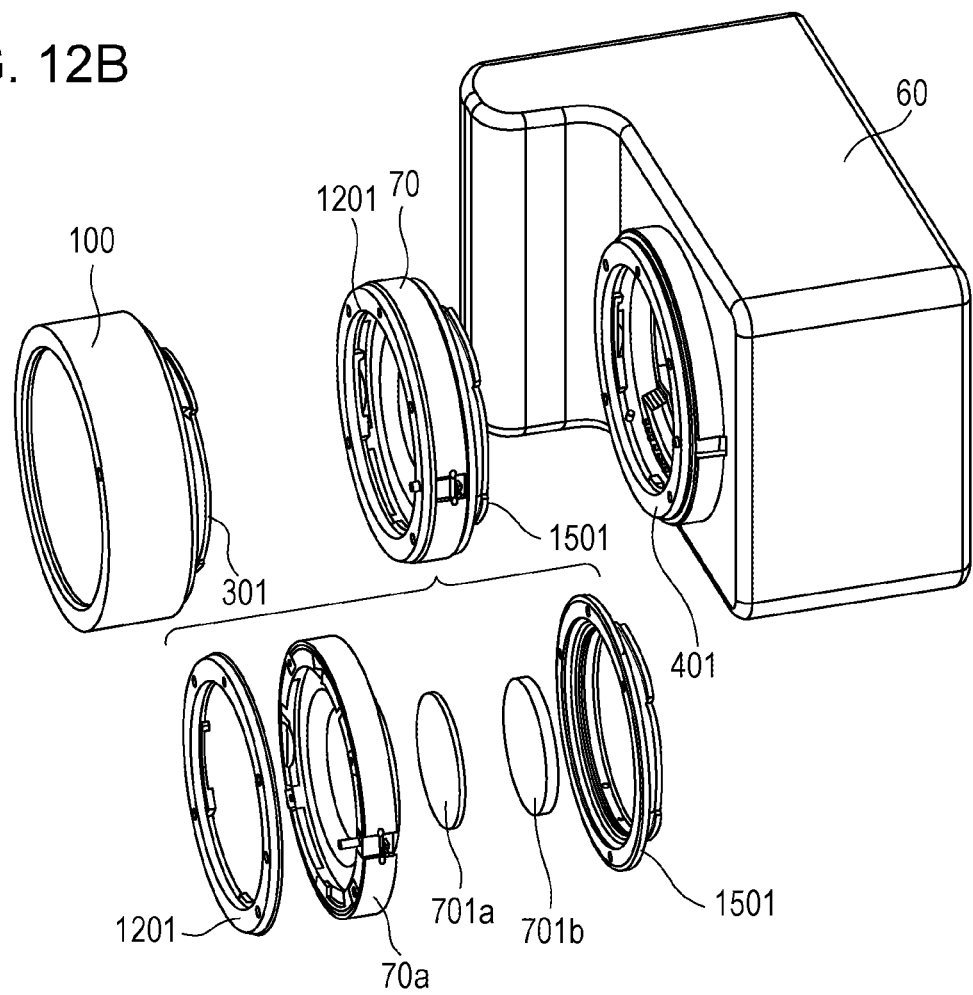

FIGS. 12A and 12B are diagrams for describing the second conversion adapter 70 that is mountable to a camera body 60 and the first lens 100. FIG. 12A illustrates an external perspective view of a state where the first lens 100 is mounted to the camera body 60 via the second conversion adapter 70, and FIG. 12B illustrates an external perspective view where the camera body 60, second conversion adapter 70, and first lens 100 have each been detached.

Now, in a case where a lens unit with a long flange focal distance is directly mounted to an imaging apparatus with a short flange focal distance, trouble will occur such as the focal point not being formed at an accurate position or the like, and imaging a subject in this way will result in an unnatural image being obtained. For example, the above problem will occur if the second lens unit 50 that has a long flange focal distance is mounted to the above-described camera body 10.

In the same way, in a case where a lens unit with a short flange focal distance is directly mounted to an imaging apparatus with a long flange focal distance, trouble will occur such as the focal point not being formed at an accurate position or the like, and imaging a subject in this way will result in an unnatural image being obtained. For example, the above problem will occur if the first lens 100 that has a short flange focal distance is mounted to the camera body 60 serving as a second imaging apparatus that has a longer flange focal distance than the above-described camera body 10.

Particularly, the camera body 10 and camera body 60, and the first lens 100 and second lens 50, have the same mount diameter, it is difficult for a user to judge which imaging apparatuses and which lens units have flange focal distances that are compatible for direct mounting.

Accordingly, it is preferable that only lens units that are compatible can be directly mounted to a certain imaging apparatus, so that imaging apparatuses and lens units that have mutually incompatible flange focal distances are not erroneously directly mounted.

Also, in a case of mounting an incompatible lens unit to an imaging apparatus, a conversion adapter needs to be interposed between the two to adjust the flange focal distance. However, in a case where one side of the conversion adapter is mounted to the imaging apparatus and a lens unit compatible with direct mounting to the imaging apparatus is mounted to the other side of the conversion adapter, the focal point may not be accurately formed, as described above. Accordingly, the one side and other side of the conversion adapter preferably have configurations to restrict imaging apparatuses and camera accessories that are directly mountable.

Specifically, in a case of mounting a lens unit having a long flange focal distance to an imaging apparatus having a short flange focal distance, a conversion adapter is preferable where one end side is only mountable to this imaging apparatus, and the other end side is only mountable to this lens unit. Also, in a case of mounting a lens unit having a short flange focal distance to an imaging apparatus having a long flange focal distance, a conversion adapter is preferable where one end side is only mountable to this imaging apparatus, and the other end side is only mountable to this lens unit.

The first conversion adapter 40 has the lens mount 1301 attached to an adapter barrel 40a by fastening screws (omitted from illustration), at one end side in the optical axis direction. This lens mount 1301 is an accessory mount that is detachable from the camera mount 201 provided to the camera body 10 described above.

A camera mount 1401 is attached to the adapter barrel 40a by fastening screws (omitted from illustration), at the other end side of the first conversion adapter 40 in the optical axis direction. This camera mount 1401 is a camera mount that is detachable from the lens mount 501 of the second lens 50. Note that the camera mount 1401 of the first conversion adapter 40 is attached so that the imaging plane of the imaging sensor 11 of the will be situated at a position corresponding to the flange focal distance of the second lens 50.

The second conversion adapter 70 has the lens mount 1501 attached to an adapter barrel 70a by fastening screws (omitted from illustration), at one end side in the optical axis direction. This lens mount 1501 is an accessory mount that is detachable from the camera mount 401 provided to the camera body 60.

The camera mount 1201 is attached to the adapter barrel 70a by fastening screws (omitted from illustration), at the other end side of the second conversion adapter 70 in the optical axis direction. This camera mount 1201 is a camera mount that is detachable from the lens mount 301 of the first lens 100, as described above.

Note that a first optical member 701*a* and a second optical member 701*b* are provided to the second conversion adapter 70, between the adapter barrel 70*a* and the lens mount 1501 in the optical axis direction. The first optical member 701*a* and second optical member 701*b* enable the second conversion adapter 70 to extend length of the flange focal distance of the first lens 100 in accordance with the imaging plane of the imaging sensor disposed in the camera body 60. While the optical members have been illustrated as two lenses for the sake of convenience, this is not restrictive.

Configuration of First Conversion Adapter 40

Figure 13A:
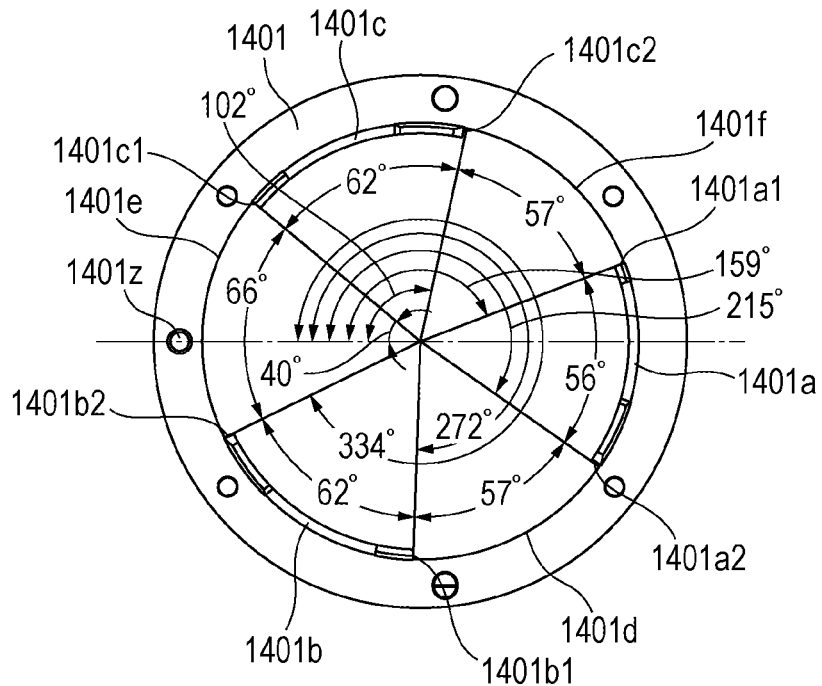
FIGS. 13A through 13C is a diagram for exemplarily describing angle so disposing bayonet claws in a camera mount provided on one end of the first conversion adapter.
Figure 13B:
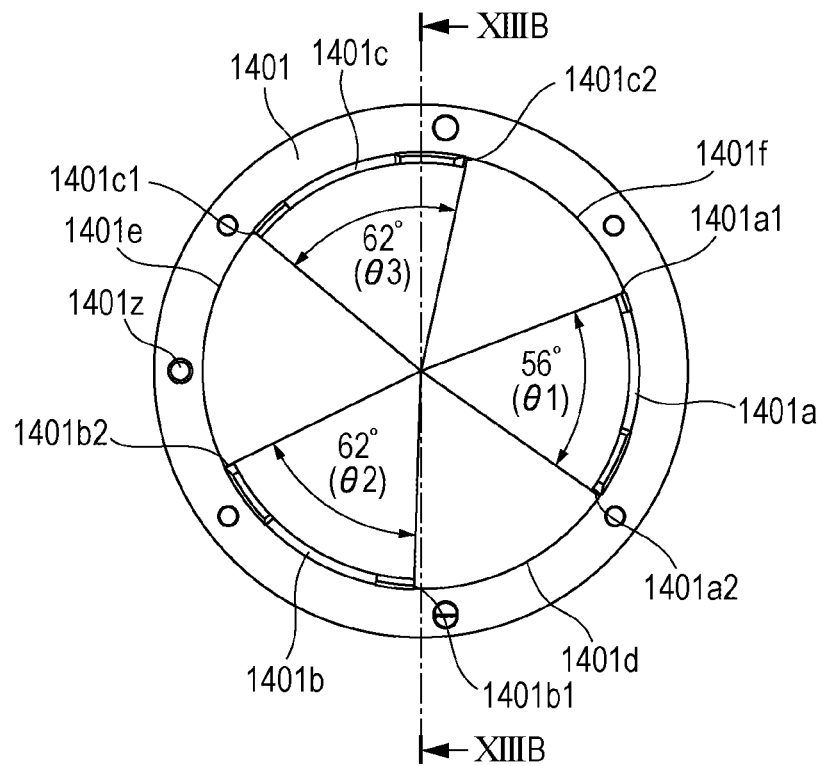
Figure 13C:
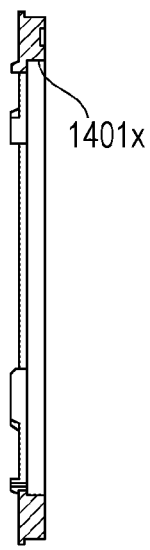

Next, the angles (phases) at which bayonet claws are disposed on the circumferential direction of the camera mount and lens mount of the first conversion adapter 40 will be described with reference to FIG. 13A through FIG. 17D. FIGS. 13A through 13C are diagrams for exemplarily describing displacement angles of bayonet claws in the camera mount 1401 provided on one end of the first conversion adapter 40. FIG. 13A is a diagram illustrating angle ranges that camera claws and camera recesses occupy in the circumferential direction of the camera mount 1401 with the lock pin 1401*z* as a reference, as viewed from the rear face side (camera body 10 side). FIG. 13B is a diagram illustrating angle ranges that multiple camera claws 1401*a* through 1401*c* occupy in the circumferential direction of the camera mount 1401, as viewed from the rear face side (camera body 10 side). FIG. 13C is a cross-sectional diagram taken along cross-section XIIIB-XIIIB in FIG. 13B.

The first conversion adapter 40 is a mount adapter used for mounting the second lens unit 50 that has a long flange focal distance to the camera body 10 that has a short flange focal distance. Accordingly, it is preferable for the first conversion adapter 40 to be configured such that the camera body 60 that has a long flange focal distance cannot be directly mounted to the lens mount 1301, and the first lens 100 that has a short flange focal distance cannot be directly mounted to the camera mount 1401. According to this configuration, the positional relation of claws and recesses can be satisfied so that the lens mount 1301 provided to one end (first end) of the first conversion adapter 40 and the camera mount 1401 provided to the other end (second end) cannot each be directly mounted.

A first camera claw 1401*a*, second camera claw 1401*b*, and third camera claw 1401*c*, are provided in order, to the camera mount 1401 in the circumferential direction (inner radial direction). When viewing the camera mount 1401 from the rear face side as illustrated in FIG. 13A, the camera claw that is provided at a position farthest from the lock pin 1401*z* is the first camera claw 1401*a*. The second camera claw 1401*b* and third camera claw 1401*c* are then consecutively provided in order from the first camera claw 1401*a* in a clockwise direction.

Also, recesses which are a first camera recess 1401*d*, second camera recess 1401*e*, and third camera recess 1401*f* are provided in order, to the camera mount 1401 in the circumferential direction (inner radial direction). When viewing the camera mount 1401 from the rear face side as illustrated in FIG. 13A, the recess that is provided at a position nearest to the lock pin 1401*z* is the second camera recess 1401*e*. The third camera recess 1401*f* and first camera recess 1401*d* are then consecutively provided in order from the second camera recess 1401*e* in a clockwise direction.

As illustrated in FIG. 13C, a fitting member 1401*x* that restricts movement of the camera accessory in a direction parallel to the optical axis when the camera accessory is mounted, is provided to the camera mount 1401 side. In the present embodiment, the diameter of the fitting member 1401*x* in a direction orthogonal to the optical axis at the camera mount 1401 side is the mount diameter.

The way of bayonet coupling of the first conversion adapter 40 and second lens 50 is the generally the same as the way of bayonet coupling of the camera body 10 and first lens 100 described above, so description will be omitted.

Note that the end portions of the camera claws 1401*a*, 1401*b*, and 1401*c*, in the circumferential direction, will be referred to as first end portion 1401*a*1, second end portion 1401*a*2, third end portion 1401*b*1, fourth end portion 1401*b*2, fifth end portion 1401*c*1, and end portion 1401*c*2, for the sake of description. The end portions are denoted with part numerals in order from the first camera claw 1401*a* in the clockwise direction, when viewing the camera mount 1401 from the rear face side, as described above.

As illustrated in FIG. 13A, the angles that the camera claws and camera recesses occupy in the circumferential direction of the camera mount 1401 (angle ranges) in the first conversion adapter 40 according to the present embodiment are stipulated as follows. For the first camera claw 1401*a*, the angle $\theta 1=56°$, for the second camera claw 1401*b*, the angle $\theta 2=62°$, and for the third camera claw 1401*c*, the angle $\theta 3=62°$. Also, for the first camera recess 1401*d*, the angle is 57°, for the second camera recess 1401*e*, the angle is 66°, and for the third camera recess 1401*f*, the angle is 57°. That is to say the camera mount 1401 has different angles for the camera claws with respect to the above-described camera mount 201 of the camera body 10, but the angles of the camera recesses are the same.

Also, when viewing the camera claws from the rear face side of the first conversion adapter 40, the angles where the camera claws are disposed on the circumferential direction of the camera mount 1401 with the position of the lock pin 402 (referred to as reference position) as a reference are stipulated as follows. The first camera claw 1401*a* is disposed between 159° to 215° with the reference position as a start point. The second camera claw 1401*b* is disposed between 272° to 334° with the reference position as a start point. The third camera claw 1401*c* is disposed between 40° to 102° with the reference position as a start point.

Figure 14A:
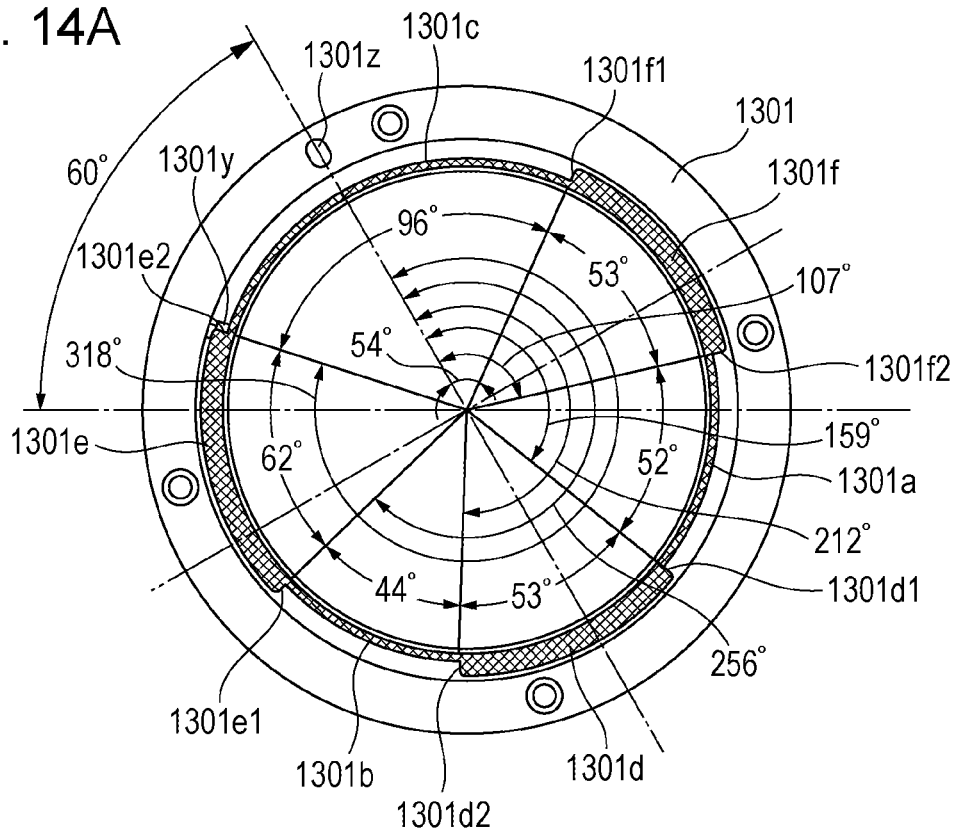
FIGS. 14A and 14B are diagrams exemplarily describing angle so disposing bayonet claws in the lens mount provided on the other end of the first conversion adapter.
Figure 14B:
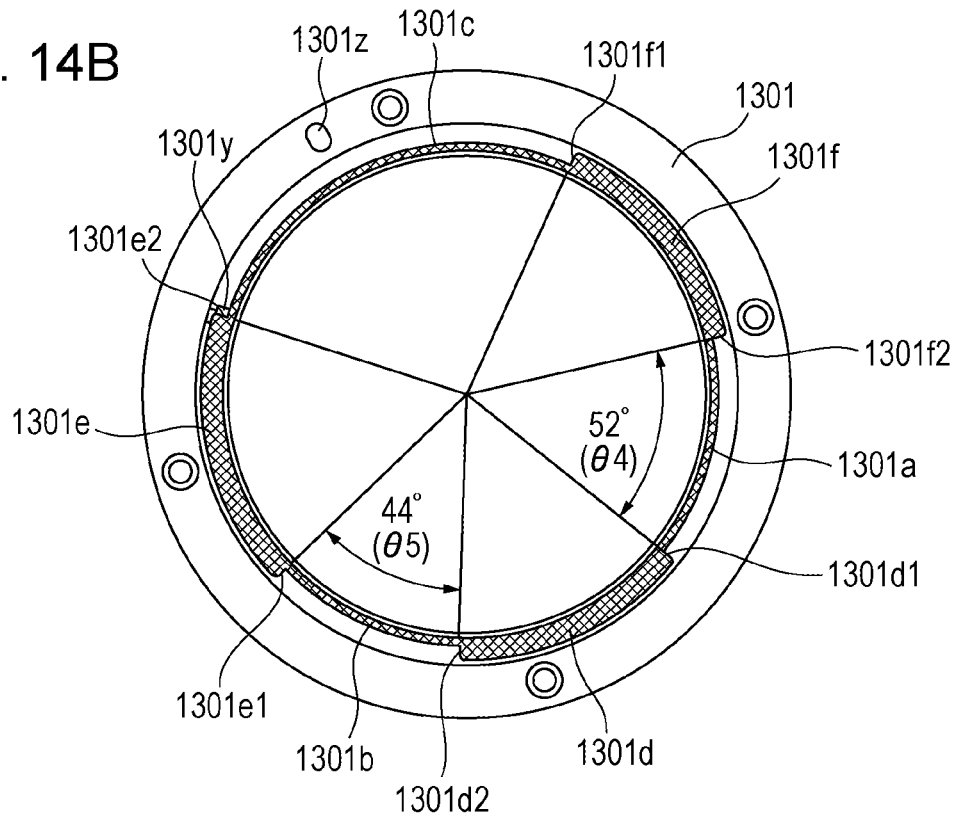

Next, FIGS. 14A and 14B are diagrams exemplarily describing angles of disposing the bayonet claws on the lens mount 1301 provided to the other end of the first conversion adapter 40. FIG. 14A is a diagram illustrating angle ranges that camera claws and camera recesses occupy in the circumferential direction of the camera mount 1401 with the lock groove 1301*z* as a reference, as viewed from the rear face side. FIG. 14B is a diagram illustrating angle ranges that multiple lens recesses 1301*a* through 1301*c* occupy in the circumferential direction of the camera mount 1301, as viewed from the rear face side.

The angles (angle ranges) that the lens recesses occupy in the circumferential direction of the lens mount 1301 are, represented by $\theta 4$ as the angle of the first lens recess 1301*a* and $\theta 5$ as the angle of the second lens recess 1301*b*, as illustrated in FIG. 14B. Note that the angle so disposing the claws and recesses on the lens mount 1301 of the first conversion adapter 40 is the same as the lens mount 301 of the first lens 100 described above, and accordingly description will be omitted.

The angles of the claws and recesses in the circumferential direction, on the lens mount 1301 and camera mount 1401 provided to the first conversion adapter 40, will be compared. For example, at the lens mount 1301 side, the angle θ5 of the second lens recess 1301*b* having the smallest angle is 44°, whereas, at the camera mount 1401 side, the angle θ1 of first camera claw 1401*a* having the smallest angle is 56°. That is to say, the claw having the smallest angle at the camera mount 1401 side is larger than the recess having the smallest angle at the lens mount 1301 side (θ5<θ1). In this case, of the recesses on the lens mount 1301 side and the claws on the camera mount 1401 side, at least one or more lens recess and camera claws will interfere with each other. Accordingly, even if an attempt is made to mount the lens unit to the camera body so that the optical axis at the camera mount 1401 side and lens mount 1301 side are generally parallel, the claws and recesses interfere, so the lens unit cannot be mounted to the camera body.

Figure 15A:
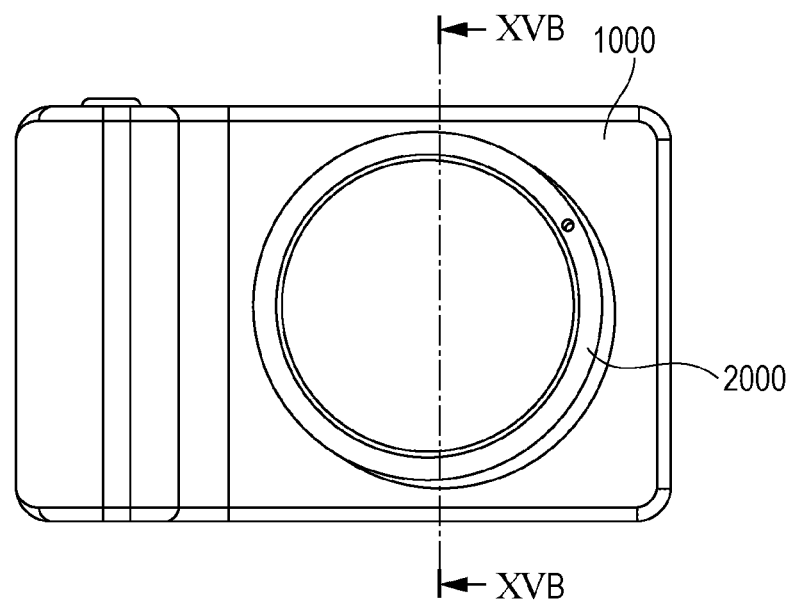
FIGS. 15A and 15B are diagrams exemplarily describing a mounting method of a predetermined imaging apparatus and a predetermined lens unit having claws and recesses that interfere with each other.
Figure 15B:
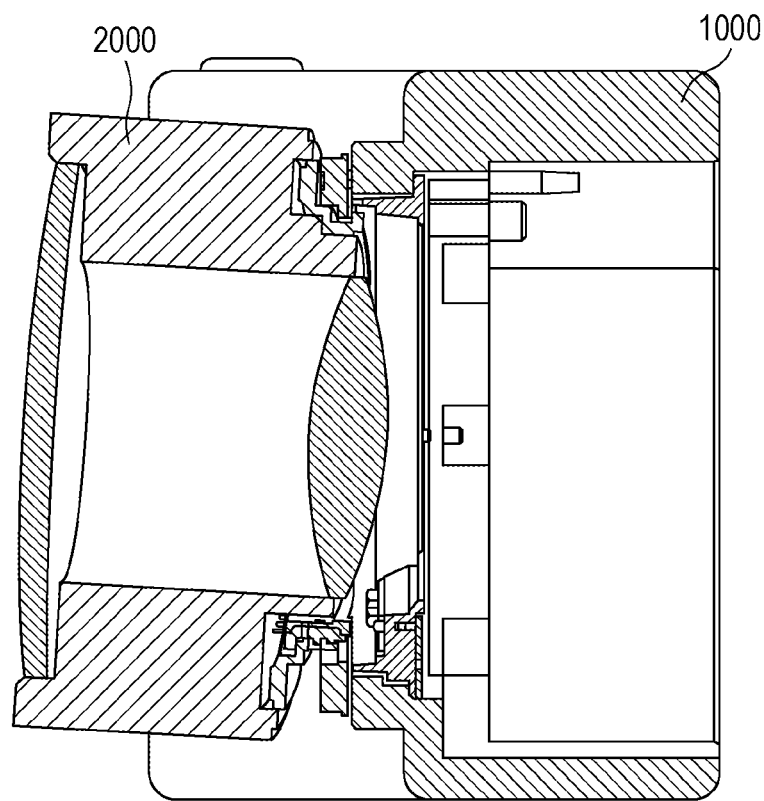

However, if only one claw and recess are interfering, there may be cases where claws of the camera mount side can be inserted into recesses of the lens mount side. FIGS. 15A and 15B are diagrams exemplarily describing a mounting method of a predetermined imaging apparatus 1000 and a predetermined lens unit 2000 having claws and recesses that interfere with each other. FIG. 15A is a diagram exemplarily describing a frontal view of partway through mounting a predetermined lens unit to a predetermined imaging apparatus that have claws and recesses that interfere with each other. FIG. 15B is a cross-sectional view taken along cross-section XVB-XVB in FIG. 15A.

For example, in a state where the optical axis of the lens mount side is obliquely inclined as to the optical axis of the camera mount side, one end of a camera claw is inserted into a lens recess, and from this state, the lens mount and camera mount are rotated relatively to each other, as illustrated in FIGS. 15A and 15B. In this case, even if the camera claws and lens recesses originally interfere with each other, this interference with each other is resolved during the relative rotation of the lens mount and camera mount, and transition can be made to a state where the camera claw is inserted into this lens recess. In this case, if there are no other camera claws and lens recesses interfering, the lens unit can be mounted to the camera body.

Accordingly, the claws and recesses on the lens mount 1301 side and camera mount 1401 side are disposed such that the angle of a predetermined lens recess adjacent to a reference lens claw is smaller than the angle of two camera claws adjacent to a reference camera claw. Specifically, in the present embodiment, the angles θ4 and θ5 of the first lens recess 1301*a* and second lens recess 1301*b* adjacent to the first lens claw 1301*d* are smaller than the angles θ1 and θ2 of the first camera claw 1401*a* and second camera claw 1401*b* adjacent to the first camera recess 1401*d*. That is to say, θ4 (52°) is smaller than θ1 (56°), and θ5 (44°) is smaller than θ2 (62°) (θ4<θ1, θ5<θ2). Accordingly, even if an attempt is made to insert the first lens claw 1301*d* into the first camera recess 1401*d*, the second lens claw 1301*e* interferes with the second camera claw 1401*b* in a sure manner, as well does the third lens claw 1301*f* with the first camera claw 1401*a*, as illustrated in FIGS. 16A and 16B.

Figure 16A:
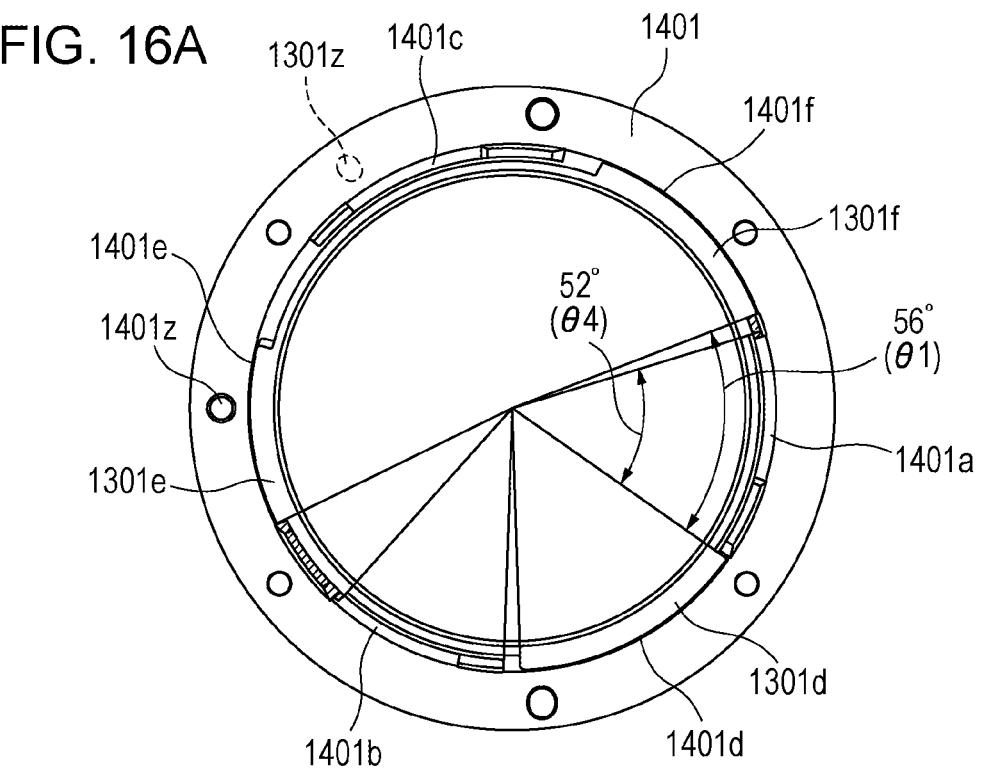
FIGS. 16A and 16B are diagrams exemplarily describing the way in which claws interfere with each other when attempting to mount the lens mount side to the camera mount side according to an embodiment of the present invention.
Figure 16B:
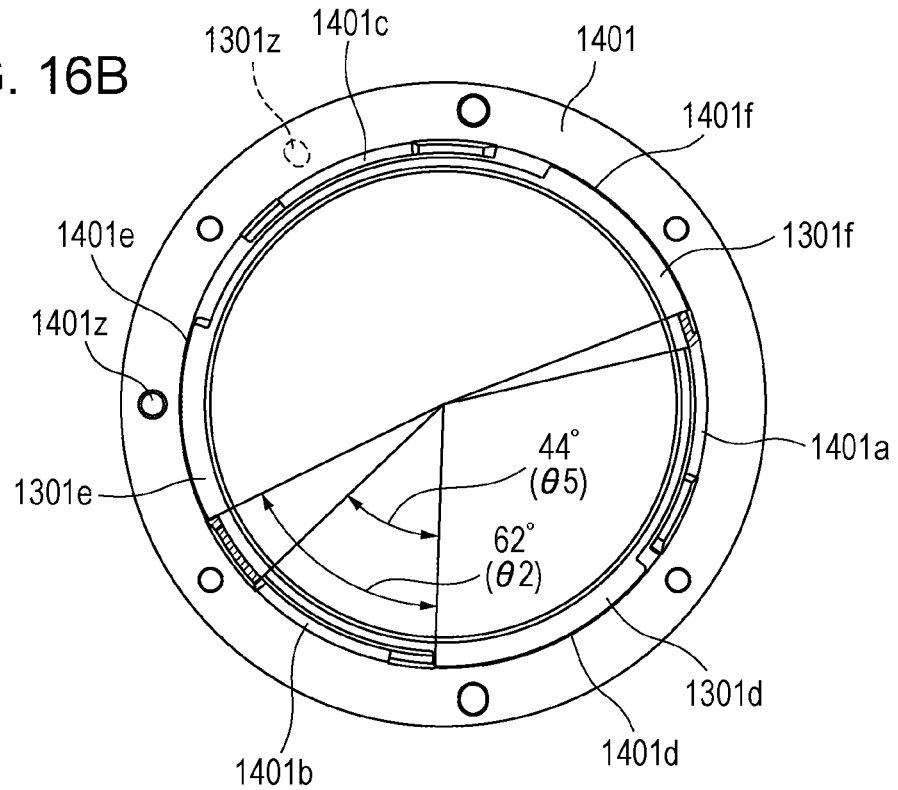

FIGS. 16A and 16B are diagrams exemplarily describing the way in which claws interfere with each other when attempting to mount the lens mount 1301 side to the camera mount 1401 side according to the embodiment of the present invention. FIG. 16A illustrates the way in which the third lens claw 1301*f* and the first camera claw 1401*a* interfere, and FIG. 16B illustrates the way in which the second lens claw 1301*e* and the second camera claw 1401*b* interfere.

As described above, incompatible lens units and imaging apparatuses, and the mount portions of conversion adapters are configured so that two claws of each other out of the claws that an incompatible lens unit and imaging apparatus have interfere with each other in the present embodiment. According to this configuration, the risk of an incompatible lens unit being erroneously mounted to an imaging apparatus, or an incompatible lens unit and imaging apparatus being erroneously mounted to mount units provided to both ends of a conversion adapter, can be reduced.

However, even in a case where the above conditions are satisfied, there may be cases where, when attempting to insert three claws into incompatible recesses, for example, two claws are inserted into recesses depending on the angles of the claws and recesses. Accordingly, the present embodiment further takes a configuration where the angles of at least two adjacent lens recesses are smaller than the angles of all camera claws. Specifically, in the present embodiment, the angles θ4 and θ5 of the first lens recess 1301*a* and second lens recess 1301*b* in the circumferential direction are smaller than the angles θ1 through θ3 of the first through third camera claws 1401*a* through 1401*c* in the circumferential direction. That is to say, the relation between the claws and recesses at the lens mount 1301 side and the camera mount 1401 side according to the present embodiment satisfy θ4<θ1, θ4<θ2, θ4<θ3, θ5<θ1, θ5<θ2, and θ5<θ3.

Figure 17A:
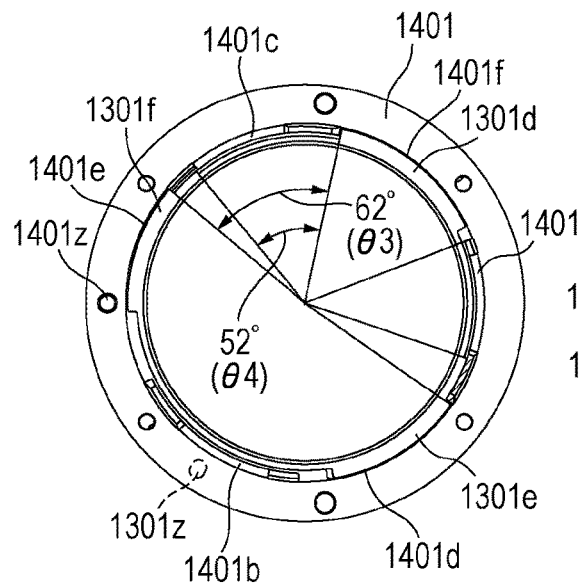
FIGS. 17A through 17D is a diagram exemplarily describing a case of attempting to insert incompatible claws into recesses at the lens mount side and camera mount side according to an embodiment of the present invention.
Figure 17C:
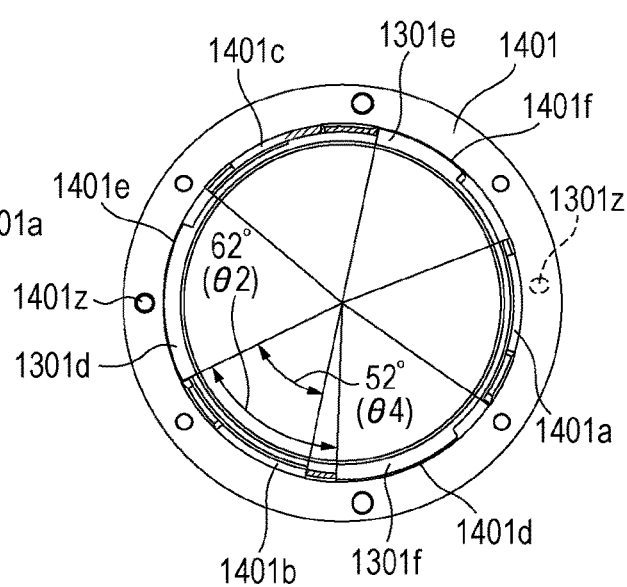
Figure 17B:
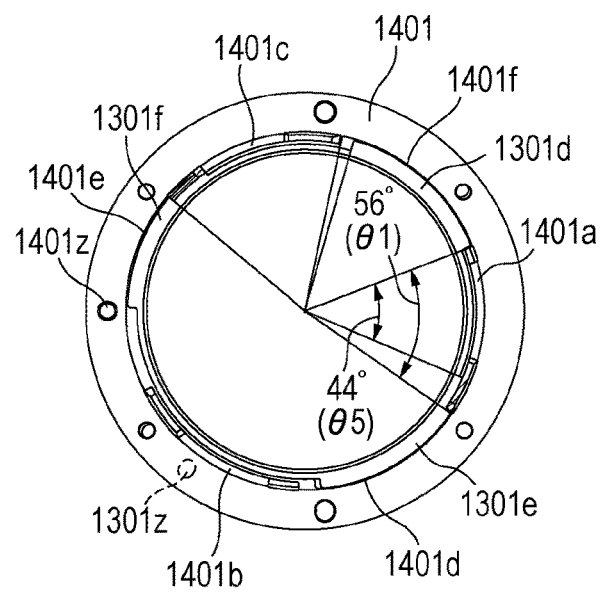
Figure 17D:
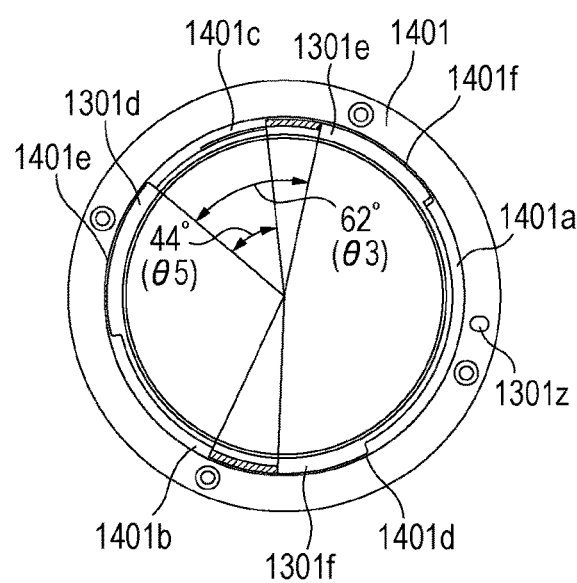

FIGS. 17A through 17D is a diagram exemplarily describing a case of attempting to insert incompatible claws into recesses at the lens mount 1301 side and camera mount 1401 side according to the embodiment of the present invention. FIG. 17A illustrates the way in which the third lens claw 1301*f* and third camera claw 1401*c* interfere in a case of attempting to insert the first lens claw 1301*d* into the third camera recess 1401*f*. FIG. 17B illustrates the way in which second lens claw 1301*e* and first camera claw 1401*a* interfere in a case of attempting to insert the first lens claw 1301*d* into the third camera recess 1401*f*. FIG. 17C illustrates the way in which the third lens claw 1301*f* and second camera claw 1401*b* interfere in a case of attempting to insert the first lens claw 1301*d* into the second camera recess 1401*e*. FIG. 17D illustrates the way in which the second lens claw 1301*e* and third camera claw 1401*c* interfere in a case of attempting to insert the first lens claw 1301*d* into the second camera recess 1401*e*.

As illustrated in FIGS. 17A through 17D, the lens claws and camera claws interfere in at least two places in the present embodiment, regardless of the relative rotational angle of the lens mount 1301 and camera mount 1401. According to this configuration, erroneous mounting of a lens unit and conversion adapter having the lens mount 301 or the lens mount 1301 to an imaging apparatus and conversion adapter having the camera mount 401 or the camera mount 1401 can be prevented even more effectively.

Configuration of Second Conversion Adapter 70

Next, the angles (phases) at which bayonet claws are disposed on the circumferential direction of the camera mount and lens mount of the second conversion adapter 70 will be described with reference to FIGS. 18A through 21D.

The second conversion adapter 70 is a mount adapter used for mounting the first lens 100 that has a short flange focal distance to the camera body 60 that has a long flange focal distance. The lens mount 1501 is provided at one end (third end) side of the second conversion adapter 70, and the camera mount 1201 is provided at the other end (fourth end). Note that the camera mount 1201 of the second conversion adapter 70 has the same configuration as the camera mount 201 of the camera body 10 that is the first imaging apparatus described above. Also, the lens mount 1501 of the second conversion adapter 70 has the same configuration as the lens mount 501 of the second lens 50 described above.

Accordingly, it is preferable for the second conversion adapter 70 to be configured such that the camera body 10 that has a short flange focal distance cannot be directly mounted to the lens mount 1501, and the second lens 50 that has a long flange focal distance cannot be directly mounted to the camera mount 1201. This configuration can be realized by satisfying the positional relation of claws and recesses so that the lens mount 1501 provided to one end (third end) of the second conversion adapter 70 and the camera mount 1201 provided to the other end (fourth end) cannot each be directly mounted.

Figure 18A:
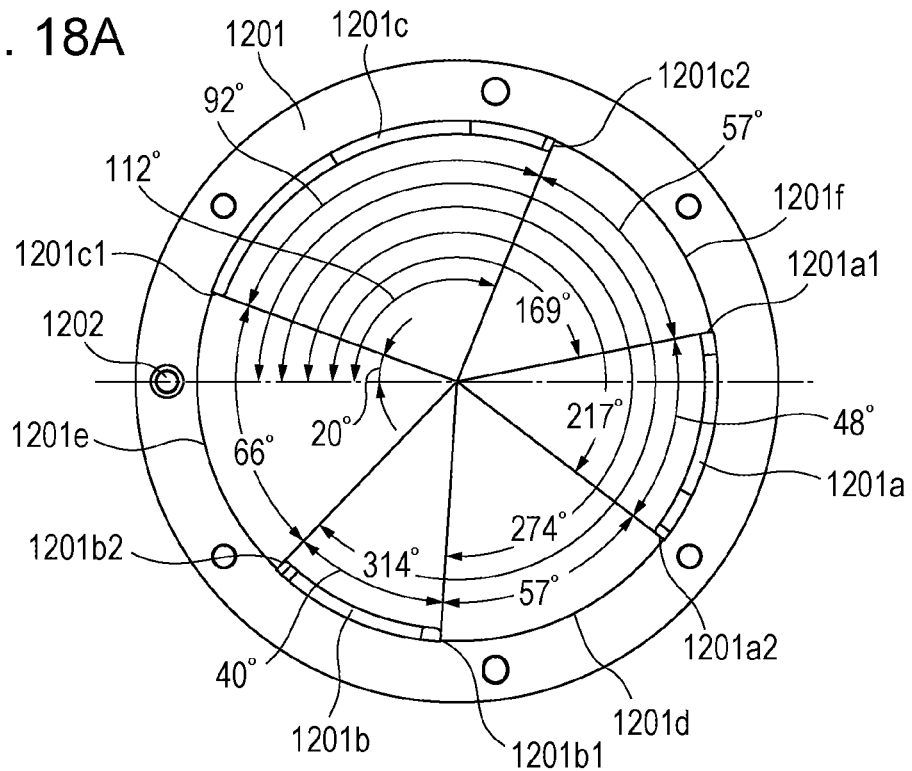
FIGS. 18A and 18B are diagrams exemplarily describing angle so disposing bayonet claws in the camera mount provided on one end of the second conversion adapter.
Figure 18B:
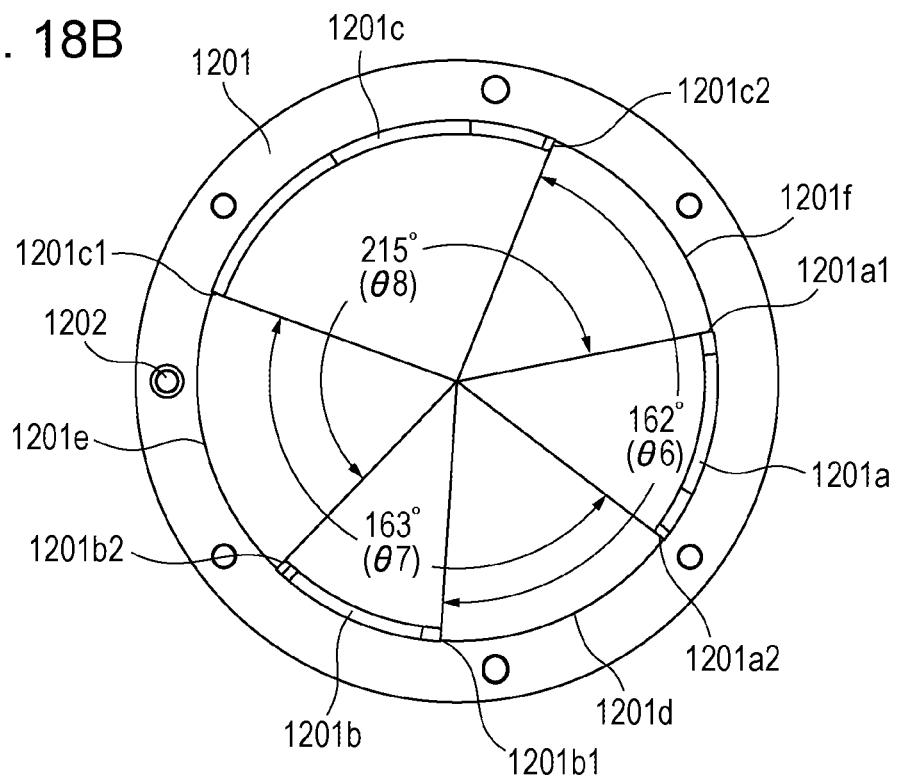

FIGS. 18A and 18B are diagrams exemplarily describing angles of disposing bayonet claws in the camera mount 1201 provided on one end of the second conversion adapter 70. FIG. 18A is a diagram illustrating angle ranges that camera claws and camera recesses occupy in the circumferential direction of the camera mount 1201 with the lock pin 202 as a reference, as viewed from the rear face side. FIG. 18B is a diagram illustrating angle ranges that, regarding multiple camera claws 1201a through 1201c, the claws occupy in the circumferential direction of the camera mount 1201, as viewed from the rear face side. Note that the angles of disposing the claws and recesses on the camera mount 1201 of the second conversion adapter 70 are the same as the camera mount 1201 of the camera body 10 described earlier, so description will be omitted.

As illustrated in FIG. 18B, the angle from the sixth end 1201c2 of the third camera claw 1201c to the third end 1201b1 of the second camera claw 1201b, in the circumferential direction of the camera mount 1201 including the first camera claw 1201a, is θ6 (162°). The angle from the second end 1201a2 of the first camera claw 1201a to the fifth end 1201c1 of the third camera claw 1201c, in the circumferential direction of the camera mount 1201 including the second camera claw 1201b, is θ7 (163°). The angle from the fourth end 1201b2 of the second camera claw 1201b to the first end 1201a1 of the first camera claw 1201a, in the circumferential direction of the camera mount 1201 including the third camera claw 1201c, is θ8 (215°).

Figure 19A:
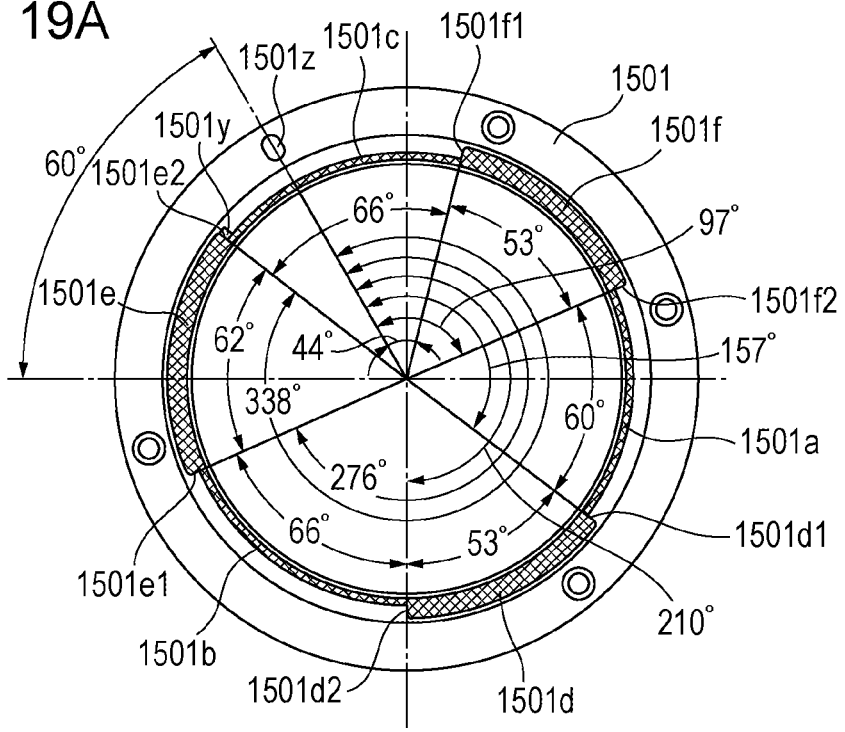
FIGS. 19A through 19C are diagrams exemplarily describing angle so disposing bayonet claws in a lens mount provided on the other end of the second conversion adapter.
Figure 19B:
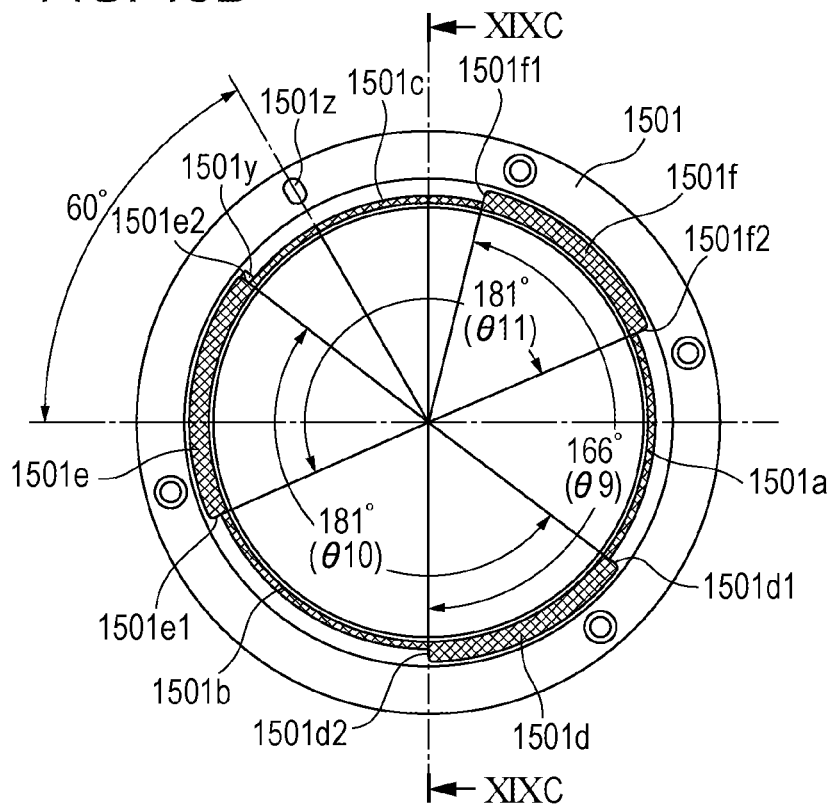
Figure 19C:
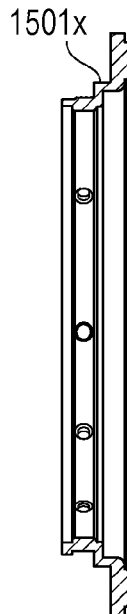

Next, FIGS. 19A through 19C are diagrams exemplarily describing angle so disposing bayonet claws in a lens mount 1501 provided on the other end of the second conversion adapter 70. FIG. 19A is a diagram illustrating angle ranges that lens claws and lens recesses occupy in the circumferential direction of the lens mount 1501 with the lock pin 1501z as a reference, as viewed from the rear face side. FIG. 19B is a diagram illustrating angle ranges where recesses are provided regarding the multiple lens recesses 1501a through 1501c in the circumferential direction of the lens mount 1501, as viewed from the rear face side. FIG. 19C is a cross-sectional diagram taken along cross-section XIXC-XIXC in FIG. 19B.

A first lens claw 1501d, second lens claw 1501e, and third lens claw 1501f, are provided in order, to the camera mount 1501 in the circumferential direction (inner radial direction). Note that in a case of viewing the lens mount 1501 from the rear face side as illustrated in FIG. 19A, the lens claw that is provided at a position farthest from the lock groove 1501z is the first lens claw 1501d. The second lens claw 1501e and third lens claw 1501f are then consecutively provided in order from the first lens claw 1501d in a clockwise direction.

Also, recesses which are a first lens recess 1501a, second lens recess 1501b, and third lens recess 1501c are provided in order, to the lens mount 1501 in the circumferential direction (inner radial direction). Note that in a case of viewing the lens mount 1501 from the rear face side as illustrated in FIG. 19A, the recess that is provided at a position nearest to the lock groove 1501z is the third lens recess 1501c. The first lens recess 1501a and second lens recess 1501b are then consecutively provided in order from the third lens recess 1501c in a clockwise direction.

Note that the end portions of the lens claws 1501d, 1501e, and 1501f, in the circumferential direction, will be referred to as first end portion 1501d1, second end portion 1501d2, third end portion 1501e1, fourth end portion 1501e2, fifth end portion 1501f1, and sixth end portion 1501f2, for the sake of description. The end portions are denoted with part numerals in order from the first lens claw 1501d in the clockwise direction, when viewing the lens mount 1501 from the rear face side, as described above.

As illustrated in FIG. 19A, the angles that the lens claws and lens recesses occupy in the circumferential direction of the lens mount 1501 (angle ranges) are stipulated as follows. The angle of the first lens claw 1501d is 53°, the angle of the second lens claw 1501e is 62°, and the angle of the third lens claw 1501f is 53°. That is to say, the angles of the lens claws on the lens mount 1501 side are the same as the angles of the lens claws on the lens mount 1301 side described earlier.

On the other hand, the angles of the lens recesses at the lens mount 1501 side differ from the angles of the lens recesses at the lens mount 1301 side described above. Specifically, the angle of the first lens recess 1501a is 60°, the angle of the second lens recess 1501b is 66°, and the angle of the third lens recess 1501c is 66°.

Also, when viewing the lens claws from the rear face side of the camera body 10, the angles in the clockwise direction where the lens claws are disposed on the circumferential direction of the lens mount 1501 with the position of the lock groove 1501z (referred to as reference position) as a reference are stipulated as follows. The first lens claw 1501d is disposed between 157° to 210° with the reference position as a start point. The second lens claw 1501e is disposed between 276° to 338° with the reference position as a start point. The third lens claw 1501f is disposed between 44° to 97° with the reference position as a start point.

As illustrated in FIG. 19C, a fitting member 1501x that restricts movement of the imaging apparatus in a direction parallel to the optical axis when mounted to the imaging apparatus is provided to the lens mount 1501 side. In the present embodiment, the diameter of the fitting member 1501x in a direction orthogonal to the optical axis at the camera mount 1501 side is the mount diameter. The mount diameters of the camera mounts and lens mounts described above are generally the same length.

As illustrated in FIG. 19B, the angle from the fifth end 1501f1 of the third lens claw 1501f to the second end 1501d2 of the second lens claw 1501d, in the circumferential direction of the lens mount 1501 including the first lens recess 1501a, is θ9 (166°). The angle from the first end 1501d1 of the first lens claw 1501d to the fourth end 1501e2 of the second lens claw 1501e, in the circumferential direction of the lens mount 1501 including the second lens recess 1501b, is θ10 (181°). The angle from the third end 1501e1 of the second lens claw 1501e to the sixth end 1501f2 of the third lens claw 1501f, in the circumferential direction of the lens mount 1501 including the third lens recess 1501c, is θ11 (181°).

The angles of the claws and recesses in the circumferential direction will be compared between the camera mount 1201 and lens mount 1501 provided to the second conversion adapter 70. For example, the angle (92°) of the third camera claw at the camera mount 1201 side is larger than the angles (66°) of the second and third lens recesses 1501b and 1501c that are the largest angle of the lens recesses at the lens mount 1501 side. That is to say, the angle of at least one camera claw at the camera mount 1201 side is larger than the angle of the lens recess having the largest angle at the lens mount 1501 side.

In this case, of the claws at the camera mount 1201 side and recesses at the lens mount 1501 side, at least one or more camera claw and lens recess interfere with each other. Accordingly, even if an attempt is made to mount the lens unit to the camera body so that the optical axis at the camera mount 1201 side and lens mount 1501 side are generally parallel to each other, the claws and recesses interfere, so the lens unit cannot be mounted to the camera body.

However, if only one claw and recess are interfering, there may be cases where claws of the camera mount side can be inserted into recesses of the lens mount side, in the same way as the description of the first conversion adapter made above. For example, there are cases where, in a state where the optical axis of the lens mount side is obliquely inclined as to the optical axis of the camera mount side, one end of a camera claw is inserted into a lens recess, and the lens mount and camera mount are rotated relative to each other, and the lens unit can be mounted to the camera body.

Figure 20A:
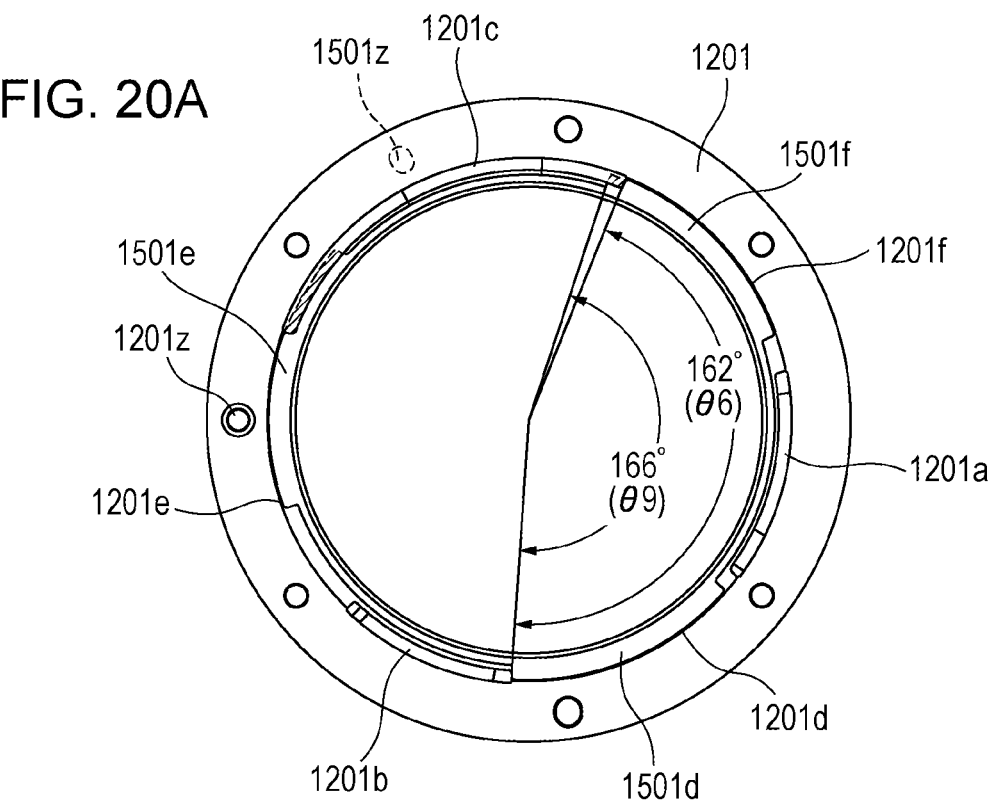
FIGS. 20A and 20B are diagrams exemplarily describing the way in which claws interfere with each other, when attempting to mount a reference claw at the lens mount side to a reference recess at the camera mount side according to an embodiment of the present invention.
Figure 20B:
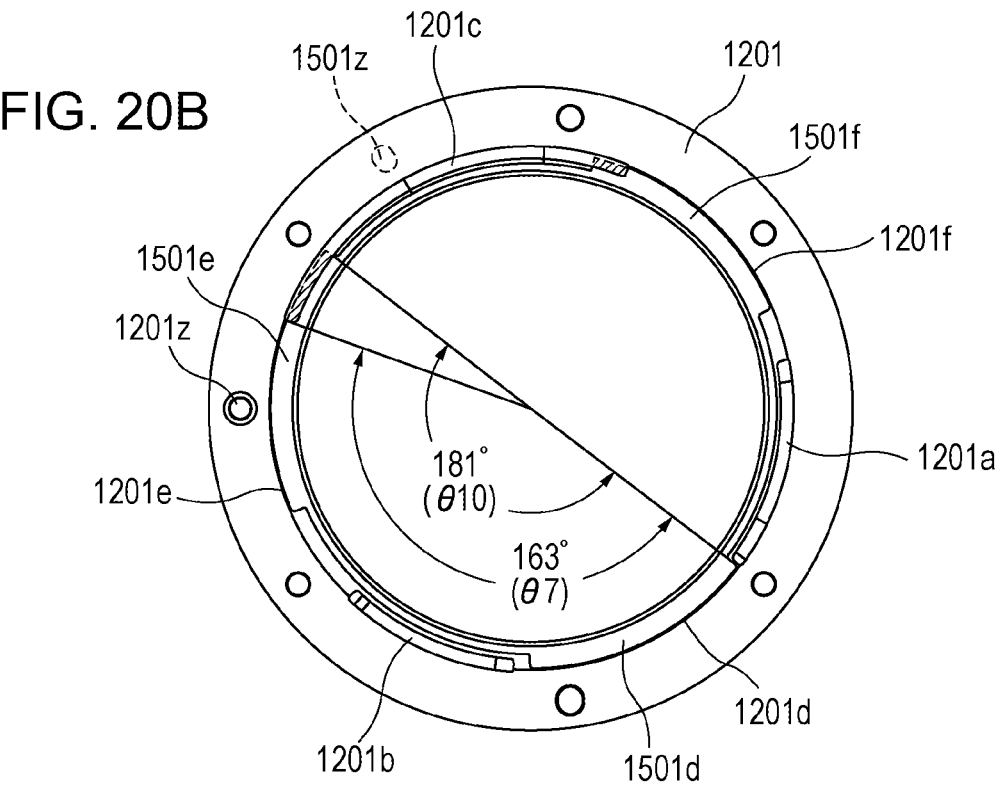

Accordingly, in the present embodiment, the claws and recesses at the camera mount 1201 side and the lens mount 1501 side are disposed so as to satisfy $\theta 6<\theta 9$ and $\theta 7<\theta 10$ in the circumferential direction. FIGS. 20A and 20B are diagrams exemplarily describing the way in which claws interfere with each other, when attempting to mount a reference claw at the lens mount 1501 side to a reference recess at the camera mount 1201 side according to the embodiment of the present invention. FIG. 20A illustrates the way in which the third lens claw 1501f and the third camera claw 1201c interfere, and FIG. 20B illustrates the way in which the second lens claw 1501e and the third camera claw 1201c interfere.

As illustrated in FIGS. 20A and 20B, in a case where the reference first lens claw 1501d is attempted to be inserted into the reference camera recess 1201d, for example, the third camera claw 1201c interferes with the second and third lens claws 1501e and 1501f.

That is to say, as viewed from the rear face side, the total sum of the angles of one reference lens claw, another lens claw adjacent thereto in the clockwise direction, and a lens recess situated between these lens claws, is taken as a first angle. Also, as viewed from the rear face side, the total sum of the angles of one reference camera recess, another camera recess adjacent thereto in the clockwise direction, and a camera claw portion situated therebetween, is taken as a second angle. Also, as viewed from the rear face side, the total sum of the angles of one reference lens claw, another lens claw adjacent thereto in the counterclockwise direction, and a lens recess situated between these lens claws, is taken as a first angle. Also, as viewed from the rear face side, the total sum of the angles of one reference camera recess, another camera recess adjacent thereto in the counterclockwise direction, and a camera claw portion situated therebetween, is taken as a fourth angle. According to the present embodiment, it is sufficient to layout the claws and recesses at the camera mount 1201 side and lens mount 1501 side such that the first angle described above is larger than the second angle, and the third angle is larger than the fourth angle.

According to this configuration, at least two lens claws and one camera claw interfere with each other. Thus, the risk of an incompatible lens unit being erroneously mounted to an imaging apparatus, or an incompatible lens unit and imaging apparatus being erroneously mounted to mount units provided to both ends of a conversion adapter, can be reduced.

However, even in a case where the above conditions are satisfied, there may be cases where, when attempting to insert three claws into incompatible recesses, for example, two claws are inserted into recesses depending on the angles of the claws and recesses. Accordingly, the claws and recesses at the camera mount 1201 side and lens mount 1501 side are disposed in the circumferential direction so as to satisfy $\theta 6<\theta 9$, $\theta 6<\theta 10$, $\theta 6<\theta 11$, $\theta 7<\theta 9$, $\theta 7<\theta 10$, and $\theta 7<\theta 11$. That is to say, as viewed from the rear face side, the total sum of the angles of two claws other than the reference claw described above, and a lens recess situated therebetween, is taken as a fifth angle. According to the present embodiment, it is sufficient to layout the claws and recesses at the camera mount 1201 side and lens mount 1501 side such that the second angle and fourth angle described above are smaller than any of the first angle, third angle, and fifth angle.

Figure 21A:
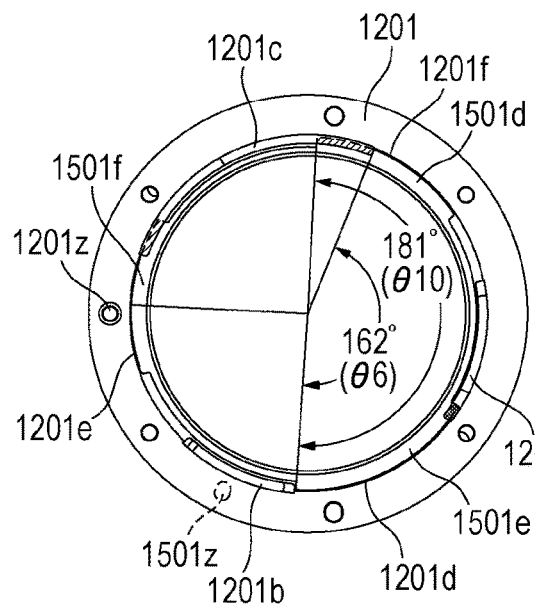
FIGS. 21A through 21D are diagrams exemplarily describing the way in which claws interfere with each other, when attempting to mount a claw other than the reference claw at the lens mount side to a reference recess at the camera mount side according to an embodiment of the present invention.
Figure 21C:
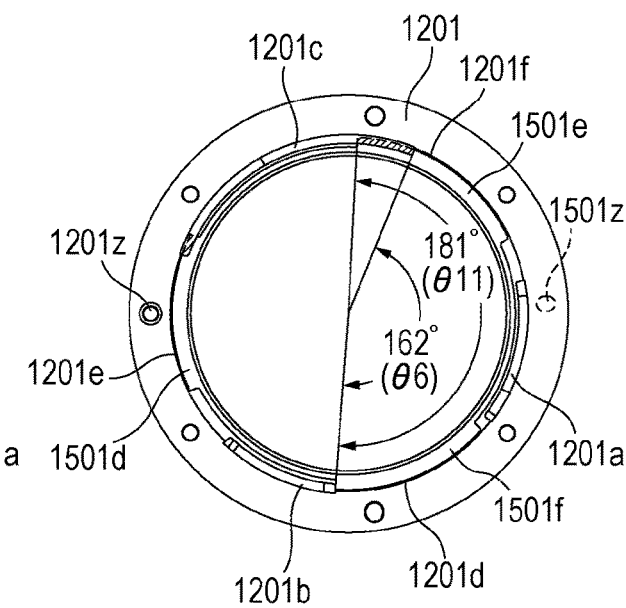
Figure 21B:
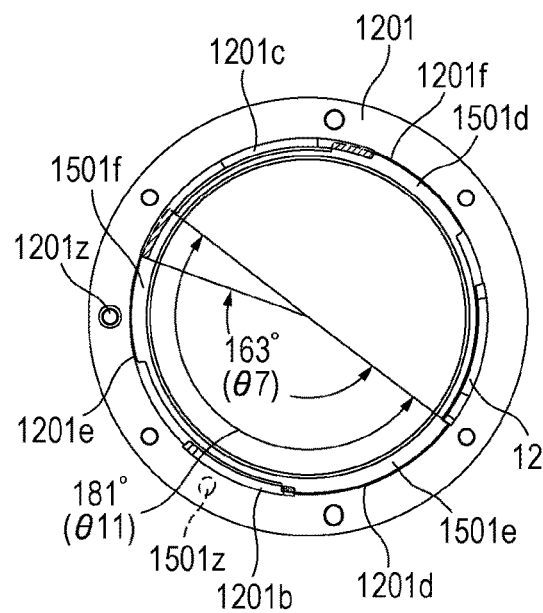
Figure 21D:
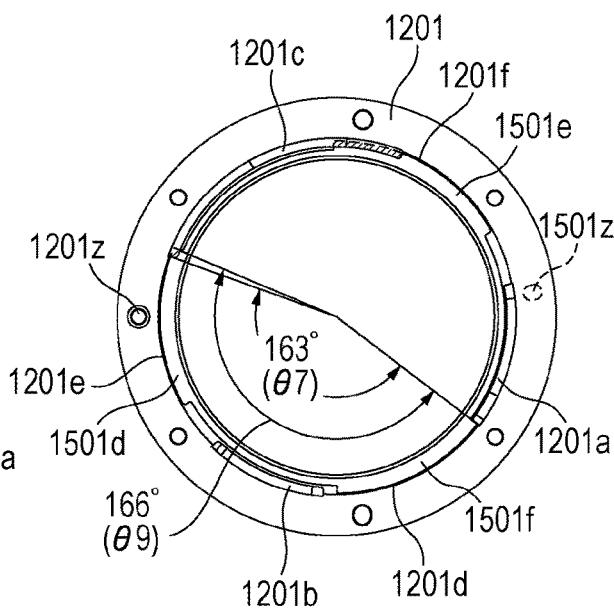

FIGS. 21A through 21D are diagrams exemplarily describing the way in which claws interfere with each other, when attempting to mount a claw other than the reference claw at the lens mount 1501 side to a reference recess at the camera mount 1201 side according to the embodiment of the present invention. FIG. 21A illustrates the way in which the first lens claw 1501d and the third camera claw 1201c interfere in a case of attempting to insert the second lens claw 1501e into the first camera recess 1201d. FIG. 21B illustrates the way in which the third lens claw 1501c and the third camera claw 1201c interfere in a case of attempting to insert the second lens claw 1501e into the first camera recess 1201d. FIG. 21C illustrates the way in which the second lens claw 1501e and the third camera claw 1201c interfere in a case of attempting to insert the third lens claw 1501f into the first camera recess 1201d. FIG. 21D illustrates the way in which the first lens claw 1501d and the third camera claw 1201c interfere in a case of attempting to insert the third lens claw 1501f into the first camera recess 1201d.

As illustrated in FIGS. 21A through 21D, at least two lens claws and one camera claw interfere, regardless of the relative rotation angle of the lens mount 1501 and camera mount 1201 according to the present embodiment. According to this configuration, erroneous mounting of a lens unit and conversion adapter having the lens mount 501 or the lens mount 1501 to an imaging apparatus and conversion adapter having the camera mount 201 or the camera mount 1201 can be prevented even more effectively.

Figure 22:
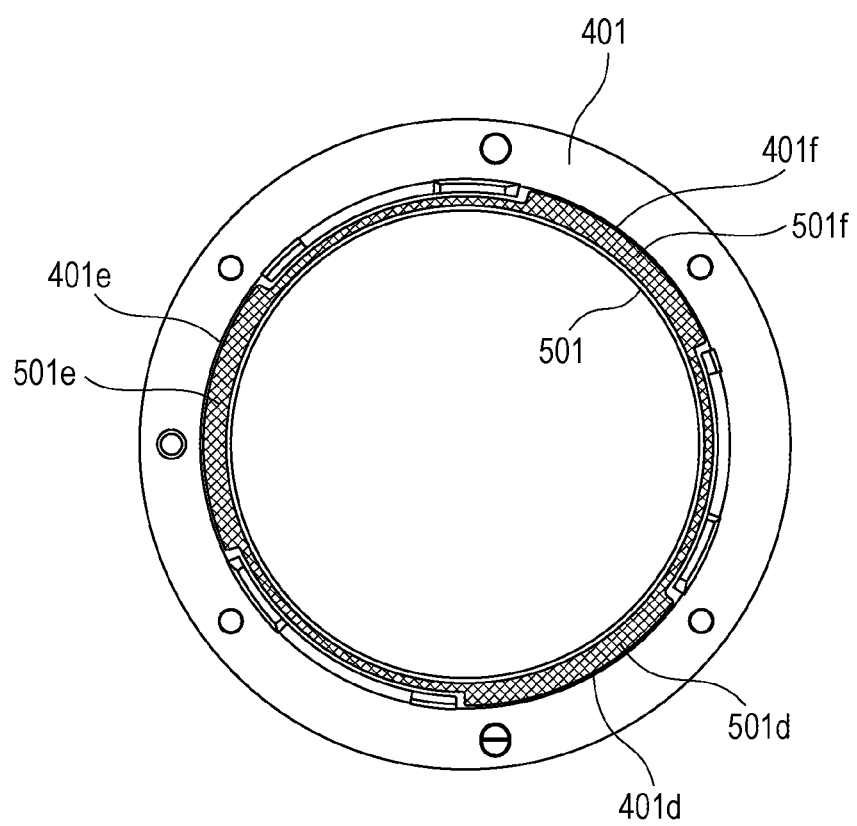
FIG. 22 is a diagram exemplarily describing a state in which claws provided to the camera mount side and lens mount side according to an embodiment of the present invention are engaged.

FIG. 22 is a diagram exemplarily describing a state in which claws provided to the camera mount 1401 side and lens mount 1501 side according to the embodiment of the present invention are engaged. Note that FIG. 22 illustrates a state in which the camera mount 401 of the camera body 60 is engaging the lens mount 501 of the second lens 50. The first lens claw 1501d can be inserted into the first camera recess 1401d, as illustrated in FIG. 22. Also, the second lens claw 1501e can be inserted into the second camera recess 1401e. Further, the third lens claw 1501f can be inserted into the third camera recess 1401f. That is to say, the camera mount 1401 side and the lens mount 1501 side are a combination compatible with being directly mounted to each other. Note that the camera mount 1201 side and the lens mount 1301 side are a combination compatible with being directly mounted to each other, as illustrated in FIG. 10A.

As described above, the camera mount 401 (1401) corresponding to an imaging apparatus that has a long flange focal distance (e.g., the camera body 60), and the lens mount 501 (1501) corresponding to a lens unit that has a long flange focal distance (e.g., the second lens 50) can be directly mounted to each other. However, the camera mount 201 (1201) corresponding to an imaging apparatus having a short flange focal distance (e.g., the camera body 10) and the lens mount 501 (1501) corresponding to a lens unit that has a long flange focal distance (e.g., the second lens 50) cannot be directly mounted to each other. Also, the camera mount 201 (1201) corresponding to an imaging apparatus that has a short flange focal distance (e.g., the camera body 10) and the lens mount 301 (1301) corresponding to a lens unit that has a short flange focal distance (e.g., the first lens 100) can be directly mounted to each other. However, the camera mount 401 (1401) corresponding to an imaging apparatus that has a long flange focal distance (e.g., the camera body 60) and the lens mount 301 (1301) corresponding to a lens unit that has a short flange focal distance (e.g., the first lens 100) cannot be directly mounted to each other.

Accordingly, an imaging apparatus and camera accessory employing the configuration of the above-described embodiment can prevent erroneous mounting of an imaging apparatus and camera accessory that have generally the same mount diameter but are not mutually compatible.

Timing of Engaging of Claws and Contact of Contact Points

Figure 23:
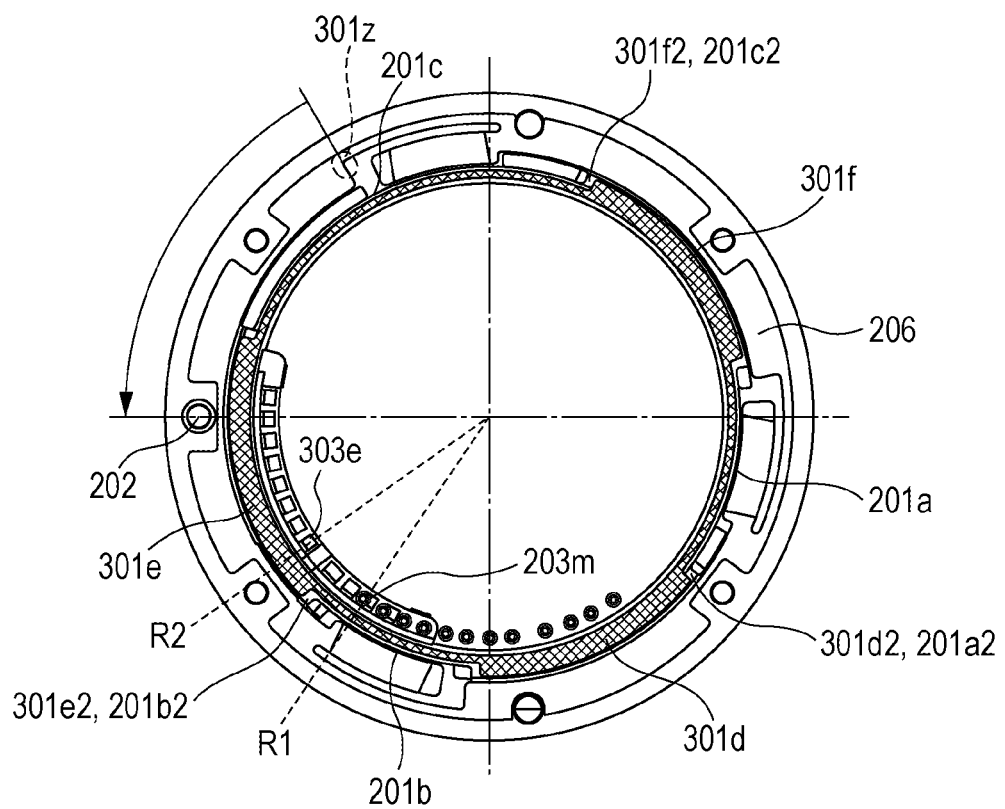
FIG. 23 is a diagram exemplarily describing contact timing for engaging of claws with each other and contact among contact points when detachably attaching the lens mount to the camera mount in an embodiment of the present invention.

The timing for engaging of corresponding claws with each other and contact among contact points when detachably attaching the camera mount 201 and lens mount 301 will be described with reference to FIG. 23. FIG. 23 is a diagram exemplarily describing timing for engaging of claws with each other and contact among electrical contact points (terminals) when detachably attaching the lens mount 301 to the camera mount 201 in the embodiment of the present invention. Note that FIG. 23 illustrates a case of viewing the camera mount 201 and lens mount 301 in the above-described mounted state, from the rear face side of the camera body 10.

As illustrated in FIG. 23, in the mounting start state of the lens mount 301 as to the camera mount 201, a camera-side contact pin 203m is positioned at a first position R1 in the circumferential direction of the mount. This contact pin 203m is the contact pin on the camera mount 201 side that first comes into contact with the contact faces at the lens side when mounting the lens mount 301 to the camera mount 201. That is to say, the first position R1 indicates a relative angle of the mounting start state of the lens mount 301 as to the camera mount 201, where the camera-side contact pin 203m, which comes into contact with the contact faces at the accessory side first, is situated.

As described above, none of the contact pins at the camera mount 201 side and none of the contact faces of the lens mount 301 side are in contact in this mounting start state. This configuration is realized by the positions in the optical axis direction where the contact holding member 203 and the contact face holding member 303 holding the respective terminals being different, by the contact holding member 203 and the contact face holding member 303 being stepped (have the height level difference). Note that the camera-side contact pin 203m on the camera mount 201 is disposed at the closest side (starting edge) of the first lens 100 as to the camera body 10 at the predetermined tier.

On the other hand, a contact face 303e is positioned at a second position R2 on the lens mount 301 side in FIG. 23. This contact face 303e is the contact face on the lens mount 301 side that first comes into contact with the contact pins at the camera side when mounting the lens mount 301 to the camera mount 201. Note that the accessory-side contact face 303e on the lens mount 301 is disposed at the closest (starting edge) of the first lens 100 as to the camera body 10. That is to say, the second position R2 indicates a relative angle of the mounting start state of the lens mount 301 as to the camera mount 201, where the accessory-side contact face 303e, which comes into contact with the contact pins at the camera side first, is situated.

Note that the first position R1 is synonymous with a position on the circumferential direction of the mount of a line (first line) connecting the optical axis and the contact pin 203m in the radial direction of the camera mount 201, when viewing the camera mount 201 from the optical axis direction. Also, the second position R2 is synonymous with a position on the circumferential direction of the mount of a line (second line) connecting the optical axis and the contact face 303e in the radial direction of the lens mount 301, when viewing the lens mount 301 from the optical axis direction.

As described above, in a mounting completed state of the lens mount 301 as to the camera mount 201, the second camera claw 201b at the camera side and the second lens claw 301e at the lens side are engaged with each other in the optical axis direction. When relatively rotating the camera mount 201 and lens mount 301 from the mounting start state toward the mounting completed state, the fourth end portion 201b2 side of the second camera claw 201b and the fourth end portion 301e2 side of the second lens claw 301e first start engaging.

That is to say, in the present embodiment, in the mounting start state of the lens mount 301 as to the camera mount 201, the engaging start position of the second camera claw 201b and the second lens claw 301e is included in the shortest range between the first line and the second line. In other words, in the mounting start state of the first lens 100 as to the camera body 10, the engaging start position of at least one claw each provided to the camera side and lens side with each other is included in an angular range where the terminal 203m and terminal 303e are connected in the circumferential direction of the mount.

Then, relatively rotating the mounts from this state starts engaging between the camera claws and lens claws, in a state where none of the terminals provided to the camera mount 201 side and terminals provided to the lens mount 301 side, are in contact. In other words, the camera claws and lens claws of the camera body 10 and first lens 100 according to the present embodiment start engaging at generally the same timing, before any of the contact pins and contact faces start contact with each other.

According to this configuration, contact of all contact pins and contact faces with each other is started in a state where the camera claws and lens claws of the camera body 10 and first lens 100 according to the present embodiment are engaged, and looseness therebetween has been reduced. In this case, contact between the contact pins and contact faces is started in a state where relative looseness between the camera body 10 and first lens 100 has been suppressed, so friction between the contact pins and contact faces due to attaching and detaching of the mounts can be suppressed.

Although a preferable embodiment of the present invention has been described, the present invention is not restricted to this embodiment, and various modifications and alterations can be made within the scope of the essence thereof. For example, a case of employing a digital camera has been described as an example of the imaging apparatus in the above-described embodiment, but imaging apparatuses other than digital cameras, such as digital video cameras, security cameras, and so forth, may be employed in the configuration.

Also, although a case of employing an interchangeable lens and an intermediate accessory (adapter device) such as a conversion adapter and an extension adapter (extension-tube), as an example of the camera accessory carrying out the present invention has been described in the embodiment above, this is not restrictive. Any sort of camera accessory may be employed as long as it is a device that has an accessory mount capable of directly connecting (coupling) to a camera mount provided to the above-described imaging apparatuses.

Although a configuration has been described in the above embodiment where both of the camera mount and accessory mount corresponding to each other have a pair of electric terminals through which electric connection is established in a mutually mounted state, this is not restrictive. For example, a configuration may be made having electric terminals that do not correspond to each other. For example, a configuration may be made where a terminal that the camera body 10 does not have is provided to a camera accessory mountable to the camera body 10.

Also, although a case has been described in the above embodiment where each mount has three claws in the circumferential direction, the number of claws is not restricted to three, as long as the conditions of the above-described embodiment are satisfied.

A configuration may be made where each of the three claws provided to the mounts in the above-described embodiment is further divided. That is to say, a configuration may be made where one claw is one claw group made up of multiple claws. A case where a groove is provided to one claw falls under this, for example. In this case, the ranges of angles of claw groups disposed in the circumferential direction of the mounts is the same as those in the embodiment described above.

Also, although a case has been described in the above embodiment where the mount diameter of each mount is the inner diameter of a fitting portion provided to each mount, in a direction orthogonal to the optical axis, this is not restrictive. For example, at each mount, an inner diameter of which the radius is the distance from the center (optical axis) of each mount to multiple terminals may be used as the mount diameter, or an inner diameter of which the radius is the distance from the center (optical axis) of each mount to a claw or recess may be used as the mount diameter.

Although a configuration has been described in the above embodiment where a device having one of a camera mount and an accessory mount is actually rotated as to a device having the other mount, thereby bayonet-coupling the devices to each other, this is not restrictive. For example, a configuration may be employed where a camera mount and accessory mount are relatively rotated, and the camera mount and accessory mount are bayonet-coupled. Specifics of this will be described in detail below.

Figure 25A:
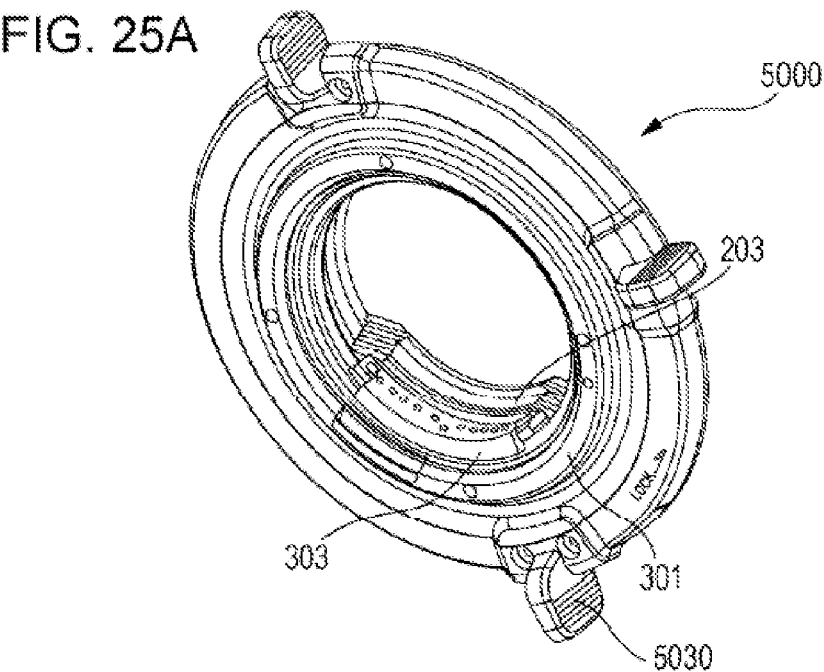
FIGS. 25A through 25C are diagrams for exemplarily describing a non-coupled state of the mount mechanism according to the modification of the present invention.
Figure 25B:
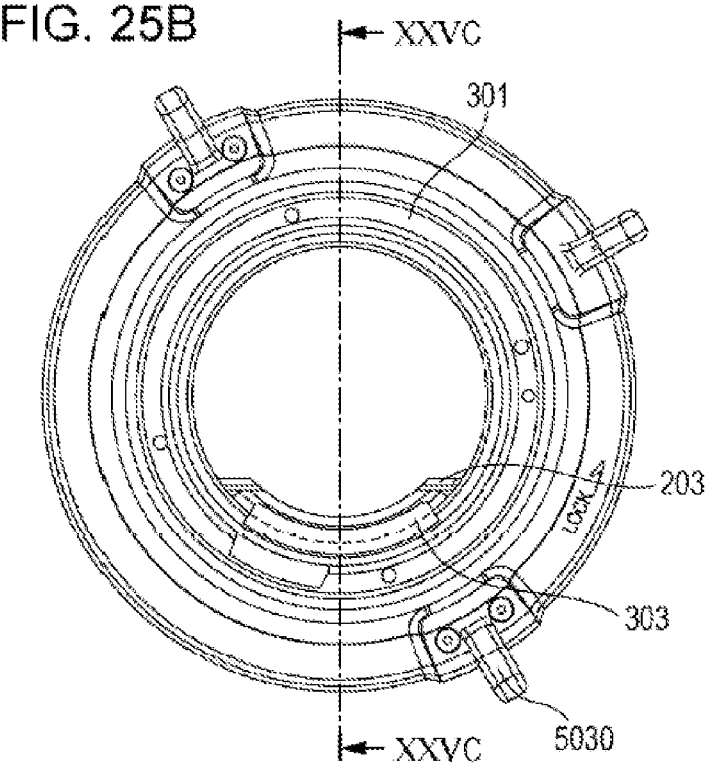
Figure 25C:
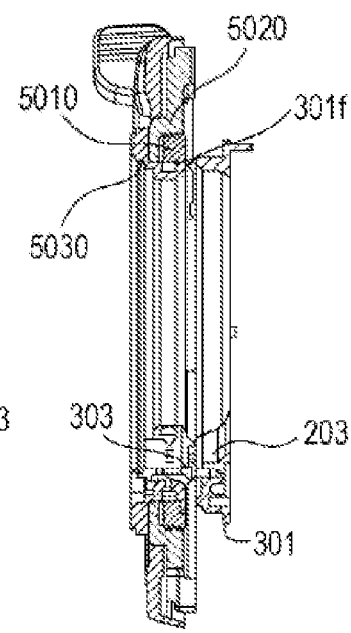
Figure 26A:
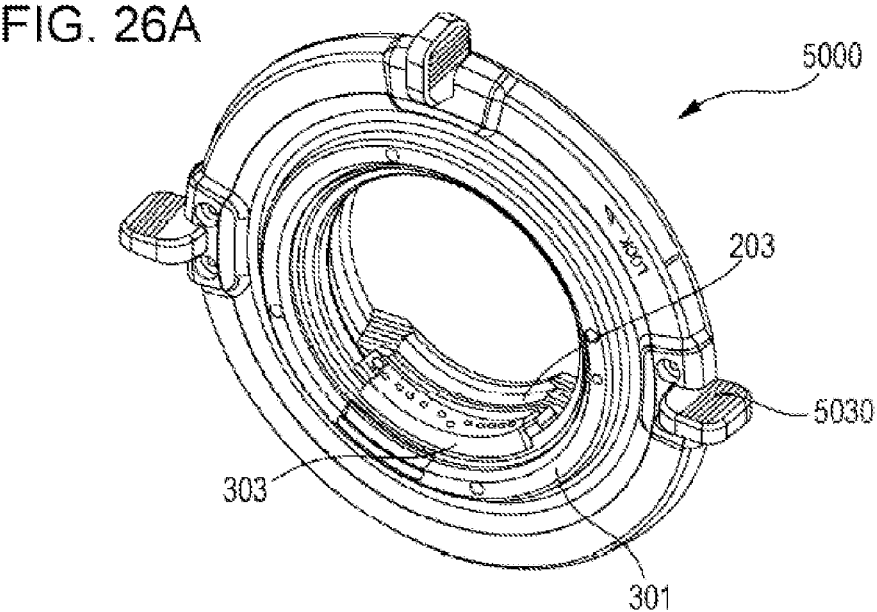
FIGS. 26A through 26C are diagrams for exemplarily describing a coupled state of the mount mechanism according to the modification of the present invention.
Figure 26B:
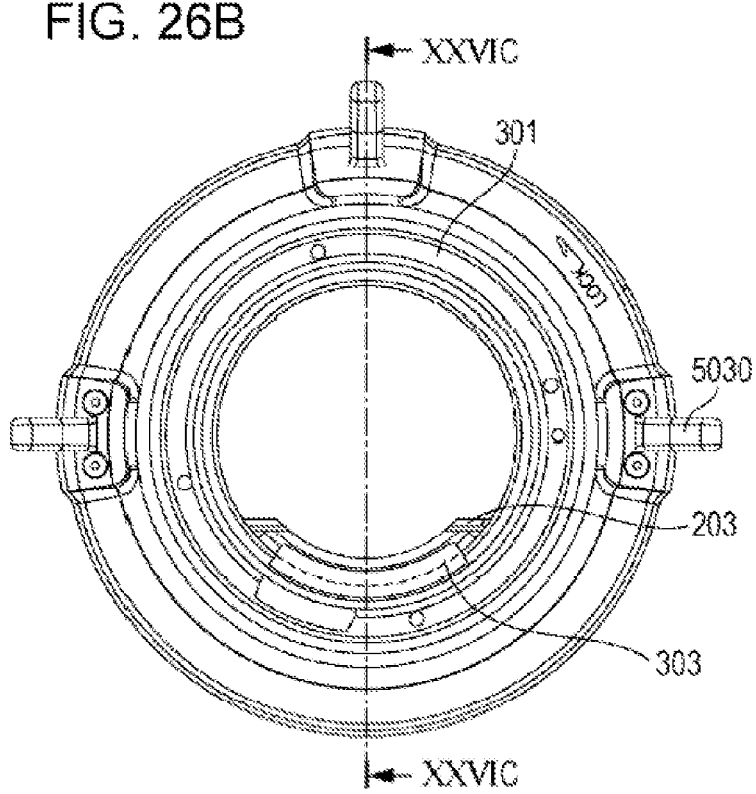
Figure 26C:
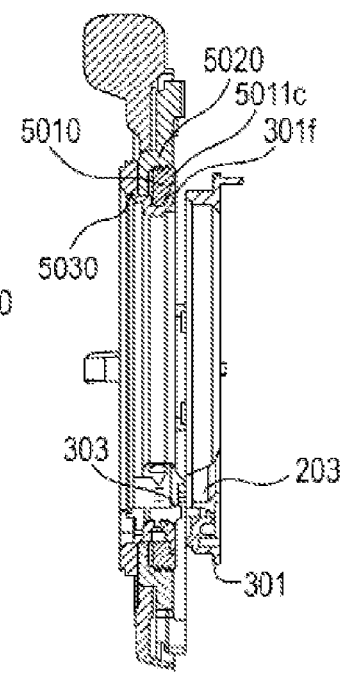

FIG. 24 is a disassembled perspective view of a mount mechanism 5000 according to a modification of the present invention. FIGS. 25A through 25C are diagrams for exemplarily describing a non-coupled state of the mount mechanism 5000 according to the modification of the present invention. FIGS. 26A through 26C are diagrams for exemplarily describing a coupled state of the mount mechanism 5000 according to the modification of the present invention. In FIGS. 24 through 26C, the lens mount that is capable of bayonet-coupling to a movable mount portion 5010 of the mount mechanism 5000 is also illustrated, for the same of description. Members that are the same as in the above-described embodiment are denoted by the same reference numerals, and description thereof will be omitted.

As illustrated in FIG. 24, the mount mechanism 5000 according to the present embodiment has, in order from the side to which the lens mount is attached, an operation portion 5030, a fixed mount portion 5020, the movable mount portion 5010, and the contact holding member 203, centered on the optical axis 3000. The operation portion 5030 is a ring-shaped operating unit capable of rotating on a center axis, and is fixed to the movable mount portion 5010 by screws, by arm portions 5040. Note that in the present modification, the operation portion 5030 and movable mount portion 5010 are fixed at two positions, using two arm portions 5040 disposed in an orthogonal direction as to the center axis. According to this configuration, by the operation portion 5030 being rotationally operated, the movable mount portion 5010 also rotates integrally with the center axis as the center.

Provided on the movable mount portion 5010 are movable mount claws 5011a, 5011b, and 5011c, that are each capable of bayonet-coupling with bayonet claws 301a through 301c provided to the lens mount. Also provided to the movable mount portion 5010 is a screw portion 5012 that has been threaded around the center axis, and the screwed state as to a later-described screw portion 5022 of the fixed mount portion 5020 changes in accordance with the rotation of the movable mount portion 5010 around the center axis.

The fixed mount portion 5020 has a camera mount face 5021 that comes into contact with the mount face of the lens mount 301, and the screw portion 5022 with which the screw portion 5012 of the above-described movable mount portion 5010 is screwed. Unlike the above-described movable mount portion 5010, the fixed mount portion 5020 does not rotate on the center axis in accordance with rotation operations of the operation portion 5030.

Next, the bayonet coupling method of the mount mechanism 5000 according to the present modification will be described with reference to FIGS. 25A through 26C. Note that the bayonet claws provided to the lens mount are in a state of being capable to engage the movable mount claws 5011a through 5011c of the movable mount portion 5010, in a state of being passed through an opening portion of the operation portion 5030 and an opening portion of the fixed mount portion 5020. The state illustrated in FIGS. 25A through 25C is a state where the operation portion 5030 is situated at an unlocked position. In this state, the lens mount face of the lens mount and the camera mount face 5021 of the fixed mount portion 5020 are in contact, but the claws of each of the lens mount and movable mount portion 5010 do not engage each other, and do not overlap, as viewed from the center axis direction. FIG. 25C is a cross-sectional diagram taken along cross-section XXVC-XXVC in FIG. 25B. FIGS. 26A through 26C exemplify the mount mechanism 5000 in a state where the operation portion 5030 has been rotationally operated from this state.

The state illustrated in FIGS. 26A through 26C is a state where the operation portion 5030 is situated in a locked position. In this state, the claws of each of the lens mount and movable mount portion 5010 overlap each other, and thereby are engaged in the center axis direction. In this state, the screwing state of the screw portion 5022 of the fixed mount portion 5020 and the screw portion 5012 of the movable mount portion 5010 changes in accordance with rotational operation of the operation portion 5030, and the movable mount portion 5010 moves toward the imaging device side in the center axis direction. FIG. 26C is a cross-sectional diagram taken along cross-section XXVIC-XXVIC in FIG. 26B. As illustrated in FIGS. 25C and 26C, the movable mount portion 5010 moves away from the fixed mount portion 5020 in a center axis direction of the mount depend in accordance with a non-locked state of the mount mechanism 5000 changing in a locked state of the mount mechanism 5000. According to this configuration, each of the movable mount claws 5011a through 5011c in a state of being engaged with the bayonet claws at the lens mount side moves toward the imaging apparatus side.

As described above, the mount mechanism 5000 can move the movable mount portion in the center axis direction as to the fixed mount portion, by rotating the movable mount portion that has claws capable of engaging lens-mount-side claws on the center axis. According to this configuration, the mount mechanism 5000 according to the present embodiment can reduce occurrence of gaps (looseness) that occurs between the lens mount and camera-side mount in a coupled state.

Although a configuration has been described in the above modification where the mount mechanism 5000 is provided to the imaging apparatus side, this can be applied to a configuration where the mount mechanism 5000 is provided to a camera accessory side, such as an interchangeable lens or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A mount apparatus on which an accessory is mountable to, and dismountable from, the mount apparatus, the mount apparatus comprising:
   a mount portion;
   a plurality of mount claw portions;
   a plurality of contact pins that is disposed following a circumferential direction of the mount portion, and that is arranged for electrical connection; and
   a holding member configured to hold the plurality of contact pins, wherein the mount portion is arranged to be changed between a first state where each of the plurality of mount claw portions is not engaged with each of a plurality of claw portions of the accessory in a center-axis direction of a center axis of the mount portion, and a second state where each of the plurality of mount claw portions is engaged with each of the plurality of claw portions of the accessory in the center axis direction of the mount portion, wherein each of the plurality of contact pins corresponds to respective plurality of contact faces disposed following a circumferential direction of a mount portion of the accessory, and the corresponding plurality of contact pins and the plurality of contact faces are electrically connected in the second state of the mount portion,
   wherein a first mount claw portion of the plurality of mount claw portions is included in an angle range between a line where a first contact pin of the plurality of contact pins and the center axis are connected in a radial direction of the mount portion, and a line where a first contact face of the plurality of contact faces and the center axis are connected in the radial direction of the mount portion,
   wherein the holding member has a first tier and a second tier such that positions where a first sub-set of the plurality of contact pins is located differs in the center axis direction of the mount portion from positions where a second sub-set of the plurality of contact pins is located,
   wherein a number of the plurality of contact pins disposed on the first tier is larger than a number of the plurality of contact pins disposed on the second tier, and
   wherein the first contact pin is located at the first tier.

2. The mount apparatus according to claim 1, wherein the plurality of mount claw portions is arranged such that each starts engaging with the plurality of claw portions of the accessory in a state where none of the plurality of contact pins and the plurality of contact faces are in contact, when the mount portion is changed from the first state toward the second state.

3. The mount apparatus according to claim 2, wherein the plurality of mount claw portions is arranged such that each starts engaging with the plurality of claw portions of the accessory at generally the same timing.

4. The mount apparatus according to claim 1, wherein, in the first state of the mount portion, the plurality of contact pins is in contact with none of the plurality of contact faces.

5. The mount apparatus according to claim 1, wherein the second tier protrudes further toward the accessory side than the first tier in the second state of the mount portion.

6. The mount apparatus according to claim 1, wherein, among the plurality of contact pins, the first contact pin is disposed further from the second tier of the holding member than any other contact pin on the first tier of the holding member.

7. The mount apparatus according to claim 1, wherein the first contact pin is a contact pin arranged to indicate ground level of one of the plurality of contact pins.

8. The mount apparatus according to claim 1, wherein the first contact pin is a contact pin arranged to detect whether the accessory is mounted to the mount apparatus.

9. The mount apparatus according to claim 1, wherein an angle range in the circumferential direction of the mount portion differs between at least two mount claw portions of the plurality of mount claw portions.

10. The mount apparatus according to claim 1, wherein the mount apparatus is provided on an imaging apparatus on which the accessory is mountable and from which the accessory is dismountable.

11. The mount apparatus according to claim 1, wherein the mount apparatus is provided on an adapter device on which the accessory is mountable and from which the accessory is dismountable.

12. An accessory which is mountable to, and dismountable from a mount apparatus, the accessory comprising:
    a mount portion;
    a plurality of claw portions;
    a plurality of contact faces that is disposed following a circumferential direction of the mount portion of the accessory, and that is arranged for electrical connection; and
    a holding member configured to hold the plurality of contact faces, wherein the mount portion is arranged to be changed between a first state where each of the plurality of claw portions is each engaged with each of a plurality of mount claw portions of the mount apparatus in a center axis direction of a center axis of the mount portion, and a second state where each of the plurality of claw portions is engaged with each of the plurality of mount claw portions of the mount apparatus in the center axis direction of the mount portion, wherein each of the plurality of contact faces corresponds to respective plurality of contact pins of the mount portion disposed following a circumferential direction of a mount portion of the mount apparatus, and the corresponding plurality of contact faces and the plurality of contact pins are electrically connected in the second state of the mount portion, wherein, in the circumferential direction of the mount portion of the accessory in the first state, a first claw portion of the plurality of claw portions is included in an angle range between a line where a first contact face of the plurality of contact faces and the center axis are connected in a radial direction of the mount portion, and a line where a first contact pin of the plurality of contact pins and the center axis are connected in the radial direction of the mount portion, wherein the holding member has a first tier and a second tier such that positions where a first sub-set of the plurality of contact faces is located differs in the center axis direction of the mount portion from positions where a second sub-set of the plurality of contact faces is located, wherein a number of the plurality of contact faces disposed on the first tier is larger than a number of the plurality of contact faces disposed on the second tier, and wherein the first contact face is located at the first tier.

13. The accessory according to claim 12, wherein the plurality of claw portions is arranged such that each starts engaging with the plurality of mount claw portions of the mount apparatus in a state where none of the plurality of contact faces and the plurality of contact pins are in contact, when the mount portion is changed from the first state toward the second state.

14. The accessory according to claim 13, wherein the plurality of claw portions is arranged such that each starts engaging with the plurality of mount claw portions of the mount apparatus at generally the same timing.

15. The accessory according to claim 12, wherein, in the first state of the mount portion, the plurality of contact faces is in contact with none of the plurality of contact pins.

16. The accessory according to claim 12, wherein the first tier protrudes further toward the mount apparatus side than the second tier in the second state of the mount portion.

17. The accessory according to claim 12, wherein, among the plurality of contact faces, the first contact face is disposed nearer to the second tier of the holding member than any other contact face on the first tier of the holding member.

18. The accessory according to claim 12, wherein the first contact pin of the mount apparatus is a contact pin arranged to indicate ground level of one of the plurality of contact pins of the mount apparatus.

19. The accessory according to claim 12, wherein the first contact face is a contact face arranged to detect whether the accessory is mounted to the mount apparatus.

20. The accessory according to claim 12, wherein an angle range in the circumferential direction of the mount portion of the accessory differs between at least two claw portions of the plurality of claw portions.

21. The accessory according to claim 12, wherein the accessory is an interchangeable lens that is mountable to, and dismountable from, the mount apparatus.

22. The accessory according to claim 12, wherein the accessory is an adaptor device that is mountable to and dismountable from, the mount apparatus.

* * * * *